(12) United States Patent
Liu et al.

(10) Patent No.: US 9,912,455 B2
(45) Date of Patent: Mar. 6, 2018

(54) DATA TRANSMISSION METHOD AND APPARATUS

(71) Applicant: Huawei Technologies Co., Ltd., Shenzhen (CN)

(72) Inventors: Yalin Liu, Shanghai (CN); Jiayin Zhang, Shanghai (CN); Yi Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 121 days.

(21) Appl. No.: 14/955,254

(22) Filed: Dec. 1, 2015

(65) Prior Publication Data

US 2016/0094325 A1 Mar. 31, 2016

Related U.S. Application Data

(63) Continuation of application No. PCT/CN2013/078142, filed on Jun. 27, 2013.

(51) Int. Cl.
*H04L 5/00* (2006.01)
*H04L 23/02* (2006.01)
(Continued)

(52) U.S. Cl.
CPC ............ *H04L 5/0048* (2013.01); *H04L 5/005* (2013.01); *H04L 23/02* (2013.01); *H04L 25/0226* (2013.01); *H04L 27/2613* (2013.01)

(58) Field of Classification Search
CPC ............................ H04L 5/0048; H04L 5/005
See application file for complete search history.

(56) References Cited

U.S. PATENT DOCUMENTS

2009/0028106 A1   1/2009  Hansen et al.
2010/0113019 A1   5/2010  Jeong et al.
(Continued)

FOREIGN PATENT DOCUMENTS

CN      1738311 A     2/2006
CN    101753286 A     6/2010
(Continued)

OTHER PUBLICATIONS

"IEEE Standard for Information technology—Telecommunications and information exchange between systems; Local and metropolitan area networks—Specific requirements; Part 11: Wireless LAN Medium Access Control (MAC) and Physical Layer (PHY) Specifications," IEEE STD 802.11-2012, pp. i-2695, Institute of Electrical and Electronics Engineers, New York, New York (Mar. 29, 2012).

(Continued)

*Primary Examiner* — Saba Tsegaye
(74) *Attorney, Agent, or Firm* — Leydig, Voit & Mayer, Ltd.

(57) ABSTRACT

A data transmission method and apparatus are provided, which includes: determining, by a transmitting device, a long training sequence set; determining at least one receiving device set, where the receiving device set includes at least one receiving device in a communications system; determining a first mapping relationship, where the first mapping relationship is a mapping relationship between the at least one receiving device set and at least one set-use long training sequence in the long training sequence set; determining, according to a target receiving device set and the first mapping relationship, a target set-use long training sequence corresponding to the target receiving device set, and performing encapsulation processing on first data to generate a first data packet, where a long training sequence (Continued)

field in a physical layer of the first data packet carries a first long training sequence symbol.

20 Claims, 5 Drawing Sheets

(51) Int. Cl.
*H04L 27/26* (2006.01)
*H04L 25/02* (2006.01)

(56) References Cited

U.S. PATENT DOCUMENTS

| | | | |
|---|---|---|---|
| 2011/0142020 A1 | 6/2011 | Kang et al. | |
| 2011/0211594 A1 | 9/2011 | Van Nee | |
| 2012/0324315 A1* | 12/2012 | Zhang | H04L 1/004 714/776 |
| 2014/0185502 A1* | 7/2014 | Kenney | H04W 88/02 370/311 |

FOREIGN PATENT DOCUMENTS

| | | |
|---|---|---|
| CN | 102237988 A | 11/2011 |
| CN | 102255862 A | 11/2011 |
| GB | 2459807 A | 11/2009 |
| WO | WO 2008153350 A1 | 12/2008 |
| WO | WO2011050324 * | 4/2011 |
| WO | WO 2011093655 A2 | 8/2011 |
| WO | WO 2013036642 A1 | 3/2013 |

OTHER PUBLICATIONS

"Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6GHz," IEEE P802.11ac/D5.0, pp. i-413, Institute of Electrical and Electronics Engineers, New York, New York (Jan. 2013).

"IEEE Standard for Information technology—Telecommunications and information exchange between systems; Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6 GHz," IEEE Std 802.11ac-2013, pp. 1-395, Institute of Electrical and Electronics Engineers, New York, New York (Dec. 11, 2013).

Merlin et al., "Partial AID Field," IEEE 802.11-11/0039r0, PowerPoint, Institute of Electrical and Electronics Engineers, New York, New York (Nov. 17, 2010).

* cited by examiner

200

A first receiving device in at least one receiving device in a communications system determines a first mapping relationship, where the first mapping relationship is a mapping relationship between at least one set-use long training sequence in the long training sequence set and the at least one receiving device set, the at least one set-use long training sequence corresponds to the at least one receiving device set on a one-to-one basis, the receiving device set includes at least one receiving device in the communications system, and the long training sequence set includes at least two long training sequences — S210

Determine, from the at least one receiving device set, a first receiving device set to which the first receiving device belongs — S220

When receiving a first data packet transmitted by a transmitting device, acquire a first long training sequence symbol carried in a long training sequence field in a physical layer of the first data packet, where the first long training sequence symbol is used to indicate a target set-use long training sequence, the target set-use long training sequence is determined by the transmitting device according to a target receiving device set of the first data packet and the first mapping relationship, and the first data packet is generated after the transmitting device performs encapsulation processing on first data — S230

Determine the target set-use long training sequence according to the first long training sequence symbol — S240

Process the first data packet according to the target set-use long training sequence, the first receiving device set, and the first mapping relationship — S250

FIG. 4

DATA TRANSMISSION METHOD AND APPARATUS

CROSS-REFERENCE TO RELATED APPLICATIONS

This application is a continuation of International Patent Application No. PCT/CN2013/078142, filed on Jun. 27, 2013, which is hereby incorporated by reference in its entirety.

TECHNICAL FIELD

The present disclosure relates to the communications field, and more specifically, to data transmission methods and apparatus.

BACKGROUND

As smart devices are applied widely, requirements for data services grow exponentially. To meet people's requirements for Internet access anytime and anywhere, performance of a network system should be improved.

In some communications systems, a signal field (signal field) in a physical layer of a data packet provides a partial association identifier field (field) for carrying a partial association identifier (partial AID, partial Association Identifier) of a target receiving device of the data packet, so that a receiving device may determine, in the physical layer, the target receiving device of the data packet by using the partial association identifier. Therefore, for example, if the receiving device is not the target receiving device of the data packet, the receiving device does not need to continue to parse the data packet. Therefore, communications efficiency is improved, and device burden is reduced. However, due to a limit of a quantity of bits of the partial association identifier (or a quantity of available bits of the signal field), the partial association identifier can distinguish only more than 500 receiving devices, and cannot meet a development requirement as a quantity of users increases quickly. In addition, in some scenarios such as device to device (D2D, Device to Device) communications, a partial association ID field may be set to all zeros, and cannot function normally.

Furthermore, in a system that does not provide a partial association identifier field, for a received data packet, a receiving device cannot identify, in the physical layer, a target receiving device of the data packet, and can only parse a Media Access Control (MAC, Media Access Control) layer of the data packet to acquire a MAC address carried in a MAC frame header, and identify the target receiving device according to the MAC address. That is, after the receiving device receives the data packet, even if the receiving device is not the target receiving device of the data packet, the receiving device should parse the MAC layer of the data packet, because the target receiving device of the data packet can be identified only after the MAC layer is parsed. Therefore, for a device that is not the target receiving device of the data packet, device burden is increased, hardware resources are wasted, and user experience is affected.

SUMMARY

The present disclosure provides data transmission methods and apparatus, which can reduce burden of a receiving device, reduce waste of hardware resources, and improve user experience.

A first aspect provides a data transmission method, where the method includes: determining, by a transmitting device, a long training sequence set, where the long training sequence set includes at least two long training sequences; determining at least one receiving device set, where the receiving device set includes at least one receiving device in a communications system; determining a first mapping relationship, where the first mapping relationship is a mapping relationship between at least one set-use long training sequence in the long training sequence set and the at least one receiving device set, and the at least one set-use long training sequence corresponds to the at least one receiving device set on a one-to-one basis; when first data needs to be transmitted to a target receiving device set, determining a target set-use long training sequence according to the target receiving device set and the first mapping relationship; performing encapsulation processing on the first data according to the target set-use long training sequence to generate a first data packet, so that a long training sequence field in a physical layer of the first data packet carries a first long training sequence symbol used to indicate the target set-use long training sequence; and transmitting the first data packet, so that after a receiving device receives the first data packet, and acquires the target set-use long training sequence from the first data packet, the receiving device processes the data packet according to the target set-use long training sequence.

With reference to the first aspect, in a first implementation manner of the first aspect, the determining at least one receiving device set includes: determining the at least one receiving device set according to grouping information of each receiving device in the communications system, where the grouping information is allocated by the communications system and used to uniquely indicate one receiving device group in the communications system, and the receiving device group includes at least one receiving device.

With reference to the first aspect and the foregoing implementation manner of the first aspect, in a second implementation manner of the first aspect, the grouping information includes a group identifier Group ID or a cell identifier Cell ID.

With reference to the first aspect and the foregoing implementation manners of the first aspect, in a third implementation manner of the first aspect, the determining at least one receiving device set includes: determining the at least one receiving device set according to feature information of each receiving device in the communications system, where the feature information includes any one of the following information: a service type of a service accessed by the receiving device, a geographical location of the receiving device, an access permission of the receiving device, and a priority of the receiving device.

With reference to the first aspect and the foregoing implementation manners of the first aspect, in a fourth implementation manner of the first aspect, the determining at least one receiving device set includes: determining the at least one receiving device set according to data that needs to be transmitted, so that data that needs to be transmitted to each receiving device in a same receiving device set is the same; and the method further includes: transmitting first indication information, where the first indication information is used to indicate receiving devices included in each receiving device set.

With reference to the first aspect and the foregoing implementation manners of the first aspect, in a fifth implementation manner of the first aspect, the method further includes: transmitting second indication information, where the second indication information is used to indicate the first mapping relationship.

With reference to the first aspect and the foregoing implementation manners of the first aspect, in a sixth implementation manner of the first aspect, the long training sequence is a sequence with good correlation properties.

With reference to the first aspect and the foregoing implementation manners of the first aspect, in a seventh implementation manner of the first aspect, the sequence with good correlation properties is any one of the following sequences: a polyphase perfect sequence, a Gold sequence, a Gold-like sequence, and a pseudo-random sequence, for example, an m sequence.

With reference to the first aspect and the foregoing implementation manners of the first aspect, in an eighth implementation manner of the first aspect, the polyphase perfect sequence is any one of the following sequences: a Zadoff-Chu sequence, a Frank sequence, and a combined Frank/Zadoff-Chu sequence.

With reference to the first aspect and the foregoing implementation manners of the first aspect, in a ninth implementation manner of the first aspect, a length of the long training sequence is determined according to a quantity of available subcarriers in the communications system.

With reference to the first aspect and the foregoing implementation manners of the first aspect, in a tenth implementation manner of the first aspect, the identity information is any one of the following information: a Media Access Control MAC address, an Internet Protocol IP address, a basic service set identifier BSSID, an association identifier AID, a mobile phone number, an international mobile subscriber identity IMSI, and an international mobile equipment identity IMEI.

A second aspect provides a data transmission method, where the method includes: determining, by a first receiving device in at least one receiving device in a communications system, a first mapping relationship, where the first mapping relationship is a mapping relationship between at least one set-use long training sequence in a long training sequence set and at least one receiving device set, the at least one receiving device set corresponds to the at least one set-use long training sequence on a one-to-one basis, the receiving device set includes at least one receiving device in the communications system, and the long training sequence set includes at least two long training sequences; determining, from the at least one receiving device set, a first receiving device set to which the first receiving device belongs; when receiving a first data packet transmitted by a transmitting device, acquiring a first long training sequence symbol carried in a long training sequence field in a physical layer of the first data packet, where the first long training sequence symbol is used to indicate a target set-use long training sequence, the target set-use long training sequence is determined by the transmitting device according to a target receiving device set of the first data packet and the first mapping relationship, and the first data packet is generated after the transmitting device performs encapsulation processing on first data; determining the target set-use long training sequence according to the first long training sequence symbol; and processing the first data packet according to the target set-use long training sequence, the first receiving device set, and the first mapping relationship.

With reference to the second aspect, in a first implementation manner of the second aspect, the processing the first data packet according to the target set-use long training sequence, the first receiving device set, and the first mapping relationship includes: determining, according to the first receiving device set and the first mapping relationship, a first set-use long training sequence corresponding to the first receiving device set; and if the first set-use long training sequence is the same as the target set-use long training sequence, acquiring the first data from the first data packet; or if the first set-use long training sequence is different from the target set-use long training sequence, discarding the first data packet.

With reference to the second aspect and the foregoing implementation manner of the second aspect, in a second implementation manner of the second aspect, the processing the first data packet according to the target set-use long training sequence, the first receiving device set, and the first mapping relationship includes: determining, according to the first mapping relationship and the target set-use long training sequence, the target receiving device set corresponding to the target set-use long training sequence; and if the first receiving device set is the same as the target receiving device set, acquiring the first data from the first data packet; or if the first receiving device set is different from the target receiving device set, discarding the first data packet.

With reference to the second aspect and the foregoing implementation manners of the second aspect, in a third implementation manner of the second aspect, the at least one receiving device set is determined according to grouping information of each receiving device in the communications system, the grouping information is allocated by the communications system and used to uniquely indicate one receiving device group in the communications system, and the receiving device group includes at least one receiving device; and the determining, from the at least one receiving device set, a first receiving device set to which the first receiving device belongs includes: determining, according to grouping information of the first receiving device, the first receiving device set to which the first receiving device belongs.

With reference to the second aspect and the foregoing implementation manners of the second aspect, in a fourth implementation manner of the second aspect, the grouping information includes a group identifier Group ID or a cell identifier Cell ID.

With reference to the second aspect and the foregoing implementation manners of the second aspect, in a fifth implementation manner of the second aspect, the at least one receiving device set is determined according to feature information of each receiving device in the communications system, where the feature information includes any one of the following information: a service type of a service accessed by the receiving device, a geographical location of the receiving device, an access permission of the receiving device, and a priority of the receiving device; and the determining, from the at least one receiving device set, a first receiving device set to which the first receiving device belongs includes: determining, according to feature information of the first receiving device, the first receiving device set to which the first receiving device belongs.

With reference to the second aspect and the foregoing implementation manners of the second aspect, in a sixth implementation manner of the second aspect, the at least one receiving device set is determined by the transmitting device according to data that needs to be transmitted, where same data needs to be transmitted by the transmitting device to each receiving device in a same receiving device set; and the determining, from the at least one receiving device set, a first receiving device set to which the first receiving device belongs includes: receiving first indication information, where the first indication information is used to indicate receiving devices included in each receiving device set; and determining, according to the first indication information, the first receiving device set to which the first receiving device belongs.

With reference to the second aspect and the foregoing implementation manners of the second aspect, in a seventh implementation manner of the second aspect, the determining, by a first receiving device in at least one receiving device in a communications system, a first mapping relationship, includes: receiving second indication information transmitted by the transmitting device, where the second indication information is used to indicate the first mapping relationship; and determining the first mapping relationship according to the second indication information.

With reference to the second aspect and the foregoing implementation manners of the second aspect, in an eighth implementation manner of the second aspect, the long training sequence is a sequence with good correlation properties.

With reference to the second aspect and the foregoing implementation manners of the second aspect, in a ninth implementation manner of the second aspect, the sequence with good correlation properties is any one of the following sequences: a polyphase perfect sequence, a Gold sequence, a Gold-like sequence, and a pseudo-random sequence, for example, an m sequence.

With reference to the second aspect and the foregoing implementation manners of the second aspect, in a tenth implementation manner of the second aspect, the polyphase perfect sequence is any one of the following sequences: a Zadoff-Chu sequence, a Frank sequence, and a combined Frank/Zadoff-Chu sequence.

With reference to the second aspect and the foregoing implementation manners of the second aspect, in an eleventh implementation manner of the second aspect, a length of the long training sequence is determined according to a quantity of available subcarriers in the communications system.

With reference to the second aspect and the foregoing implementation manners of the second aspect, in a twelfth implementation manner of the second aspect, the identity information is any one of the following information: a Media Access Control MAC address, an Internet Protocol IP address, a basic service set identifier BSSID, an association identifier AID, a mobile phone number, an international mobile subscriber identity IMSI, and an international mobile equipment identity IMEI.

A third aspect provides a data transmission apparatus, where the apparatus includes: a determining unit, configured to determine a long training sequence set, where the long training sequence set includes at least two long training sequences; determine at least one receiving device set, where the receiving device set includes at least one receiving device in a communications system; and determine a first mapping relationship, where the first mapping relationship is a mapping relationship between the at least one receiving device set and at least one set-use long training sequence in the long training sequence set, and the at least one receiving device set corresponds to the at least one set-use long training sequence on a one-to-one basis; a processing unit, configured to determine, according to the target receiving device set and the first mapping relationship, when first data needs to be transmitted to a target receiving device set, a target set-use long training sequence corresponding to the target receiving device set, and perform encapsulation processing on the first data to generate a first data packet, where a long training sequence field in a physical layer of the first data packet carries a first long training sequence symbol, where the first long training sequence symbol is used to indicate the target set-use long training sequence; and a transmitting unit, configured to transmit the first data packet, so that after a receiving device receives the first data packet, and acquires the target set-use long training sequence from the first data packet, the receiving device processes the data packet according to the target set-use long training sequence.

With reference to the third aspect, in a first implementation manner of the third aspect, the determining unit is specifically configured to determine the at least one receiving device set according to grouping information of each receiving device in the communications system, where the grouping information is allocated by the communications system and used to uniquely indicate one receiving device group in the communications system, and the receiving device group includes at least one receiving device.

With reference to the third aspect and the foregoing implementation manner of the third aspect, in a second implementation manner of the third aspect, the grouping information includes a group identifier Group ID or a cell identifier Cell ID.

With reference to the third aspect and the foregoing implementation manners of the third aspect, in a third implementation manner of the third aspect, the determining unit is specifically configured to determine the at least one receiving device set according to feature information of each receiving device in the communications system, where the feature information includes any one of the following information: a service type of a service accessed by the receiving device, a geographical location of the receiving device, an access permission of the receiving device, and a priority of the receiving device.

With reference to the third aspect and the foregoing implementation manners of the third aspect, in a fourth implementation manner of the third aspect, the determining unit is specifically configured to determine the at least one receiving device set according to data that needs to be transmitted, so that data that needs to be transmitted to each receiving device in a same receiving device set is the same; and the transmitting unit is further configured to transmit first indication information, where the first indication information is used to indicate receiving devices included in each receiving device set.

With reference to the third aspect and the foregoing implementation manners of the third aspect, in a fifth implementation manner of the third aspect, the transmitting unit is further configured to transmit second indication information, where the second indication information is used to indicate the first mapping relationship.

With reference to the third aspect and the foregoing implementation manners of the third aspect, in a sixth implementation manner of the third aspect, the long training sequence is a sequence with good correlation properties.

With reference to the third aspect and the foregoing implementation manners of the third aspect, in a seventh implementation manner of the third aspect, the sequence with good correlation properties is any one of the following sequences: a polyphase perfect sequence, a Gold sequence, a Gold-like sequence, and a pseudo-random sequence, for example, an m sequence.

With reference to the third aspect and the foregoing implementation manners of the third aspect, in an eighth implementation manner of the third aspect, the polyphase perfect sequence is any one of the following sequences: a Zadoff-Chu sequence, a Frank sequence, and a combined Frank/Zadoff-Chu sequence.

With reference to the third aspect and the foregoing implementation manners of the third aspect, in a ninth implementation manner of the third aspect, a length of the long training sequence is determined according to a quantity of available subcarriers in the communications system.

With reference to the third aspect and the foregoing implementation manners of the third aspect, in a tenth implementation manner of the third aspect, the identity information is any one of the following information: a Media Access Control MAC address, an Internet Protocol IP address, a basic service set identifier BSSID, an association identifier AID, a mobile phone number, an international mobile subscriber identity IMSI, and an international mobile equipment identity IMEI.

A fourth aspect provides a data transmission apparatus, where the apparatus includes: a determining unit, configured to determine a first mapping relationship, where the first mapping relationship is a mapping relationship between the at least one receiving device set and at least one set-use long training sequence in the long training sequence set, the at least one receiving device set corresponds to the at least one set-use long training sequence on a one-to-one basis, the receiving device set includes at least one receiving device in a communications system, and the long training sequence set includes at least two long training sequences; and determine, from the at least one receiving device set, a first receiving device set to which the apparatus belongs; a receiving unit, configured to receive a first data packet transmitted by a transmitting device; and a processing unit, configured to acquire a first long training sequence symbol carried in a long training sequence field in a physical layer of the first data packet, where the first long training sequence symbol is used to indicate a target set-use long training sequence, the target set-use long training sequence is determined by the transmitting device according to a target receiving device set of the first data packet and the first mapping relationship, and the first data packet is generated after the transmitting device performs encapsulation processing on first data; determine the target set-use long training sequence according to the first long training sequence symbol; and process the first data packet according to the target set-use long training sequence, the first receiving device set, and the first mapping relationship.

With reference to the fourth aspect, in a first implementation manner of the fourth aspect, the processing unit is specifically configured to determine, according to the first receiving device set and the first mapping relationship, a first set-use long training sequence corresponding to the first receiving device set; and if the first set-use long training sequence is the same as the target set-use long training sequence, acquire the first data from the first data packet; or if the first set-use long training sequence is different from the target set-use long training sequence, discard the first data packet.

With reference to the fourth aspect and the foregoing implementation manner of the fourth aspect, in a second implementation manner of the fourth aspect, the processing unit is specifically configured to determine, according to the first mapping relationship and the target set-use long training sequence, the target receiving device set corresponding to the target set-use long training sequence; and if the first receiving device set is the same as the target receiving device set, acquire the first data from the first data packet; or if the first receiving device set is different from the target receiving device set, discard the first data packet.

With reference to the fourth aspect and the foregoing implementation manners of the fourth aspect, in a third implementation manner of the fourth aspect, the at least one receiving device set is determined according to grouping information of each receiving device in the communications system, the grouping information is allocated by the communications system and used to uniquely indicate one receiving device group in the communications system, and the receiving device group includes at least one receiving device; and the determining unit is specifically configured to determine, according to grouping information of the first receiving device, the first receiving device set to which the first receiving device belongs.

With reference to the fourth aspect and the foregoing implementation manners of the fourth aspect, in a fourth implementation manner of the fourth aspect, the grouping information includes a group identifier Group ID or a cell identifier Cell ID.

With reference to the fourth aspect and the foregoing implementation manners of the fourth aspect, in a fifth implementation manner of the fourth aspect, the at least one receiving device set is determined according to feature information of each receiving device in the communications system, where the feature information includes any one of the following information: a service type of a service accessed by the receiving device, a geographical location of the receiving device, an access permission of the receiving device, and a priority of the receiving device; and the determining unit is specifically configured to determine, according to feature information of the first receiving device, the first receiving device set to which the first receiving device belongs.

With reference to the fourth aspect and the foregoing implementation manners of the fourth aspect, in a sixth implementation manner of the fourth aspect, the at least one receiving device set is determined by the transmitting device according to data that needs to be transmitted, where same data needs to be transmitted by the transmitting device to each receiving device in a same receiving device set; the receiving unit is further configured to receive first indication information, where the first indication information is used to indicate receiving devices included in each receiving device set; and the determining unit is specifically configured to determine, according to the first indication information, the first receiving device set to which the first receiving device belongs.

With reference to the fourth aspect and the foregoing implementation manners of the fourth aspect, in a seventh implementation manner of the fourth aspect, the receiving unit is further configured to receive second indication information transmitted by the transmitting device, where the second indication information is used to indicate the first mapping relationship; and the determining unit is specifically configured to determine the first mapping relationship according to the second indication information.

With reference to the fourth aspect and the foregoing implementation manners of the fourth aspect, in an eighth implementation manner of the fourth aspect, the long training sequence is a sequence with good correlation properties.

With reference to the fourth aspect and the foregoing implementation manners of the fourth aspect, in a ninth implementation manner of the fourth aspect, the sequence with good correlation properties is any one of the following sequences: a polyphase perfect sequence, a Gold sequence, a Gold-like sequence, and a pseudo-random sequence, for example, an m sequence.

With reference to the fourth aspect and the foregoing implementation manners of the fourth aspect, in a tenth implementation manner of the fourth aspect, the polyphase perfect sequence is any one of the following sequences: a Zadoff-Chu sequence, a Frank sequence, and a combined Frank/Zadoff-Chu sequence.

With reference to the fourth aspect and the foregoing implementation manners of the fourth aspect, in an eleventh implementation manner of the fourth aspect, a length of the long training sequence is determined according to a quantity of available subcarriers in the communications system.

With reference to the fourth aspect and the foregoing implementation manners of the fourth aspect, in a twelfth implementation manner of the fourth aspect, the identity information is any one of the following information: a Media Access Control MAC address, an Internet Protocol IP address, a basic service set identifier BSSID, an association identifier AID, a mobile phone number, an international mobile subscriber identity IMSI, and an international mobile equipment identity IMEI.

According to the data transmission method and apparatus in the present disclosure, a transmitting device determines a mapping relationship between at least one receiving device set and at least one set-use long training sequence in a long training sequence set, and determines, according to a target receiving device set and the mapping relationship, a target set-use long training sequence corresponding to the target receiving device set, so that the target set-use long training sequence is carried in a physical layer of a first data packet. In this manner, burden of a receiving device can be reduced, waste of hardware resources can be reduced, and user experience can be improved.

BRIEF DESCRIPTION OF DRAWINGS

To describe the technical solutions in the embodiments of the present disclosure more clearly, the following briefly introduces the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

FIG. 4 is a schematic flowchart of a data transmission method according to another embodiment of the present disclosure;

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The technical solutions of the present disclosure may be applied in a wireless local area network (WLAN, Wireless Local Area Network), for example, wireless fidelity (Wi-Fi, Wireless Fidelity), or may be applied in various other communications systems in which a transmitting device transmits information in a broadcast manner (over an air interface, or the like), that is, systems in which multiple devices can receive the information, for example, Global System for Mobile Communications (GSM, Global System for Mobile Communications), a Code Division Multiple Access (CDMA, Code Division Multiple Access) system, a Wideband Code Division Multiple Access (WCDMA, Wideband Code Division Multiple Access) system, a General Packet Radio Service (GPRS, General Packet Radio Service) system, and a Long Term Evolution (LTE, Long Term Evolution) system.

A receiving device and a transmitting device may be an access point (AP, Access Point) or a user station (STA, Station) in a WLAN, or may be a mobile terminal (Mobile Terminal), a mobile user equipment, or the like, which may communicate with one or more core networks through a radio access network (RAN, Radio Access Network). The receiving device and the transmitting device may be a mobile terminal, such as a mobile phone (also referred to as a "cellular" phone), or may be a computer with a mobile terminal, for example, a portable, pocket-sized, handheld, computer built-in, or vehicle-mounted mobile apparatus, which exchanges voice and/or data with the radio access network. The receiving device and the transmitting device may also be a base station (BTS, Base Transceiver Station) in the GSM or CDMA, or may be a base station (NodeB) in the WCDMA, or may be an evolved NodeB (eNB or e-NodeB, evolved Node B) in the LTE, or may be a small-cell base station, which may be a micro (Micro) base station, or may be a pico (Pico) base station, or may be a home base station also referred to as a femtocell (femto) base station; the present disclosure is not limited thereto.

Figure 1:
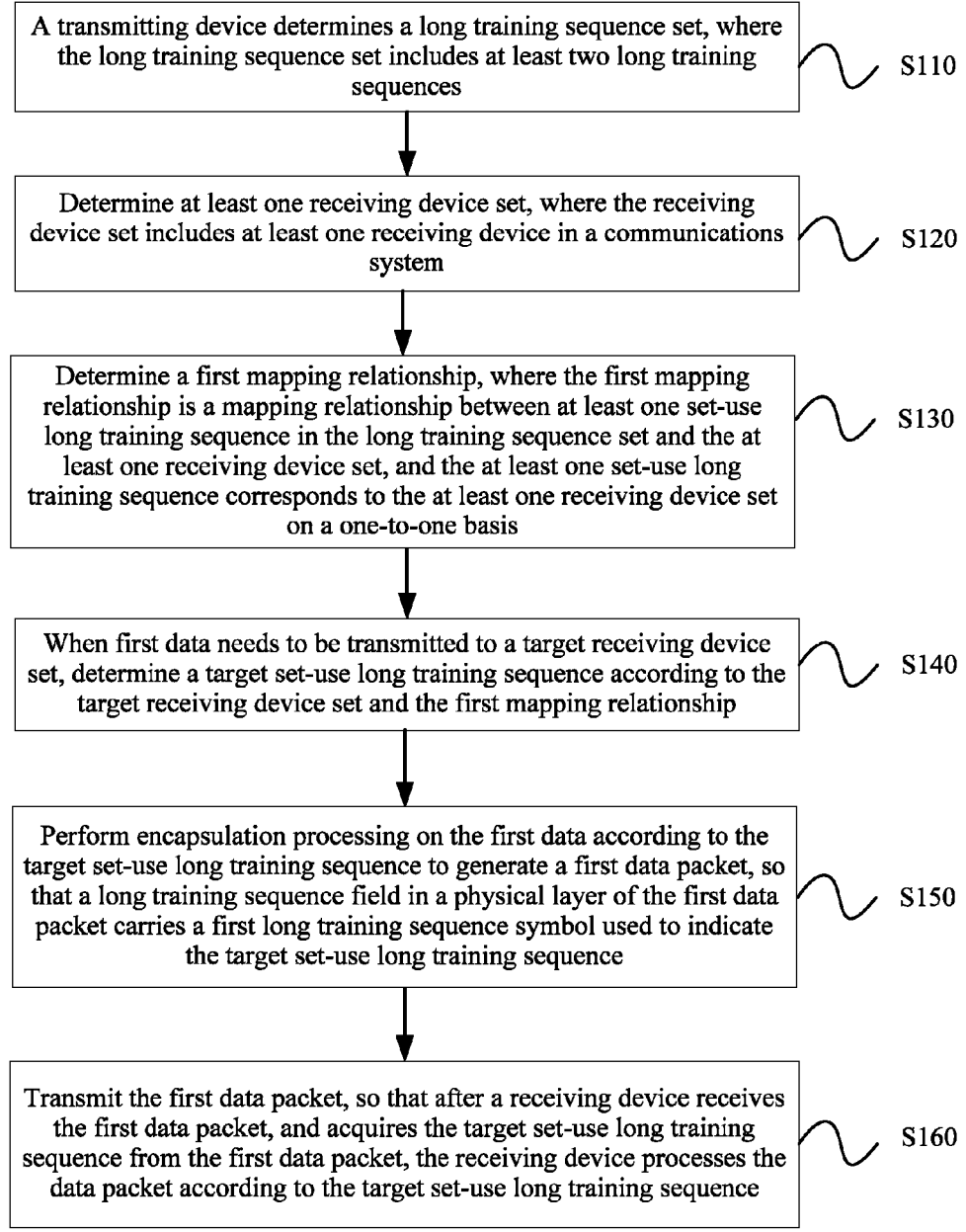
FIG. 1 is a schematic flowchart of a data transmission method according to an embodiment of the present disclosure.

FIG. 1 shows a schematic flowchart of a data transmission method 100 according to an embodiment of the present disclosure described from a perspective of a transmitting device. As shown in FIG. 1, the method 100 includes:

S110. A transmitting device determines a long training sequence set, where the long training sequence set includes at least two long training sequences.

S120. Determine at least one receiving device set, where the receiving device set includes at least one receiving device in a communications system.

S130. Determine a first mapping relationship, where the first mapping relationship is a mapping relationship between at least one set-use long training sequence in the long training sequence set and the at least one receiving device set, and the at least one set-use long training sequence corresponds to the at least one receiving device set on a one-to-one basis.

S140. When first data needs to be transmitted to a target receiving device set, determine a target set-use long training sequence according to the target receiving device set and the first mapping relationship.

S150. Perform encapsulation processing on the first data according to the target set-use long training sequence to generate a first data packet, so that a long training sequence field in a physical layer of the first data packet carries a first long training sequence symbol used to indicate the target set-use long training sequence.

S160. Transmit the first data packet, so that after a receiving device receives the first data packet, and acquires the target set-use long training sequence from the first data packet, the receiving device processes the data packet according to the target set-use long training sequence.

In the prior art, a long training sequence (LTS, Long Training Sequence) is used for channel estimation, and in addition, in a same communications system, each user equipment (including a receiving device and a transmitting device) uses a same long training sequence.

In contrast, in an embodiment of the present disclosure, the communications system may use multiple (at least two) LTSs that are different from each other. In addition, for example, different LTSs may be allocated to different user equipments. When the transmitting device needs to transmit data to a target receiving device, the transmitting device may determine a target LTS corresponding to the target receiving device (in other words, the target LTS is allocated by the system to the target receiving device), and add the target LTS to a long training field (LTF, Long Training Field, also referred to as a long training sequence field) in a physical layer of a data packet. Therefore, the receiving device may acquire the target LTS from the LTF of the data packet, and may perform processing (for example, receiving or discarding) on the data packet according to a relationship (for example, same or different) between the LTS allocated by the system to the receiving device and the target LTS, or may determine, according to the target LTS, the target receiving device (specifically, first sub-identity information of the target receiving device, where the parameter is described later in detail) corresponding to the target LTS, and perform processing (for example, receiving or discarding) on the data packet according to a relationship (for example, same or different) between first sub-identity information of the receiving device and first sub-identity information of the target receiving device. Therefore, the receiving device acquires, by parsing the LTF in the physical layer of the data packet, the target LTS carried in the LTF, and can determine, by using the target LTS, whether the receiving device is the target receiving device of the data packet. Therefore, the receiving device does not need to continue to demodulate a data packet unrelated to the receiving device, which can reduce burden of the receiving device, reduce waste of hardware resources, and improve user experience.

Specifically, in step S110, a device A (an example of the transmitting device, for example, may be an AP or a STA) in the communications system may predetermine a long training sequence set including multiple long training sequences (LTSs, Long Training Sequences).

In an embodiment of the present disclosure, the long training sequence set may be generated by each device (including the receiving device and the transmitting device) in the system according to a preset rule, or may be generated by an external device independent of the receiving device and the transmitting device according to the preset rule and delivered to each device (including the receiving device and the transmitting device) in the system. For ease of understanding and description, the following uses the device A as an execution entity to describe a method and a process for generating the long training sequence set.

Optionally, the long training sequence is a sequence with good correlation properties.

The sequence with good correlation properties is any one of the following sequences:

a polyphase perfect sequence, a Gold sequence, a Gold-like sequence, and a pseudo-random sequence.

In addition, the polyphase perfect sequence is any one of the following sequences: a Zadoff-Chu sequence, a Frank sequence, a Combined Frank/Zadoff-Chu sequence, and the like.

Specifically, currently, a great progress is made in a sequence design field, and people's research emphasis has shifted from a binary pseudo-random sequence to a sequence with good correlation properties such as a polyphase perfect sequence (Perfect sequence). Because the sequence with good correlation properties has good autocorrelation properties and cross-correlation properties, in the embodiment of the present disclosure, the sequence with good correlation properties may be used as the LTS. Therefore, the receiving device may use the good autocorrelation properties and cross-correlation properties of the LTS to accurately determine whether the LTS allocated by the system to the receiving device is the same as the LTS carried in the data packet, and therefore, can determine whether the receiving device is the target receiving device of the data packet (this process is described later in detail). In addition, by using, for example, the polyphase perfect sequence, properties (for example, formula generation) of the polyphase perfect sequence can be used to generate multiple LTSs quickly and conveniently and determine a mapping relationship between the multiple LTSs and receiving devices (specifically, first sub-identity information of each receiving device) (this process is described later in detail).

The sequences with good correlation properties may include a polyphase perfect sequence, a Gold sequence, a Gold-like sequence, and a pseudo-random sequence with good correlation properties. Herein, properties, concepts, and the like of the polyphase perfect sequence, the Gold sequence, and the pseudo-random sequence may be similar to those in the prior art, and to avoid repetition, description thereof is omitted herein. In addition, it should be noted that the foregoing illustrated sequences used as the sequences with good correlation properties are only examples for description, and the present disclosure is not limited thereto. Other sequences with good correlation properties all fall within the protection scope of the present disclosure.

The polyphase perfect sequence may include a Zadoff-Chu sequence, a Frank sequence, a Combined Frank/Zadoff-Chu sequence, and the like. Herein, properties, concepts, and the like of the Zadoff-Chu sequence, the Frank sequence, or the Combined Frank/Zadoff-Chu sequence may be similar to those in the prior art (for example, a sequence length of the Frank sequence can only be the square of a natural number), and to avoid repetition, description thereof is omitted herein. In addition, it should be noted that the foregoing illustrated sequences used as the polyphase perfect sequence are only examples for description, and the present disclosure is not limited thereto. Other sequences that can be used as the polyphase perfect sequence, namely, sequences that have ideal autocorrelation properties and optimum cross-correlation properties, all fall within the protection scope of the present disclosure. For ease of understanding and description, exemplarily, the following uses the Zadoff-Chu sequence as a long training sequence to describe a process for generating the long training sequence set in the embodiment of the present disclosure.

In an embodiment of the present disclosure, a long training sequence set with multiple LTSs may be generated according to the properties of the polyphase perfect sequence (herein, specifically, properties of the Zadoff-Chu sequence) by using a conventional Zadoff-Chu sequence generation formula.

For example, a length of the Zadoff-Chu sequence may be set according to a preset rule, and a basic long training sequence set C may be determined according to the determined sequence length and the following formula 1:

$$C = \{\hat{a}^{(1)}, \ldots, \hat{a}^{(r)}, \ldots, \hat{a}^{(N-1)}\},$$
$$r = \{1, \ldots, N-1\},$$
$$\gcd(r, N) = 1,$$
$$\hat{a}^{(r)} = (\hat{a}_0^{(r)}, \hat{a}_1^{(r)}, \ldots, \hat{a}_{N-1}^{(r)}),$$
$$\hat{a}_n^{(r)} = \begin{cases} e^{\frac{i\pi}{N} r(n+1)n}, & N \text{ odd}, \\ e^{\frac{i\pi}{N} rn^2}, & N \text{ even}, \end{cases}$$
$$0 \le n \le N;$$
$$\gcd(r, N) = 1,$$

formula 1 where N indicates a sequence length, and an r set is a set of natural numbers that are less than N and are coprime to N. Because two adjacent natural numbers are coprime, the last element in the set is N−1. $\hat{a}^{(r)}$ indicates a basic long training sequence in the basic long training sequence set C, and $\hat{a}_n^{(r)}$ indicates an $n^{th}$ element in the basic long training sequence $\hat{a}^{(r)}$, where r is less than N and r and N are coprime, and i indicates an imaginary unit (namely, $i^2=-1$). It should be noted that because a quantity M of basic long training sequences in a Zadoff-Chu sequence set (in other words, a quantity of elements in the r set) is decided by the sequence length N, that is, M is "a quantity of natural numbers that are less than the sequence length and are coprime to the sequence length", when the Zadoff-Chu sequence is selected, under a premise of improving accuracy of channel estimation (this effect is described later in detail), a quantity of sequences included in the sequence set can be as great as possible if a value of the sequence length is less than or equal to a quantity of subcarriers, and therefore a quantity of represented receiving devices can be increased.

Optionally, a length of the long training sequence is determined according to a quantity of available subcarriers in the communications system.

Specifically, in an embodiment of the present disclosure, because the long training sequence is used for channel estimation, for example, if the length of the long training sequence is equal to the quantity of available subcarriers in the communications system, each element in the long training sequence can correspond to each subcarrier on a one-to-one basis, and therefore, accuracy of channel estimation is improved.

First, the device A may determine a system bandwidth. For example, the device A may acquire a bandwidth parameter (CH_BANDWIDTH) from a transceiver (TRX, Transceiver), determine the system bandwidth according to the bandwidth parameter, and further determine the quantity of available subcarriers in the system. For example, in a Wi-Fi system of the IEEE 802.11g standard, when the system bandwidth is 20 megahertz (MHz), the quantity of available subcarriers in the system is 53.

As described above, when the Zadoff-Chu sequence is selected, a quantity of sequences included in the sequence set can be as great as possible if the sequence length is less than or equal to a quantity of subcarriers, and therefore a quantity of represented receiving devices can be increased. In the following description, exemplarily, the sequence length is set to 53.

If the sequence length is set to 53 (namely, N=53), according to the foregoing formula 1, the following basic long training sequence set C may be generated:

$$C = \{\hat{a}^{(1)}, \ldots, \hat{a}^{(r)}, \ldots, \hat{a}^{(52)}\}, r=\{1,2,\ldots,52\},$$

where:

a(1)={0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0}, a(2)={0, 4, 12, 24, 40, 60, 84, 6, 38, 74, 8, 52, 100, 46, 102, 56, 14, 82, 48, 18, 98, 76, 58, 44, 34, 28, 26, 28, 34, 44, 58, 76, 98, 18, 48, 82, 14, 56, 102, 46, 100, 52, 8, 74, 38, 6, 84, 60, 40, 24, 12, 4, 0}, a(3)={0, 6, 18, 36, 60, 90, 20, 62, 4, 58, 12, 78, 44, 16, 100, 84, 74, 70, 72, 80, 94, 8, 34, 66, 104, 42, 92, 42, 104, 66, 34, 8, 94, 80, 72, 70, 74, 84, 100, 16, 44, 78, 12, 58, 4, 62, 20, 90, 60, 36, 18, 6, 0}, a(4)={0, 8, 24, 48, 80, 14, 62, 12, 76, 42, 16, 104, 94, 92, 98, 6, 28, 58, 96, 36, 90, 46, 10, 88, 68, 56, 52, 56, 68, 88, 10, 46, 90, 36, 96, 58, 28, 6, 98, 92, 94, 104, 16, 42, 76, 12, 62, 14, 80, 48, 24, 8, 0}, a(5)={0, 10, 30, 60, 100, 44, 104, 68, 42, 26, 20, 24, 38, 62, 96, 34, 88, 46, 14, 98, 86, 84, 92, 4, 32, 70, 12, 70, 32, 4, 92, 84, 86, 98, 14, 46, 88, 34, 96, 62, 38, 24, 20, 26, 42, 68, 104, 44, 100, 60, 30, 10, 0}, a(6)={0, 12, 36, 72, 14, 74, 40, 18, 8, 10, 24, 50, 88, 32, 94, 62, 42, 34, 38, 54, 82, 16, 68, 26, 102, 84, 78, 84, 102, 26, 68, 16, 82, 54, 38, 34, 42, 62, 94, 32, 88, 50, 24, 10, 8, 18, 40, 74, 14, 72, 36, 12, 0}, a(7)={0, 14, 42, 84, 34, 104, 82, 74, 80, 100, 28, 76, 32, 2, 92, 90, 102, 22, 62, 10, 78, 54, 44, 48, 66, 98, 38, 98, 66, 48, 44, 54, 78, 10, 62, 22, 102, 90, 92, 2, 32, 76, 28, 100, 80, 74, 82, 104, 34, 84, 42, 14, 0}, a(8)={0, 16, 48, 96, 54, 28, 18, 24, 46, 84, 32, 102, 82, 78, 90, 12, 56, 10, 86, 72, 74, 92, 20, 70, 30, 6, 104, 6, 30, 70, 20, 92, 74, 72, 86, 10, 56, 12, 90, 78, 82, 102, 32, 84, 46, 24, 18, 28, 54, 96, 48, 16, 0}, a(9)={0, 18, 54, 2, 74, 58, 60, 80, 12, 68, 36, 22, 26, 48, 88, 40, 10, 104, 4, 28, 70, 24, 102, 92, 100, 20, 64, 20, 100, 92, 102, 24, 70, 28, 4, 104, 10, 40, 88, 48, 26, 22, 36, 68, 12, 80, 60, 58, 74, 2, 54, 18, 0}, a(10)={0, 20, 60, 14, 94, 88, 102, 30, 84, 52, 40, 48, 76, 18, 86, 68, 70, 92, 28, 90, 66, 62, 78, 8, 64, 34, 24, 34, 64, 8, 78, 62, 66, 90, 28, 92, 70, 68, 86, 18, 76, 48, 40, 52, 84, 30, 102, 88, 94, 14, 60, 20, 0}, a(11)={0, 22, 66, 26, 8, 12, 38, 86, 50, 36, 44, 74, 20, 94, 84, 96, 24, 80, 52, 46, 62, 100, 54, 30, 28, 48, 90, 48, 28, 30, 54, 100, 62, 46, 52, 80, 24, 96, 84, 94, 20, 74, 44, 36, 50, 86, 38, 12, 8, 26, 66, 22, 0}, a(12)={0, 24, 72, 38, 28, 42, 80, 36, 16, 20, 48, 100, 70, 64, 82, 18, 84, 68, 76, 2, 58, 32, 30, 52, 98, 62, 50, 62, 98, 52, 30, 32, 58, 2, 76, 68, 84, 18, 82, 64, 70, 100, 48, 20, 16, 36, 80, 42, 28, 38, 72, 24, 0}, a(13)={0, 26, 78, 50, 48, 72, 16, 92, 88, 4, 52, 20, 14, 34, 80, 46, 38, 56, 100, 64, 54, 70, 6, 74, 62, 76, 10, 76, 62, 74, 6, 70, 54, 64, 100, 56, 38, 46, 80, 34, 14, 20, 52, 4, 88, 92, 16, 72, 48, 50, 78, 26, 0}, a(14)={0, 28, 84, 62, 68, 102, 58, 42, 54, 94, 56, 46, 64, 4, 78, 74, 98, 44, 18, 20, 50, 2, 88, 96, 26, 90, 76, 90, 26, 96, 88, 2, 50, 20, 18, 44, 98, 74, 78, 4, 64, 46, 56, 94, 54, 42, 58, 102, 68, 62, 84, 28, 0}, a(15)={0, 30, 90, 74, 88, 26, 100, 98, 20, 78, 60, 72, 8, 80, 76, 102, 52, 32, 42, 82, 46, 40, 64, 12, 96, 104, 36, 104, 96, 12, 64, 40, 46, 82, 42, 32, 52, 102, 76, 80, 8, 72, 60, 78, 20, 98, 100, 26, 88, 74, 90, 30, 0}, a(16)={0, 32, 96, 86, 2, 56, 36, 48, 92, 62, 64, 98, 58, 50, 74, 24, 6, 20, 66, 38, 42, 78, 40, 34, 60, 12, 102, 12, 60, 34, 40, 78, 42, 38, 66, 20, 6, 24, 74, 50, 58, 98, 64, 62, 92, 48, 36, 56, 2, 86, 96, 32, 0}, a(17)={0, 34, 102, 98, 22, 86, 78, 104, 58, 46, 68, 18, 2, 20, 72, 52, 66, 8, 90, 100, 38, 10, 16, 56, 24, 26, 62, 26, 24, 56, 16, 10, 38, 100, 90, 8, 66, 52, 72, 20, 2, 18, 68, 46, 58, 104, 78, 86, 22, 98, 102, 34, 0}, a(18)={0, 36, 2, 4, 42, 10, 14, 54, 24, 30, 72, 44, 52, 96, 70, 80, 20, 102, 8, 56, 34, 48, 98, 78, 94, 40, 22, 40, 94, 78, 98, 48, 34, 56, 8, 102, 20, 80, 70, 96, 52, 44, 72, 30, 24, 54, 14, 10, 42, 4, 2, 36, 0}, a(19)={0, 38, 8, 16, 62, 40, 56, 4, 96, 14, 76, 70, 102, 66, 68, 2, 80, 90, 32, 12, 30, 86, 74, 100, 58, 54, 88, 54, 58, 100, 74, 86, 30, 12, 32, 90, 80, 2, 68, 66, 102, 70, 76, 14, 96, 4, 56, 40, 62, 16, 8, 38, 0}, a(20)={0, 40, 14, 28, 82, 70, 98, 60, 62, 104, 80, 96, 46, 36, 66, 30, 34, 78, 56, 74, 26, 18, 50, 16, 22, 68, 48, 68, 22, 16, 50, 18, 26, 74, 56, 78, 34, 30, 66, 36, 46, 96, 80, 104, 62, 60, 98, 70, 82, 28, 14, 40, 0}, a(21)={0, 42, 20, 40, 102, 100, 34, 10, 28, 88, 84, 16, 96, 6, 64, 58, 94, 66, 80, 30, 22, 56, 26, 38, 92, 82, 8, 82, 92, 38, 26, 56, 22, 30, 80, 66, 94, 58, 64, 6, 96, 16, 84, 88, 28, 10, 34, 100, 102, 40, 20, 42, 0}, a(22)={0, 44, 26, 52, 16, 24, 76, 66, 100, 72, 88, 42, 40, 82, 62, 86, 48, 54, 104, 92, 18, 94, 2, 60, 56, 96, 74, 96, 56, 60, 2, 94, 18, 92, 104, 54, 48, 86, 62, 82, 40, 42, 88, 72, 100, 66, 76, 24, 16, 52, 26, 44, 0}, a(23)={0, 46, 32, 64, 36, 54, 12, 16, 66, 56, 92, 68, 90, 52, 60, 8, 2, 42, 22, 48, 14, 26, 84, 82, 20, 4, 34, 4, 20, 82, 84, 26, 14, 48, 22, 42, 2, 8, 60, 52, 90, 68, 92, 56, 66, 16, 12, 54, 36, 64, 32, 46, 0}, a(24)={0, 48, 38, 76, 56, 84, 54, 72, 32, 40, 96, 94, 34, 22, 58, 36, 62, 30, 46, 4, 10, 64, 60, 104, 90, 18, 100, 18, 90, 104, 60, 64, 10, 4, 46, 30, 62, 36, 58, 22, 34, 94, 96, 40, 32, 72, 54, 84, 56, 76, 38, 48, 0}, a(25)={0, 50, 44, 88, 76, 8, 96, 22, 104, 24, 100, 14, 84, 98, 56, 64, 16, 18, 70, 66, 6, 102, 36, 20, 54, 32, 60, 32, 54, 20, 36, 102, 6, 66, 70, 18, 16, 64, 56, 98, 84, 14, 100, 24, 104, 22, 96, 8, 76, 88, 44, 50, 0}, a(26)={0, 52, 50, 100, 96, 38, 32, 78, 70, 8, 104, 40, 28, 68, 54, 92, 76, 6, 94, 22, 2, 34, 12, 42, 18, 46, 20, 46, 18, 42, 12, 34, 2, 22, 94, 6, 76, 92, 54, 68, 28, 40, 104, 8, 70, 78, 32, 38, 96, 100, 50, 52, 0}, a(27)={0, 54, 56, 6, 10, 68, 74, 28, 36, 98, 2, 66, 78, 38, 52, 14, 30, 100, 12, 84, 104, 72, 94, 64, 88, 60, 86, 60, 88, 64, 94, 72, 104, 84, 12, 100, 30, 14, 52, 38, 78, 66, 2, 98, 36, 28, 74, 68, 10, 6, 56, 54, 0}, a(28)={0, 56, 62, 18, 30, 98, 10, 84, 2, 82, 6, 92, 22, 8, 50, 42, 90, 88, 36, 40, 100, 4, 70, 86, 52, 74, 46, 74, 52, 86, 70, 4, 100, 40, 36, 88, 90, 42, 50, 8, 22, 92, 6, 82, 2, 84, 10, 98, 30, 18, 62, 56, 0}, a(29)={0, 58, 68, 30, 50, 22, 52, 34, 74, 66, 10, 12, 72, 84, 48, 70, 44, 76, 60, 102, 96, 42, 46, 2, 16, 88, 6, 88, 16, 2, 46, 42, 96, 102, 60, 76, 44, 70, 48, 84, 72, 12, 10, 66, 74, 34, 52, 22, 50, 30, 68, 58, 0}, a(30)={0, 60, 74, 42, 70, 52, 94, 90, 40, 50, 14, 38, 16, 54, 46, 98, 104, 64, 84, 58, 92, 80, 22, 24, 86, 102, 72, 102, 86, 24, 22, 80, 92, 58, 84, 64, 104, 98, 46, 54, 16, 38, 14, 50, 40, 90, 94, 52, 70, 42, 74, 60, 0}, a(31)={0, 62, 80, 54, 90, 82, 30, 40, 6, 34, 18, 64, 66, 24, 44, 20, 58, 52, 2, 14, 88, 12, 104, 46, 50, 10, 32, 10, 50, 46, 104, 12, 88, 14, 2, 52, 58, 20, 44, 24, 66, 64, 18, 34, 6, 40, 30, 82, 90, 54, 80, 62, 0}, a(32)={0, 64, 86, 66, 4, 6, 72, 96, 78, 18, 22, 90, 10, 100, 42, 48, 12, 40, 26, 76, 84, 50, 80, 68, 14, 24, 98, 24, 14, 68, 80, 50, 84, 76, 26, 40, 12, 48, 42, 100, 10, 90, 22, 18, 78, 96, 72, 6, 4, 66, 86, 64, 0}, a(33)={0, 66, 92, 78, 24, 36, 8, 46, 44, 2, 26, 10, 60, 70, 40, 76, 72, 28, 50, 32, 80, 88, 56, 90, 84, 38, 58, 38, 84, 90, 56, 88, 80, 32, 50, 28, 72, 76, 40, 70, 60, 10, 26, 2, 44, 46, 8, 36, 24, 78, 92, 66, 0}, a(34)={0, 68, 98, 90, 44, 66, 50, 102, 10, 92, 30, 36, 4, 40, 38, 104, 26, 16, 74, 94, 76, 20, 32, 6, 48, 52, 18, 52, 48, 6, 32, 20, 76, 94, 74, 16, 26, 104, 38, 40, 4, 36, 30, 92, 10, 102, 50, 66, 44, 90, 98, 68, 0}, a(35)={0, 70, 104, 102, 64, 96, 92, 52, 82, 76, 34, 62, 54, 10, 36, 26, 86, 4, 98, 50, 72, 58, 8, 28, 12, 66, 84, 66, 12, 28, 8, 58, 72, 50, 98, 4, 86, 26, 36, 10, 54, 62, 34, 76, 82, 52, 92, 96, 64, 102, 104, 70, 0}, a(36)={0, 72, 4, 8, 84, 20, 28, 2, 48, 60, 38, 88, 104, 86, 34, 54, 40, 98, 16, 6, 68, 96, 90, 50, 82, 80, 44, 80, 82, 50, 90, 96, 68, 6, 16, 98, 40, 54, 34, 86, 104, 88, 38, 60, 48, 2, 28, 20, 84, 8, 4, 72, 0}, a(37)={0, 74, 10, 20, 104, 50, 70, 58, 14, 44, 42, 8, 48, 56, 32, 82, 100, 86, 40, 68, 64, 28, 66, 72, 46, 94, 4, 94, 46, 72, 66, 28, 64, 68, 40, 86, 100, 82, 32, 56, 48, 8, 42, 44, 14, 58, 70, 50, 104, 20, 10, 74, 0}, a(38)={0, 76, 16, 32, 18, 80, 6, 8, 86, 28, 46, 34, 98, 26, 30, 4, 54, 74, 64, 24, 60, 66, 42, 94, 10, 2, 70, 2, 10, 94, 42, 66, 60, 24, 64, 74, 54, 4, 30, 26, 98, 34, 46, 28, 86, 8, 6, 80, 18, 32, 16, 76, 0}, a(39)={0, 78, 22, 44, 38, 4, 48, 64, 52, 12, 50, 60, 42, 102, 28, 32, 8, 62, 88, 86, 56, 104, 18, 10, 80, 16, 30, 16, 80, 10, 18, 104, 56, 86, 88, 62, 8, 32, 28, 102, 42, 60, 50, 12, 52, 64, 48, 4, 38, 44, 22, 78, 0}, a(40)={0, 80, 28, 56, 58, 34, 90, 14, 18, 102, 54, 86, 92, 72, 26, 60, 68, 50, 6, 42, 52, 36, 100, 32, 44, 30, 96, 30, 44, 32, 100, 36, 52, 42, 6, 50, 68, 60, 26, 72, 92, 86, 54, 102, 18, 14, 90, 34, 58, 56, 28, 80, 0}, a(41)={0, 82, 34, 68, 78, 64, 26, 70, 90, 86, 58, 6, 36, 42, 24, 88, 22, 38, 30, 104, 48, 74, 76, 54, 8, 44, 56, 44, 8, 54, 76, 74, 48, 104, 30, 38, 22, 88, 24, 42, 36, 6, 58, 86, 90, 70, 26, 64, 78, 68, 34, 82, 0}, a(42)={0, 84, 40, 80, 98, 94, 68, 20, 56, 70, 62, 32, 86, 12, 22, 10, 82, 26, 54, 60, 44, 6, 52, 76, 78, 58, 16, 58, 78, 76, 52, 6, 44, 60, 54, 26, 82, 10, 22, 12, 86, 32, 62, 70, 56, 20, 68, 94, 98, 80, 40, 84, 0}, a(43)={0, 86, 46, 92, 12, 18, 4, 76, 22, 54, 66, 58, 30, 88, 20, 38, 36, 14, 78, 16, 40, 44, 28, 98, 42, 72, 82, 72, 42, 98, 28, 44, 40, 16, 78, 14, 36, 38, 20, 88, 30, 58, 66, 54, 22, 76, 4, 18, 12, 92, 46, 86, 0}, a(44)={0, 88, 52, 104, 32, 48, 46, 26, 94, 38, 70, 84, 80, 58, 18, 66, 96, 2, 102, 78, 36, 82, 4, 14, 6, 86, 42, 86, 6, 14, 4, 82, 36, 78, 102, 2, 96, 66, 18, 58, 80, 84, 70, 38, 94, 26, 46, 48, 32, 104, 52, 88, 0}, a(45)={0, 90, 58, 10, 52, 78, 88, 82, 60, 22, 74, 4, 24, 28, 16, 94, 50, 96, 20, 34, 32, 14, 86, 36, 76, 100, 2, 100, 76, 36, 86, 14, 32, 34, 20, 96, 50, 94, 16, 28, 24, 4, 74, 22, 60, 82, 88, 78, 52, 10, 58, 90, 0}, a(46)={0, 92, 64, 22, 72, 2, 24, 32, 26, 6, 78, 30, 74, 104, 14, 16, 4, 84, 44, 96, 28, 52, 62, 58, 40, 8, 68, 8, 40, 58, 62, 52, 28, 96, 44, 84, 4, 16, 14, 104, 74, 30, 78, 6, 26, 32, 24, 2, 72, 22, 64, 92, 0}, a(47)={0, 94, 70, 34, 92, 32, 66, 88, 98, 96, 82, 56, 18, 74, 12, 44, 64, 72, 68, 52, 24, 90, 38, 80, 4, 22, 28, 22, 4, 80, 38, 90, 24, 52, 68, 72, 64, 44, 12, 74, 18, 56, 82, 96, 98, 88, 66, 32, 92, 34, 70, 94, 0}, a(48)={0, 96, 76, 46, 6, 62, 2, 38, 64, 80, 86, 82, 68, 44, 10, 72, 18, 60, 92, 8, 20, 22, 14, 102, 74, 36, 94, 36, 74, 102, 14, 22, 20, 8, 92, 60, 18, 72, 10, 44, 68, 82, 86, 80, 64, 38, 2, 62, 6, 46, 76, 96, 0}, a(49)={0, 98, 82, 58, 26, 92, 44, 94, 30, 64, 90, 2, 12, 14, 8, 100, 78, 48, 10, 70, 16, 60, 96, 18, 38, 50, 54, 50, 38, 18, 96, 60, 16, 70, 10, 48, 78, 100, 8, 14, 12, 2, 90, 64, 30, 94, 44, 92, 26, 58, 82, 98, 0}, a(50)={0, 100, 88, 70, 46, 16, 86, 44, 102, 48, 94, 28, 62, 90, 6, 22, 32, 36, 34, 26, 12, 98, 72, 40, 2, 64, 14, 64, 2, 40, 72, 98, 12, 26, 34, 36, 32, 22, 6, 90, 62, 28, 94, 48, 102, 44, 86, 16, 46, 70, 88, 100, 0}, a(51)={0, 102, 94, 82, 66, 46, 22, 100, 68, 32, 98, 54, 6, 60, 4, 50, 92, 24, 58, 88, 8, 30, 48, 62, 72, 78, 80, 78, 72, 62, 48, 30, 8, 88, 58, 24, 92, 50, 4, 60, 6, 54, 98, 32, 68, 100, 22, 46, 66, 82, 94, 102, 0}, and a(52)={0, 104, 100, 94, 86, 76, 64, 50, 34, 16, 102, 80, 56, 30, 2, 78, 46, 12, 82, 44, 4, 68, 24, 84, 36, 92, 40, 92, 36, 84, 24, 68, 4, 44, 82, 12, 46, 78, 2, 30, 56, 80, 102, 16, 34, 50, 64, 76, 86, 94, 100, 104, 0}.

Herein it should be noted that a number in the foregoing sequence set is equal to a number obtained after a modulo-2N operation is performed on rn(n+1) in the generation formula 1, and represents a complex-number point on a unit circle. For example, 104 in a(52) is the second element in a(52), corresponds to n=1, (the first element corresponds to n=0), and represents a complex number $$e^{\frac{i2\pi}{2*53}*52*1*(1+1)} = e^{\frac{i2\pi}{2*53}*104}.$$

In an embodiment of the present disclosure, each numeric value in the set may also be illustrated in a complete complex-number expression manner according to an actual requirement, which is not particularly limited in the present disclosure.

Afterward, a cyclic shift may be performed on the sequences in the basic sequence set to generate a complete long training sequence set C'. For example, as described above, if the sequence length is 53, a cyclic shift of 1 to 52 positions may be performed on, for example, a(1), to generate sequences a(1, 0), . . . , a(1, t), . . . , a(1, 52), where t indicates a quantity of positions cyclically shifted.

That is C'={â$^{(1,0)}$, . . . â$^{(1,52)}$, . . . , â$^{(r,0)}$, . . . â$^{(r,52)}$, . . . , â$^{(52,0)}$, . . . , â$^{(52,52)}$}, r={1, 2, . . . , 52}, where:

a(1, 0)={0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0}, a(1, 1)={2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0}, a(1, 2)={6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2}, a(1, 3)={12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6}, a(1, 4)={20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12}, a(1, 5)={30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20}, a(1, 6)={42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30}, a(1, 7)={56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42}, a(1, 8)={72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56}, a(1, 9)={90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72}, a(1, 10)={4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90}, a(1, 11)={26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4}, a(1, 12)={50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26}, a(1, 13)={76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50}, a(1, 14)={104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76}, a(1, 15)={28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104}, a(1, 16)={60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28}, a(1, 17)={94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60}, a(1, 18)={24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94}, a(1, 19)={62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24}, a(1, 20)={102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62}, a(1, 21)={38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102}, a(1, 22)={82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38}, a(1, 23)={22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82}, a(1, 24)={70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22}, a(1, 25)={14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70}, a(1, 26)={66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14}, a(1, 27)={14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66}, a(1, 28)={70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14}, a(1, 29)={22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70}, a(1, 30)={82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22}, a(1, 31)={38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82}, a(1, 32)={102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38}, a(1, 33)={62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102}, a(1, 34)={24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62}, a(1, 35)={94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24}, a(1, 36)={60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94}, a(1, 37)={28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60}, a(1, 38)={104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28}, a(1, 39)={76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104}, a(1, 40)={50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76}, a(1, 41)={26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50}, a(1, 42)={4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26}, a(1, 43)={90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4}, a(1, 44)={72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90}, a(1, 45)={56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72}, a(1, 46)={42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56}, a(1, 47)={30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42}, a(1, 48)={20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30}, a(1, 49)={12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20}, a(1, 50)={6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12}, a(1, 51)={2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6}, and a(1, 52)={0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2}.

The same method may be used to perform a cyclic shift on a(2) to a(52), and to avoid repetition, description thereof is omitted herein.

As described above, the long training sequence set C' is generated in an embodiment of the present disclosure. That is, in the method for generating the long training sequence according to an embodiment of the present disclosure, for example, if a quantity of available subcarriers in the system is 53, if a Zadoff-Chu sequence with a length of 53 is selected, 52×53=2756 long training sequences may be generated. Therefore, 2756 devices can be distinguished by using the long training sequences generated according to the embodiment of the present disclosure, and this quantity is far greater than a quantity of devices that can be distinguished by a partial association identifier, which may meet a development requirement as a quantity of users increases quickly.

It should be understood that the foregoing illustrated method for determining each parameter in the method for generating the long training sequence is only an example for description. A person skilled in the art may modify or select a used parameter at random according to the communications system to which the embodiment of the present disclosure is applied. For example, the length of the long training sequence may be set at random. For another example, after the foregoing basic long training sequence set C is obtained, no cyclic shift is performed, but instead, the basic long training sequence set C may be directly used as a long raining sequence set C', or cyclic shifts may be performed in a length range of the long training sequence for any times (in other words, any quantity of positions), which is not particularly limited in the present disclosure. In addition, in the embodiment of the present disclosure, for example, a pseudo-random sequence may also be used as a basic sequence for generating multiple LTSs used by the communications system, to generate the multiple different LTSs.

In addition, in the embodiment of the present disclosure, the device A may further number each long training sequence in the long training sequence set C' determined in the foregoing step S110, for example, may set sequence numbers of basic long training sequences to i=1, ..., 52. Therefore, a shift of each long training sequence relative to the basic long training sequence is j=0, 1, ..., 52. Therefore, the sequence number of each long training sequence in the long training sequence set C' may be set to LTS ID=(i−1)×53+j.

In the basic long training sequence set C, sequence numbers of sequences are set to i=1, ..., 52.

In the long training sequence set C', a shift of each long training sequence relative to the basic long training sequence is j=0, 1, ..., 52. Therefore, sequence numbers of sequences may be set to LTS ID=(i−1)×53+j.

It should be understood that the foregoing illustrated numbering method is only an example for description, and that the present disclosure is not limited thereto. Other numbering methods that can be used to uniquely distinguish a long training sequence from the long training sequence set C' all fall within the protection scope of the present disclosure.

In step S120, the device A may group each receiving device in the system to determine at least one receiving device set. Each receiving device in a same receiving device set is a target receiving device of same data.

In the embodiment of the present disclosure, the foregoing grouping may be performed according to a preset rule. The preset rule may include the following rules:

1. Optionally, the determining at least one receiving device set includes:

determining the at least one receiving device set according to grouping information of each receiving device in the communications system, where the grouping information is allocated by the communications system and used to uniquely indicate one receiving device group in the communications system, and the receiving device group includes at least one receiving device.

In addition, optionally, the grouping information includes a group identifier Group ID or a cell identifier Cell ID.

Specifically, for example, in a wireless local area network, for receiving devices with a same group identifier (Group ID), data transmitted by a transmitting device may be the same. For another example, in a cellular network, for receiving devices with a same cell identifier (Cell ID), data transmitted by a transmitting device is generally the same. Therefore, in the embodiment of the present disclosure, grouping may be performed according to a group identifier or a cell identifier of each device in the system, and in addition, in the present disclosure, group identifiers or cell identifiers of receiving devices in a receiving device set may be the same or may be different, which is not particularly limited in the present disclosure.

It should be understood that the foregoing illustrated grouping criteria are only examples for description, and that the present disclosure is not limited thereto. Other parameters that can be used as a grouping criterion all fall within the protection scope of the present disclosure.

It should be noted that in the embodiment of the present disclosure, for another example, if same data needs to be transmitted to all receiving devices in the system in different time periods, transmitting devices may also be grouped at random.

2. Optionally, the determining at least one receiving device set includes:

determining the at least one receiving device set according to feature information of each receiving device in the communications system, where the feature information includes any one of the following information:

a service type of a service accessed by the receiving device, a geographical location of the receiving device, an access permission of the receiving device, and a priority of the receiving device.

Specifically, for information that has strong pertinence to a geographical location, for example, earthquake and tsunami warning information and weather forecast information, target receiving devices of the information may be located at a same geographical location. Therefore, in the embodiment of the present disclosure, grouping may be performed according to the geographical location of each device in the system. In addition, the geographical location may be at any level, and is not particularly limited in the present disclosure, for example, may be a city level, may be a province level, or may be a country level.

For receiving devices that access services of a same service type, data that needs to be transmitted by a transmitting device may be the same. Therefore, in the embodiment of the present disclosure, grouping may be performed according to the service type of the services accessed by the devices in the system, and in addition, the service type may be set at random, and is not particularly limited in the present disclosure. For example, a video service, a web browse service, and a voice call service may be illustrated.

For receiving devices that have a same access permission, data that needs to be transmitted by a transmitting device may be the same. For example, for a receiving device whose access permission is only web browse, data that can be received by the receiving device is all data of a web page type. For another example, for a receiving device that is allowed to access only a specified server, data that can be received by the receiving device all comes from the same server. Therefore, in the embodiment of the present disclosure, grouping may be performed according to an access permission of each device in the system, and in addition, the access permission may be any permission, and is not particularly limited in the present disclosure. For example, a permission that is set according to a service type allowed to be accessed, a permission that is set according to a geographical location of a receiving device, and a permission that is set according to a geographical location of a server that is allowed to be accessed by a receiving device may be illustrated.

3. Optionally, the determining at least one receiving device set includes:

determining the at least one receiving device set according to data that needs to be transmitted, so that data that needs to be transmitted to each receiving device in a same receiving device set is the same; and the method further includes:

transmitting first indication information, where the first indication information is used to indicate receiving devices included in each receiving device set.

Specifically, the device A may determine each receiving device (hereinafter for ease of description, referred to as a to-be-communicated receiving device for short) to which data needs to be transmitted in a specified time period, and group the to-be-communicated receiving devices according to the data that needs to be transmitted, that is, group, into a same receiving device set, to-be-communicated receiving devices to which same data needs to be transmitted.

In this case, because the process is determined by the transmitting device, each receiving device in the system cannot know a receiving device set to which each receiving device belongs. Therefore, the device A needs to further transmit information (the first indication information) indicating receiving devices included in each receiving device set, to each receiving device in the system. Therefore, each receiving device in the system may determine, according to the first indication information, the receiving device set to which each receiving device belongs.

In addition, in the embodiment of the present disclosure, the first indication information may be specifically a part or all of identity information of the receiving devices included in each receiving device set. The identity information is described later in detail.

In step S130, the device A may select, according to a quantity of the receiving device sets determined in step S120, a same quantity of long training sequences from the foregoing determined long training sequence set C', and use the long training sequences as set-use long training sequences.

Afterward, the device A may perform one-to-one mapping on the receiving device sets determined in step S120 and the set-use long training sequences determined in step S130, that is, in the embodiment of the present disclosure, a receiving device set corresponds only to one set-use long training sequence, so that effect and reliability of the data transmission method in the embodiment of the present disclosure are improved.

It should be noted that because different receiving device sets correspond to different set-use long training sequences, in an embodiment of the present disclosure, the quantity of determined receiving device sets needs to be less than or equal to a quantity of long training sequences included in the determined long training sequence set.

Optionally, the first mapping relationship is a mapping relationship between each set-use long training sequence and third sub-identity information in identity information of each receiving device in a corresponding receiving device set, where one piece of the identity information is used to uniquely indicate one receiving device in the communications system, and the third sub-identity information is a part or all of the identity information.

Specifically, for example, the first mapping relationship may be a mapping relationship between identity information of receiving devices in the receiving device set and the set-use long training sequences.

In addition, in an embodiment of the present disclosure, the device A may select identity information of a device, where the identity information of the device is used to generate the foregoing first mapping relationship.

Optionally, the identity information is any one of the following information:

a Media Access Control MAC address, an Internet Protocol IP address, a basic service set identifier BSSID, an association identifier AID, a mobile phone number, an international mobile subscriber identity IMSI, and an international mobile equipment identity IMEI.

Specifically, in an embodiment of the present disclosure, the identity information of the device refers to information that can uniquely identify the device when the communications system in an embodiment of the present disclosure is used. It should be noted that in the embodiment of the present disclosure, the identity information may be factory-set information in the device, or may be allocated by the system to the device, which is not particularly limited in the present disclosure.

In an embodiment of the present disclosure, the identity information may include information such as a Media Access Control (MAC, Media Access Control) address, an Internet Protocol (IP, Internet Protocol) address, a basic service set identifier (BSSID, Basic Service Set Identifier), an association identifier (AID, Association Identifier), a mobile phone number, an international mobile subscriber identity (IMSI, International Mobile Subscriber Identity), and an international mobile equipment identity (IMEI, International Mobile Equipment Identity). It should be understood that a user identifier in an embodiment of the present disclosure is not limited to the foregoing information. Other information elements that can uniquely indicate the user identifier all fall within the scope of an embodiment of the present disclosure.

In an embodiment of the present disclosure, the device A may select and use identity information that can uniquely identify the terminal device in each communications system. Therefore, all terminal devices that can be identified by the identity information may be considered as devices connected to and using the communications system in the embodiment of the present disclosure.

For ease of understanding, the following uses a MAC address as identity information for description.

Figure 2:
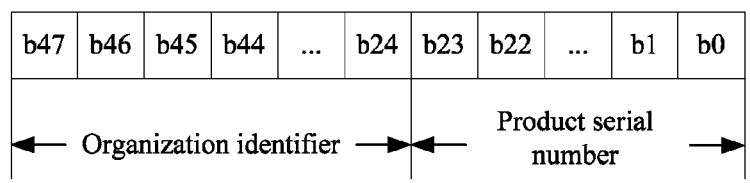
FIG. 2 is a structural diagram of a MAC address.

First, a structure of the MAC address is described. FIG. 2 shows the structure of the MAC address. As shown in FIG. 2, the MAC address includes 48 bits, where:

an organization unique identifier (OUI, Organization Unique Identifier) occupies bits b24 to b47 of the MAC address, is allocated by the Institute of Electrical and Electronics Engineers (IEEE, Institute of Electrical and Electronics Engineers), and may be understood as an identifier of a device manufacturer; and a product serial number (PSN, Product Serial Number) occupies bits b0 to b23 of the MAC address, and is allocated by a device manufacturer.

In an embodiment of the present disclosure, for example, if an organization unique identifier (an example of the third sub-identity information) is different from organization unique identifiers of other receiving devices in the system, the organization unique identifier and the set-use long training sequence may be used to constitute the first mapping relationship.

Certainly, the whole MAC address (another example of the third sub-identity information) and the set-use long training sequence may be used to constitute the first mapping relationship.

The following Table 1 shows an example of the first mapping relationship in the embodiment of the present disclosure.

TABLE 1

| Sequence number of a receiving device set | Identity information of each included receiving device | Sequence number of a corresponding long training sequence in a long training sequence set |
|---|---|---|
| 1 | MAC address of each receiving device in a receiving device set 1 | 1 |
| 2 | MAC address of each receiving device in a receiving device set 2 | 2 |
| ... | ... | ... |
| n | MAC address of each receiving device in a receiving device set n | n |

It should be understood that the mapping relationship illustrated in the foregoing Table 1 is only an example for description, and that the present disclosure is not limited thereto. For example, if a receiving device uses a rule same as that in step S110 to generate a long training sequence set (same as the long training sequence set generated by the device A), in the third column of Table 1, only a sequence number of a corresponding set-use long training sequence in the long training sequence set may be identified. Certainly, the set-use long training sequence itself may also be directly recorded in Table 1 to replace the sequence number.

In addition, other identity information may also be used to replace the MAC address and recorded in Table 1.

As shown in the foregoing rule 1, for example, in a cellular network, for receiving devices that access a same base station, the system allocates a same Cell ID (an example of the grouping information).

Therefore, in the embodiment of the present disclosure, if the device A performs grouping according to the group identifier or cell identifier of each device in the system, the grouping information and the set-use long training sequence may be used to constitute the first mapping relationship.

For another example, in a wireless local area network, for receiving devices that access a same access point (AP, Access Point), the system allocates a same Group ID (another example of the grouping information).

The following Table 2 shows another example of the first mapping relationship in an embodiment of the present disclosure.

TABLE 2

| Sequence number of a receiving device set | Identity information of each included receiving device | Sequence number of a corresponding long training sequence in a long training sequence set |
|---|---|---|
| 1 | Group ID of each receiving device in a receiving device set 1 | 1 |
| 2 | Group ID of each receiving device in a receiving device set 2 | 2 |
| ... | ... | ... |
| n | Group ID of each receiving device in a receiving device set n | n |

It should be understood that the mapping relationship illustrated in the foregoing Table 2 is only an example for description, and that the present disclosure is not limited thereto. For example, if a receiving device uses a rule same as that in step S110 to generate a long training sequence set (same as the long training sequence set generated by the device A), in the third column of Table 2, only a sequence number of a corresponding set-use long training sequence in the long training sequence set may be identified. Certainly, the set-use long training sequence itself may also be directly recorded in Table 2 to replace the sequence number.

In addition, other grouping information may also be used to replace the Group ID and recorded in Table 2. It should be noted that grouping information of receiving devices in a receiving device set may be the same or may be different, which is not particularly limited in the present disclosure.

As shown in the foregoing rule 2, if grouping is performed according to the feature information of the receiving device, the feature information and the set-use long training sequence may be used to constitute the first mapping relationship.

The following Table 3 shows another example of the first mapping relationship in the embodiment of the present disclosure.

TABLE 3

| Sequence number of a receiving device set | Identity information of each included receiving device | Sequence number of a corresponding long training sequence in a long training sequence set |
|---|---|---|
| 1 | Geographical location of each receiving device in a receiving device set 1 | 1 |
| 2 | Geographical location of each receiving device in a receiving device set 2 | 2 |
| ... | ... | ... |
| n | Geographical location of each receiving device in a receiving device set n | n |

It should be understood that the mapping relationship illustrated in the foregoing Table 3 is only an example for description, and that the present disclosure is not limited thereto. For example, if a receiving device uses a rule same as that in step S110 to generate a long training sequence set (same as the long training sequence set generated by the device A), in the third column of Table 3, only a sequence number of a corresponding set-use long training sequence in the long training sequence set may be identified. Certainly, the set-use long training sequence itself may also be directly recorded in Table 3 to replace the sequence number.

In addition, other feature information may also be used to replace the geographical location and recorded in Table 3. It should be noted that feature information of receiving devices in a receiving device set may be the same or may be different, which is not particularly limited in the present disclosure.

Optionally, in the embodiment of the present disclosure, the method further includes:

transmitting second indication information, where the second indication information is used to indicate the first mapping relationship.

Specifically, the device A may transmit the foregoing determined mapping relationship (the first mapping relationship) between each receiving device set and each set-use long training sequence to each device in each receiving device set or each device in the system. Therefore, each receiving device in the system may determine the first mapping relationship according to the second indication information, and may perform processing according to the first mapping relationship (this process is described later in detail).

In step S140, when the device A needs to transmit data (the first data) to a receiving device set (the target receiving device set), the device A may select, according to the first mapping relationship, a set-use long training sequence corresponding to the receiving device set and use the set-use long training sequence as the target set-use long training sequence.

In step S150, the device A may perform encapsulation processing on the data that needs to be transmitted, to generate a data packet (the first data packet). In the embodiment of the present disclosure, because the used long training sequence (the target set-use long training sequence) is different from a long training sequence used in the prior art, herein a process for generating a long training sequence symbol is mainly described in detail.

Specifically, when a quantity of subcarriers used in the system is greater than a quantity of elements in a long training sequence (or a sequence length), direct-current carrier components may be set to 0. Afterward, subcarriers with "a quantity same as the quantity of elements in the long training sequence" are selected from the indirect-current carrier components, and the elements in the long training sequence are mapped to the selected subcarriers one by one. Finally, a specific numeric value or a cyclic shift element of the long training sequence is inserted in the remaining subcarriers. For example, a numeric value "1" is inserted, used by the receiving device for channel estimation; or a numeric value "0" may be inserted, that is, no information is transmitted on the subcarriers.

When the quantity of subcarriers is equal to the quantity of elements in the long training sequence, one-to-one mapping may be performed on the elements in the long training sequence and the subcarriers, and afterward the direct-current carrier components may be set to 0.

When the quantity of subcarriers is less than the quantity of elements in the long training sequence, elements with "a quantity same as the quantity of subcarriers" may be selected from the elements in the long training sequence. Afterward, one-to-one mapping is performed on the selected elements and the subcarriers. Finally, the direct-current carrier components are set to 0.

In the embodiment of the present disclosure, the device A may add the target set-use long training sequence to the long training sequence field (field) in the physical layer of the data packet, and then transmit the data packet to each receiving device.

It should be noted that in the embodiment of the present disclosure, "the first long training sequence symbol" refers to a valid bit (or a valid character string) in the long training sequence field of the transmitted data packet, and may be generated according to the target set-use long training sequence (for example, by using a preset rule). Therefore, the receiving device can determine, by parsing the first long training sequence symbol, the long training sequence (the target set-use long training sequence) indicated by the first long training sequence symbol. The foregoing method and process may be the same as or similar to those in the prior art, and to avoid repetition, description thereof is omitted herein. The following omits description about the same or similar cases.

In step S160, the device A, for example, may transmit the first data packet to each device (including the target receiving device set) in the system in a broadcast manner over an air interface. In an embodiment of the present disclosure, the method and process for transmitting the data packet may be the same as those in the prior art, and to avoid repetition, description thereof is omitted herein.

A device (hereinafter for ease of understanding and description, unless otherwise specified, a device C is used as an example for describing an action of the receiving device) that can receive the first indication information and the first data packet may determine the first mapping relationship. In the embodiment of the present disclosure, the method and process for determining the first mapping relationship by the device C may be the same as or correspond to the method and process executed by the device A in the foregoing step S130, and to avoid repetition, description thereof is omitted herein.

Afterward, the device C may determine a receiving device set (a first receiving device set) to which the device C belongs.

Specifically, for example, the device A (transmitting device) and the device C (receiving device) may determine each receiving device set according to a same rule (for example, the foregoing rule 1 or rule 2).

Afterward, the device C may determine, according to a parameter used by the foregoing rule, a receiving device set to which the device C belongs. For example, if a Group ID is used for grouping, the device C may determine, according to a Group ID of the device C, the receiving device set to which the device C belongs.

For another example, if the device A groups to-be-communicated receiving devices according to data that needs to be transmitted, the device A transmits information (the first indication information) indicating receiving devices included in each receiving device set, to each receiving device in the system. Therefore, the device C may determine, according to the first indication information, the receiving device set to which the device C belongs. In addition, in the embodiment of the present disclosure, the first indication information may be specifically a part or all of identity information of the receiving devices included in each receiving device set.

For another example, in the embodiment of the present disclosure, if the device A transmits the second indication information (used to indicate the first mapping relationship), if the first mapping relationship is a mapping relationship (an example of the first mapping relationship) between a set-use long training sequence and third sub-identity information of each receiving device in a receiving device set, the device C may determine, according to the third sub-identity information of the device C, a receiving device set to which the device C belongs.

Herein it should be noted that in an embodiment of the present disclosure, the method for selecting the third sub-identity information by the receiving device needs to be consistent with the method for selecting the third sub-identity information by the transmitting device.

Afterward, after the device C receives the data packet (the first data packet) transmitted by the device A, the device C may parse the long training sequence field in the physical layer of the first data packet to obtain the long training sequence (the target set-use long training sequence) carried in the first data packet.

Afterward, the device C may determine, according to the target long training sequence, the receiving device set (the first receiving device set) to which the device C belongs, and the first mapping relationship, whether the device C is the target receiving device of the first data packet.

Specifically, the device C may determine, according to the target set-use long training sequence and the first mapping relationship, the target receiving device set corresponding to the target set-use long training sequence.

For example, the device C may determine whether the device C belongs to the target receiving device set, that is, whether the foregoing determined first receiving device set is the same as the target receiving device set.

If the first receiving device set is the same as the target receiving device set, it may be determined that the device C is the target receiving device of the first data packet, and therefore, the device C may acquire the first data from the first data packet.

If the first receiving device set is different from the target receiving device set, it may be determined that the device C is not the target receiving device of the first data packet, and therefore, the device C may discard the first data packet.

For another example, the device C may determine whether a long training sequence (namely, a first set-use long training sequence) corresponding to the first receiving device set to which the device C belongs is the same as the target set-use long training sequence.

Specifically, if the first set-use long training sequence is the same as the target set-use long training sequence, it may be determined that the device C is the target receiving device of the first data packet, and therefore the device C may acquire the first data from the first data packet.

If the first set-use long training sequence is different from the target set-use long training sequence, it may be determined that the device C is not the target receiving device of the first data packet, and therefore the device C may discard the first data packet.

According to the data transmission method in an embodiment of the present disclosure, a transmitting device notifies each receiving device in a communications system of a mapping relationship between each set-use long training sequence and each receiving device group; a first receiving device may determine a first set-use long training sequence corresponding to a receiving device set to which the first receiving device belongs; when the transmitting device needs to transmit data to a target device, a target set-use long training sequence corresponding to the target device may be carried in a physical layer of a data packet; therefore, the first receiving device may process the data packet according to a relationship between the first set-use long training sequence and the target set-use long training sequence, so that the first receiving device can determine, on condition that the first receiving device parses only a long training sequence field in the physical layer, whether the first receiving device is a target receiving device of the data packet. Therefore, burden of the receiving device can be reduced, waste of hardware resources can be reduced, and user experience can be improved.

Optionally, in an embodiment of the present disclosure, the method further includes:

determining a second mapping relationship, where the second mapping relationship is a mapping relationship between each long training sequence in a long training sequence subset and first sub-identity information in identity information of each receiving device in the communications system, where one piece of the identity information is used to uniquely indicate one receiving device in the communications system, the first sub-identity information is a part or all of the identity information, the long training sequence subset belongs to the long training sequence set, and the long training sequence subset does not include the first set-use long training sequence;

when second data needs to be transmitted to a target receiving device, selecting a target long training sequence from the long training sequence subset according to first sub-identity information of the target receiving device and the second mapping relationship;

performing encapsulation processing on the second data according to the target long training sequence to generate a second data packet, so that a long training sequence field in a physical layer of the second data packet carries a second long training sequence symbol used to indicate the target long training sequence; and transmitting the second data packet, so that the target receiving device acquires the target long training sequence from the second data packet and processes the second data packet according to the target long training sequence.

Specifically, the device A may determine a mapping relationship (the second mapping relationship) between a long training sequence set C" constituted by all long training sequences, except the first set-use long training sequence, in the foregoing acquired long training sequence set C' and each terminal device in the system.

In an embodiment of the present disclosure, the foregoing second mapping relationship may be generated by each device (including the receiving device and the transmitting device) in the system according to a preset rule, or may be generated by an external device independent of the receiving device and the transmitting device according to the preset rule and delivered to each device (including the receiving device and the transmitting device) in the system. For ease of understanding and description, the following uses the device A as an execution entity to describe in detail a method and a process for determining the mapping relationship between the long training sequence set C" and each terminal device in the system (specifically, a part or all of identity information of the terminal device, which is described later in detail).

First the device A may select identity information of a device, where the identity information of the device is used to generate the foregoing mapping relationship.

Optionally, the identity information is any one of the following information:

a Media Access Control MAC address, an Internet Protocol IP address, a basic service set identifier BSSID, an association identifier AID, a mobile phone number, an international mobile subscriber identity IMSI, and an international mobile equipment identity IMEI.

Specifically, in an embodiment of the present disclosure, the identity information of the device refers to information that can uniquely identify the device when the communications system in the embodiment of the present disclosure is used. It should be noted that in the embodiment of the present disclosure, the identity information may be factory-set information in the device, or may be allocated by the system to the device, which is not particularly limited in the present disclosure.

In an embodiment of the present disclosure, the identity information may include information such as a Media Access Control (MAC, Media Access Control) address, an Internet Protocol (IP, Internet Protocol) address, a basic service set identifier (BSSID, Basic Service Set Identifier), an association identifier (AID, Association Identifier), a mobile phone number, an international mobile subscriber identity (IMSI, International Mobile Subscriber Identity), and an international mobile equipment identity (IMEI, International Mobile Equipment Identity). It should be understood that a user identifier in the embodiment of the present disclosure is not limited to the foregoing information. Other information elements that can uniquely indicate the user identifier all fall within the scope of the embodiment of the present disclosure.

For example, the device A may acquire a quantity of terminal devices connected to the system and identity information (for example, BSSIDs or AIDs) of the terminal devices, and therefore may generate a mapping relationship between the identity information of the terminal devices and long training sequences according to the quantity of the terminal devices and the quantity of the foregoing generated long training sequences. For example:

If the quantity of the generated long training sequences is greater than the quantity of the terminal devices connected to the system, long training sequences with a quantity same as the quantity of the terminal devices may be selected, and the long training sequences correspond to the identity information of the terminal devices on a one-to-one basis.

If the quantity of the generated long training sequences is equal to the quantity of the terminal devices connected to the system, the long training sequences may correspond to the identity information of the terminal devices on a one-to-one basis.

If the quantity of the generated long training sequences is less than the quantity of the terminal devices connected to the system, some or all of the long training sequences may correspond to a part of the identity information of the terminal devices (an example of the first sub-identity information). In addition, a part or all of the remaining identity information (an example of the second sub-identity information) is carried in other fields in the physical layer, which is described later in detail.

In the foregoing process, each device in the system needs to communicate in real time or periodically with a management device or the like in the system, to determine the identity information of the terminal devices connected to the system and adjust the foregoing mapping relationship, which increases device burden and occupies communication resources.

Therefore, in an embodiment of the present disclosure, identity information that can uniquely identify the terminal device in each communications system may be selected and used. Therefore, all terminal devices that can be identified by the identity information may be considered as devices connected to and using the communications system in the embodiment of the present disclosure.

For ease of understanding, the following uses a MAC address as identity information for description.

First, a structure of the MAC address is described. FIG. 2 shows the structure of the MAC address. As shown in FIG. 2, the MAC address includes 48 bits, where:

an organization unique identifier (OUI, Organization Unique Identifier) occupies bits b24 to b47 of the MAC address, is allocated by the Institute of Electrical and Electronics Engineers (IEEE, Institute of Electrical and Electronics Engineers), and may be understood as an identifier of a device manufacturer; and a product serial number (PSN, Product Serial Number) occupies bits b0 to b23 of the MAC address, and is allocated by a device manufacturer.

Because the MAC address includes 48 bits, in theory, the MAC address can identify $2^{48}$ devices. The quantity is far greater than the quantity of the foregoing generated long training sequences. Therefore, in the embodiment of the present disclosure, some bits (the first sub-identity information) may be selected from the MAC address, and a mapping relationship between the first sub-identity information and each long training sequence may be set. That is, in the embodiment of the present disclosure, one long training sequence may be mapped to multiple devices that have same first sub-identity information, and some or all of the remaining bits (an example of the second sub-identify information) are carried in other fields in the physical layer (this process is described later in detail).

In an embodiment of the present disclosure, the device A may determine the first sub-identity information from the identity information according to the quantity of the long training sequences generated in step S110. As described above, if 52×53=2756 long training sequences are generated, for example, 11 bits (for example, bits b0 to b10 in the MAC address, namely, first 11 bits in the PSN, which can identify $2^{11}$=2048 devices) may be selected from the MAC address, and used as the first sub-identity information.

For another example, 22 bits, for example, bits b0 to b21, may be selected from the MAC address, and 11 bits are generated according to a preset operation rule, for example, the following formula 2, and the 11 bits are used as the first sub-identity information (which can identify $2^{11}$=2048 devices).

$$c(i)=b(2i)\oplus b(2i+1), i=0,1,\ldots,10 \qquad \text{formula 2}$$

Alternatively, 24 bits, for example, bits b0 to b23, may be selected from the MAC address, and 11 bits are generated according to a preset operation rule, for example, the following formula 3, and the 11 bits are used as the first sub-identity information (which can identify $2^{11}$=2048 devices).

$$c(i)=b(2i)\oplus b(2i+1), i=0,1,\ldots,8$$

$$c(9)=b(18)\oplus b(19)\oplus b(20)$$

$$c(10)=b(21)\oplus b(22)\oplus b(23) \qquad \text{formula 3}$$

In the formula 2 and the formula 3, "$\oplus$" indicates exclusive-OR processing.

Therefore, the mapping relationship between each long training sequence and each piece of first sub-identity information may be determined according to the preset rule. As the preset rule, for example, the 11-bit binary first-sub-identity-information may be converted into a decimal numeral, and the numeral of converted first sub-identity information corresponds to a long training sequence having a same ID numeral as the foregoing determined long training sequence.

For another example, more than 11 bits (for example, bits b0 to b23 in the MAC address, namely, the whole PSN, which can identify $2^{24}$ devices) may be selected from the MAC address, and used as the first sub-identity information. In this case, the quantity of the long training sequences is less than the quantity of the devices that the first sub-identity information can identify. Therefore, the 24-bit binary first-sub-identity-information may be converted into a decimal numeral, and modulo-preset-numeral (for example, modulo the quantity of the long training sequences) operation processing is performed on the numeral of converted first sub-identity information, and multiple pieces of the first sub-identity information with a same modulus value correspond to one long training sequence.

It should be noted that the mapping relationship between each piece of the foregoing determined first sub-identity information and each long training sequence may be recorded in an entry to form a list of mapping relationships, or may be expressed as a function relation, which is not particularly limited in the present disclosure.

It should be understood that the foregoing illustrated method for selecting the first sub-identity information is only an example for description, which is not particularly limited in the present disclosure. For example, the first sub-identity information may be determined from the OUI of the MAC address; or a part of consecutive or nonconsecutive bytes may be selected from the IP address, the BSSID, the AID, the mobile phone number, the IMSI, or the IMEI, and used as the first sub-identity information. In addition, the foregoing illustrated method for determining the mapping relationship between each piece of the first sub-identity information and each long training sequence is only an example for description, which is not particularly limited in the present disclosure. It should be noted that all devices in the system need to be consistent in the methods for determining the foregoing first sub-identity information and the foregoing mapping relationship, to ensure that the long training sequence (or the first sub-identity information) determined by the transmitting device and corresponding to the target receiving device is the same as the long training sequence (or the first sub-identity information) determined by the target receiving device and corresponding to the target receiving device.

In an embodiment of the present disclosure, the target receiving device may be one device in the system (namely, case A), or all devices in the system (namely, case B). The following first describes the case in which the target receiving device is one device.

Case A

Optionally, in an embodiment of the present disclosure, when the target receiving device is one receiving device in the communications system, the selecting a target long training sequence from the long training sequence subset according to first sub-identity information of the target receiving device and the mapping relationship includes:

selecting, from the long training sequence subset according to the first sub-identity information of the target receiving device and the second mapping relationship, a second long training sequence only corresponding to the first sub-identity information of the target receiving device, and using the second long training sequence as the target long training sequence.

Specifically, when the device A needs to transmit data to a device B (an example of the target receiving device), the device A may determine first sub-identity information of the device B, for example, if a MAC address is used as identity information, may determine the first sub-identity information from a destination MAC address, and determine, according to the determined second mapping relationship and the first sub-identity information of the device B, (by looking up the list or substituting into the function relation), a long training sequence (hereinafter recorded as a long training sequence B) corresponding to the device B.

The device A may perform encapsulation processing on the data (the second data) that needs to be transmitted, to generate a data packet (the second data packet). In the embodiment of the present disclosure, because the used long training sequence is different from a long training sequence used in the prior art, herein a process for generating a long training sequence symbol is mainly described in detail.

Specifically, when a quantity of subcarriers used in the system is greater than a quantity of elements in a long training sequence (or a sequence length), direct-current carrier components may be set to 0. Afterward, subcarriers with "a quantity same as the quantity of elements in the long training sequence" are selected from the indirect-current carrier components, and the elements in the long training sequence are mapped to the selected subcarriers one by one. Finally, a specific numeric value or a cyclic shift element of the long training sequence is inserted in the remaining subcarriers. For example, a numeric value "1" is inserted, used by the receiving device for channel estimation; or a numeric value "0" may be inserted, that is, no information is transmitted on the subcarriers.

When the quantity of subcarriers is equal to the quantity of elements in the long training sequence, one-to-one mapping may be performed on the elements in the long training sequence and the subcarriers, and afterward the direct-current carrier components may be set to 0.

When the quantity of subcarriers is less than the quantity of elements in the long training sequence, elements with "a quantity same as the quantity of subcarriers" may be selected from the elements in the long training sequence. Afterward, one-to-one mapping is performed on the selected elements and the subcarriers. Finally, the direct-current carrier components are set to 0.

It should be noted that in an embodiment of the present disclosure, "the second long training sequence symbol" refers to a valid bit (or a valid character string) in the long training sequence field of the transmitted data packet, and may be generated according to the target long training sequence (for example, by using a preset rule). Therefore, the receiving device can determine, by parsing the second long training sequence symbol, the target long training sequence indicated by the second long training sequence symbol. The foregoing method and process may be the same as or similar to those in the prior art, and to avoid repetition, description thereof is omitted herein. The following omits description about the same or similar cases.

In an embodiment of the present disclosure, the device A may add the long training sequence corresponding to the device B to the long training sequence field (field) in the physical layer of the second data packet, and then transmit the data packet to each receiving device.

Optionally, the first sub-identity information is a part of the identity information, and the performing encapsulation processing on the second data to generate a second data packet includes:

performing encapsulation processing on the second data to generate the second data packet, where the physical layer of the second data packet carries a second sub-identity information symbol, the second sub-identity information symbol is used to indicate second sub-identity information of the target receiving device, and the second sub-identity information belongs to a part, except the first sub-identity information, in the identity information.

Specifically, in an embodiment of the present disclosure, if the first sub-identity information is a part of the identity information, one long training sequence can identify multiple devices, and the receiving device cannot accurately determine, by using only the long training sequence, whether the receiving device is a target receiving device of the data packet. Therefore, in the embodiment of the present disclosure, the transmitting device may further determine, according to a preset rule, the second sub-identity information, except the first sub-identity information, in the identity information of the target receiving device.

For example, the device A may use a part of information (for example, bits b24 to b32 in the MAC address), except the first sub-identity information (for example, bits b0 to b10 in the MAC address), in the MAC address of the device B as the second sub-identity information (hereinafter recorded as second sub-identity information B).

In an embodiment of the present disclosure, to enable the receiving device to obtain the second sub-identity information of the target receiving device by means of parsing in the physical layer, the device A may add the second sub-identity information (or a symbol indicating the second sub-identity information) to available space in the physical layer of the data packet. Therefore, the device A may further determine the second sub-identity information (specifically, a length of the second sub-identity information) according to the available space in the physical layer of the data packet. For example, in a case of a Wi-Fi system of the IEEE 802.11ac standard, a partial association identifier field (field) of 9 bits is added to a signal field (signal field) in the physical layer of the data packet. Therefore, in the embodiment of the present disclosure, the device A may use information in 9 bits (for example, bits b24 to b32 in the MAC address), except the first sub-identity information (for example, bits b0 to b10 in the MAC address), in the MAC address of the device B as the second sub-identity information B.

It should be understood that the foregoing illustrated method for determining the second sub-identity information is only an example for description, and that the present disclosure is not limited thereto. For example, the second sub-identity information may be consecutive bits or non-consecutive bits in the identity information. For another example, the second sub-identity information may be all information, except the first sub-identity information, in the identity information.

It should be noted that in an embodiment of the present disclosure, "the second sub-identity information symbol" refers to a valid bit (or a valid character string) in for example, the partial association identifier field of the transmitted data packet, and may be generated according to the second sub-identity information (for example, by using a preset rule). Therefore, the receiving device can determine, by parsing the second sub-identity information symbol, the second sub-identity information indicated by the second sub-identity information symbol. The foregoing method and process may be the same as or similar to those in the prior art, and to avoid repetition, description thereof is omitted herein. The following omits description about the same or similar cases.

It should be noted that in an embodiment of the present disclosure, the methods for determining the second sub-identity information by all devices in the system need to be consistent, to ensure that the second sub-identity information of the target receiving device determined by the transmitting device is the same as the second sub-identity information determined by the target receiving device.

According to the data transmission method in an embodiment of the present disclosure, a long training sequence symbol (or first sub-identity information) and a second sub-identity information symbol (or second sub-identity information) are used to jointly indicate devices in the system, so that more devices can be identified, which further improves the effect of the present disclosure.

After determining the second sub-identity information, the device A may generate a second sub-identity information symbol used to indicate second sub-identity information of the device B, and add the second sub-identity information symbol to a physical layer of a data packet, so that the receiving device can obtain the second sub-identity information of the target receiving device by means of parsing in the physical layer.

Optionally, the second sub-identity information symbol is carried in the partial association identifier field in the physical layer of the data packet.

Specifically, if an embodiment of the present disclosure is applied, for example, to a Wi-Fi system of the IEEE 802.11ac standard, a partial association identifier field (field) of 9 bits is added to the signal field (signal field) in the physical layer of the data packet, and the foregoing generated second sub-identity information symbol may be carried in the partial association identifier field. Alternatively, the second sub-identity information may be used as a partial association identifier.

It should be understood that the foregoing illustrated method for carrying the second sub-identity information (or the second sub-identity information symbol) is only an example for description, and that the present disclosure is not limited thereto. Other methods that can enable the receiving device to acquire the second sub-identity information from the physical layer (or other layers before the physical layer in parsing order) all fall within the protection scope of the present disclosure.

In addition, in an embodiment of the present disclosure, in transmission order, the second sub-identity information symbol may be located before the long training sequence symbol, or may be located after the long training sequence symbol, which is not particularly limited in the present disclosure.

In addition, other processes for generating the data packet may be similar to those in the prior art, and to avoid repetition, description thereof is omitted herein.

The following Table 4 shows an example of a part (the second sub-identity information) of the identity information of the target receiving device carried in the partial association identifier field and a part (the first sub-identity information) of the identity information of the target receiving device corresponding to the long training sequence field in the data packet.

TABLE 4

| Case | Partial association identifier field (carrying) | Long training sequence field (corresponding) |
| --- | --- | --- |
| Transmitted to an AP | Bits 24 to 32 of a MAC address | Bits 0 to 10 of the MAC address |
| Transmitted to a STA | Bits 24 to 32 of a MAC address | Bits 0 to 10 of the MAC address |

The following Table 5 shows another example of the part (the second sub-identity information) of the identity information of the target receiving device carried in the partial association identifier field and the part (the first sub-identity information) of the identity information of the target receiving device corresponding to the long training sequence field in the data packet.

TABLE 5

| Case | Partial association identifier field (carrying) | Long training sequence field (corresponding) |
| --- | --- | --- |
| Transmitted to an AP | Bits 39 to 47 of a BSSID | Bits 28 to 38 of the BSSID |
| Transmitted to a STA | Bits 39 to 47 of a receive address (RA, Receive Address) | Bits 28 to 38 of the RA |

The following Table 6 shows still another example of the part (the second sub-identity information) of the identity information of the target receiving device carried in the partial association identifier field and the part (the first sub-identity information) of the identity information of the target receiving device corresponding to the long training sequence field in the data packet.

TABLE 6

| Case | Partial association identifier field (carrying) | Long training sequence field (corresponding) |
| --- | --- | --- |
| Transmitted to an AP | Bits 15 to 23 of a MAC address | Bits 35 to 45 of the MAC address |
| Transmitted to a STA | Bits 15 to 23 of a MAC address | Bits 35 to 45 of the MAC address |

As described above, by using the partial association identifier field and the long training sequence field to jointly identify user equipments in the system, multiple devices can be identified. For example, if the system bandwidth is 20 MHz, a quantity of available subcarriers in the system is 53, and therefore more than $2^{11}$ long training sequences may be generated and can correspond to $2^{11}$ devices. In addition, the partial association identifier field includes 9 bits, which can correspond to $2^9$ devices. Therefore, by combining the partial association identifier field and the long training sequence field (20 bits in total), $2^{11} \times 2^9 = 2^{20}$ devices can be identified.

The device A, for example, may transmit the second data packet to each device (including the device B) in the system in a broadcast manner over the air interface. In the embodiment of the present disclosure, the method and process for transmitting the second data packet may be the same as those in the prior art, and to avoid repetition, description thereof is omitted herein.

A device (hereinafter for ease of understanding and description, unless otherwise specified, a device D is used as an example for describing an action of the receiving device) that can receive the second data packet, same as the device A, may predetermine a long training sequence set including multiple long training sequences. In addition, the process is the same as the foregoing process for determining the long training sequence set by the device A, and to avoid repetition, description thereof is omitted herein.

Afterward, the device D may determine a mapping relationship between the foregoing acquired long training sequence set C" and each terminal device (including the device D) in the system. In addition, the process is the same as the foregoing process for determining the mapping relationship by the device A, and to avoid repetition, description thereof is omitted herein.

When receiving the second data packet transmitted by the device A, the device D may acquire, from the physical layer of the second data packet, the long training sequence B determined by the device A according to the target receiving device (namely, the device B). Therefore, the device D may perform processing on the second data packet according to the long training sequence B.

The processing according to the long training sequence B may include the following processes:

When the first sub-identity information is all of the identity information, the long training sequence B corresponds only to one receiving device (namely, case 1); when the first sub-identity information is a part of the identity information, the long training sequence B may correspond to multiple receiving devices (namely, case 2). The following describes processing processes in the foregoing two cases separately.

Case 1

For example, after the determining a mapping relationship between the long training sequence set C" and each terminal device in the system, the device D may determine a long training sequence (hereinafter recorded as a long training sequence C) corresponding to the device D.

Therefore, whether the long training sequence C is the same as the long training sequence B may be determined.

Herein it should be noted that if a polyphase perfect sequence (for example, a Zadoff-Chu sequence) is used as a long training sequence, ideal autocorrelation properties and optimum cross-correlation properties of the polyphase perfect sequence may be used to quickly and conveniently distinguish whether the long training sequence C is the same as the long training sequence B.

Specifically, the device D may perform correlation calculation on the long training sequence C and the long training sequence B according to the following formula 4:

$$R_{r,s}(\tau) = \sum_{n=0}^{N-1} \hat{a}_n^{(r)} \hat{a}_{n+\tau}^{*(s)}, \quad \text{formula 4}$$

where N indicates a sequence length.

Figure 3:
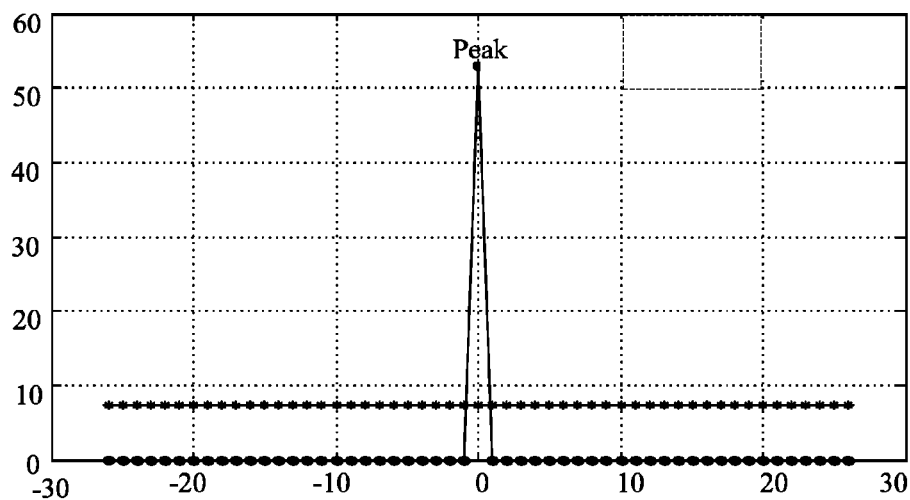
FIG. 3 is a line chart of an autocorrelation function and a cross-correlation function of a Zadoff-Chu sequence.

FIG. 3 is a line chart of an autocorrelation function and a cross-correlation function of a Zadoff-Chu sequence. As shown in FIG. 3, if the long training sequence C is the same as the long training sequence B, a peak occurs. Therefore, the device D may determine, according to whether a peak occurs or whether a correlation value $R_{r,s}(\tau)$ exceeds a threshold, whether the long training sequence C is the same as the long training sequence B.

It should be understood that the foregoing illustrated method for determining whether the long training sequence C is the same as the long training sequence B is only an example for description, and that the present disclosure is not limited thereto. For example, the long training sequence C may be compared with the long training sequence B in a bitwise manner to determine whether the long training sequence C is the same as the long training sequence B.

Therefore, if the long training sequence C is different from the long training sequence B, the device D may determine that the device D is not the target receiving device of the second data packet, and therefore may, for example, discard the second data packet.

If the long training sequence C is the same as the long training sequence B, the device D may determine that the device D is the target receiving device of the second data packet, and therefore may, for example, parse the second data packet to acquire the data (the second data) that needs to be transmitted by the device A.

For another example, when receiving the second data packet transmitted by the device A, the device D may acquire, from the physical layer of the second data packet, the long training sequence B determined by the device A according to the target receiving device (namely, the device B), and find, according to the foregoing determined mapping relationship, first sub-identity information of a device (herein, the device B) corresponding to the long training sequence B.

If the first sub-identity information of the device B is different from the first sub-identity information of the device D, the device D may determine that the device D is not the target receiving device of the second data packet, and therefore may, for example, discard the second data packet.

If the first sub-identity information of the device B is the same as the first sub-identity information of the device D, the device D may determine that the device D is the target receiving device of the second data packet, and therefore may, for example, parse the second data packet to acquire the data (the second data) that needs to be transmitted by the device A.

Case 2

In this case, the device D may determine second sub-identity information (hereinafter recorded as second sub-identity information C) of the device D according to a preset rule (same as the preset rule used by the device A to determine the second sub-identity information). In addition, the process is the same as the foregoing process for determining the second sub-identity information by the device A, and to avoid repetition, description thereof is omitted herein.

Afterward, for example, after the determining a mapping relationship between the long training sequence set C" and each terminal device in the system, the device D may determine a long training sequence (hereinafter recorded as a long training sequence C) corresponding to the device D.

Therefore, whether the long training sequence C is the same as the long training sequence B may be determined.

Herein it should be noted that if a polyphase perfect sequence (for example, a Zadoff-Chu sequence) is used as a long training sequence, ideal autocorrelation properties and optimum cross-correlation properties of the polyphase perfect sequence may be used to quickly and conveniently distinguish whether the long training sequence C is the same as the long training sequence B.

Specifically, the device D may perform correlation calculation on the long training sequence C and the long training sequence B according to the foregoing formula 4. If the long training sequence C is the same as the long training sequence B, a peak occurs. Therefore, the device D may determine, according to whether a peak occurs or whether a correlation value $R_{r,s}(\tau)$ exceeds a threshold, whether the long training sequence C is the same as the long training sequence B.

It should be understood that the foregoing illustrated method for determining whether the long training sequence C is the same as the long training sequence B is only an example for description, and that the present disclosure is not limited thereto. For example, the long training sequence C may be compared with the long training sequence B in a bitwise manner to determine whether the long training sequence C is the same as the long training sequence B.

Therefore, if the long training sequence C is different from the long training sequence B, the device D may determine that the device D is not the target receiving device of the data packet, and therefore may, for example, discard the data packet.

Because the first sub-identity information is only a part of the identity information, that is, one piece of the first sub-identity information may correspond to multiple devices, if the long training sequence C is the same as the long training sequence B, the device D may determine that the device D may be the target receiving device of the data packet, and therefore may continue to parse the data packet and acquire, from the physical layer of the data packet, the second sub-identity information (namely, the second sub-identity information B) of the target receiving device.

Therefore, if the second sub-identity information B is different from the second sub-identity information C, the device D may determine that the device D is not the target receiving device of the data packet, and therefore may, for example, discard the data packet.

If the second sub-identity information B is the same as the second sub-identity information C, the device D may determine that the device D is the target receiving device of the data packet, and therefore may, for example, parse the data packet to acquire the data that needs to be transmitted by the device A.

For another example, when receiving the data packet transmitted by the device A, the device D may acquire, from the physical layer of the data packet, the long training sequence B determined by the device A according to the target receiving device (namely, the device B), and find, according to the foregoing determined mapping relationship, first sub-identity information of a device (herein, the device B) corresponding to the long training sequence B.

If the first sub-identity information of the device B is different from the first sub-identity information of the device D, the device D may determine that the device D is not the target receiving device of the data packet, and therefore may, for example, discard the data packet.

Because the first sub-identity information is only a part of the identity information, that is, one piece of the first sub-identity information may correspond to multiple devices, if the first sub-identity information of the device B is the same as the first sub-identity information of the device D, the device D may determine that the device D may be the target receiving device of the data packet, and therefore may continue to parse the data packet and acquire, from the physical layer of the data packet, the second sub-identity information (namely, the second sub-identity information B) of the target receiving device.

Therefore, if the second sub-identity information B is different from the second sub-identity information C, the device D may determine that the device D is not the target receiving device of the data packet, and therefore may, for example, discard the data packet.

If the second sub-identity information B is the same as the second sub-identity information C, the device D may determine that the device D is the target receiving device of the data packet, and therefore may, for example, parse the data packet to acquire the data that needs to be transmitted by the device A.

Case B

Optionally, in an embodiment of the present disclosure, when the target receiving device is all receiving devices in the communications system, the selecting a target long training sequence from the long training sequence subset according to first sub-identity information of the target receiving device and the second mapping relationship includes:

selecting, from the long training sequence subset according to the first sub-identity information of the target receiving device and the mapping relationship, a third long training sequence corresponding to the first sub-identity information of all the receiving devices in the communications system, and using the third long training sequence as the target long training sequence.

Specifically, if the device A needs to transmit a data packet (another example of the second data packet) to each receiving device in the system, or if each receiving device in the system is the target receiving device of the data packet, the device A may select a long training sequence (the third long training sequence) from the determined long training sequence set according to a preset rule, for example, the first or the last or a middle long training sequence in the long training sequence set, and use the long training sequence as the target long training sequence, to identify that the target receiving device of the data packet is all the receiving devices in the system.

Each receiving device in the system may determine the third long training sequence according to the preset rule (same as the rule used by the device A). If the target long training sequence carried in the data packet is the third long training sequence, it indicates that the data is broadcast data and therefore may be received.

It should be noted that in an embodiment of the present disclosure, the first sub-identity information and the third sub-identity information may be the same or different, which is not particularly limited in the present disclosure. Likewise, the second sub-identity information and the third sub-identity information may be the same or different, which is not particularly limited in the present disclosure.

According to the data transmission method in an embodiment of the present disclosure, when a transmitting device needs to transmit data to a target receiving device, the transmitting device selects, from a long training sequence set, a target long training sequence corresponding to the target receiving device, and adds the target long training sequence to a long training sequence field in a physical layer of a generated data packet; a receiving device can determine the target receiving device of the data packet according to the target long training sequence. Therefore, if the receiving device is not the target receiving device of the data packet, the receiving device does not need to continue to parse the data packet, which can reduce burden of the receiving device, reduce waste of hardware resources, and improve user experience.

FIG. 4 shows a schematic flowchart of a data transmission method 200 according to an embodiment of the present disclosure described from a perspective of a receiving device. As shown in FIG. 4, the method 200 includes:

S210. A first receiving device in at least one receiving device in a communications system determines a first mapping relationship, where the first mapping relationship is a mapping relationship between at least one set-use long training sequence in the long training sequence set and the at least one receiving device set, the at least one set-use long training sequence corresponds to the at least one receiving device set on a one-to-one basis, the receiving device set includes at least one receiving device in the communications system, and the long training sequence set includes at least two long training sequences.

S220. Determine, from the at least one receiving device set, a first receiving device set to which the first receiving device belongs.

S230. When receiving a first data packet transmitted by a transmitting device, acquire a first long training sequence symbol carried in a long training sequence field in a physical layer of the first data packet, where the first long training sequence symbol is used to indicate a target set-use long training sequence, the target set-use long training sequence is determined by the transmitting device according to a target receiving device set of the first data packet and the first mapping relationship, and the first data packet is generated after the transmitting device performs encapsulation processing on first data.

S240. Determine the target set-use long training sequence according to the first long training sequence symbol.

S250. Process the first data packet according to the target set-use long training sequence, the first receiving device set, and the first mapping relationship.

In the prior art, a long training sequence (LTS, Long Training Sequence) is used for channel estimation, and in addition, in a same communications system, each user equipment (including a receiving device and a transmitting device) uses a same long training sequence.

In contrast, in an embodiment of the present disclosure, the communications system may use multiple (at least two) LTSs that are different from each other. In addition, for example, different LTSs may be allocated to different user equipments. When the transmitting device needs to transmit data to a target receiving device, the transmitting device may determine a target LTS corresponding to the target receiving device (in other words, the target LTS is allocated by the system to the target receiving device), and add the target LTS to a long training field (LTF, Long Training Field, also referred to as a long training sequence field) in a physical layer of a data packet. Therefore, the receiving device may acquire the target LTS from the LTF of the data packet, and may perform processing (for example, receiving or discarding) on the data packet according to a relationship (for example, same or different) between the LTS allocated by the system to the receiving device and the target LTS, or may determine, according to the target LTS, the target receiving device (specifically, first sub-identity information of the target receiving device, where the parameter is described later in detail) corresponding to the target LTS, and perform processing (for example, receiving or discarding) on the data packet according to a relationship (for example, same or different) between first sub-identity information of the receiving device and first sub-identity information of the target receiving device. Therefore, the receiving device acquires, by parsing the LTF in the physical layer of the data packet, the target LTS carried in the LTF, and can determine, by using the target LTS, whether the receiving device is the target receiving device of the data packet, which can reduce burden of the receiving device, reduce waste of hardware resources, and improve user experience.

Specifically, a device A (an example of the transmitting device, for example, may be an AP or a STA) in the communications system may predetermine a long training sequence set including multiple long training sequences (LTSs, Long Training Sequences).

In an embodiment of the present disclosure, the long training sequence set may be generated by each device (including the receiving device and the transmitting device) in the system according to a preset rule, or may be generated by an external device independent of the receiving device and the transmitting device according to the preset rule and delivered to each device (including the receiving device and the transmitting device) in the system. For ease of understanding and description, the following uses the device A as an execution entity to describe a method and a process for generating the long training sequence set.

Optionally, the long training sequence is a sequence with good correlation properties.

The sequence with good correlation properties is any one of the following sequences:

a polyphase perfect sequence, a Gold sequence, a Gold-like sequence, and a pseudo-random sequence.

In addition, the polyphase perfect sequence is any one of the following sequences: a Zadoff-Chu sequence, a Frank sequence, a Combined Frank/Zadoff-Chu sequence, and the like.

Specifically, currently, a great progress is made in a sequence design field, and people's research emphasis has shifted from a binary pseudo-random sequence to a sequence with good correlation properties such as a polyphase perfect sequence (Perfect sequence). Because the sequence with good correlation properties has good autocorrelation properties and cross-correlation properties, in the embodiment of the present disclosure, the sequence with good correlation properties may be used as the LTS. Therefore, the receiving device may use the good autocorrelation properties and cross-correlation properties of the LTS to accurately determine whether the LTS allocated by the system to the receiving device is the same as the LTS carried in the data packet, and therefore, can determine whether the receiving device is the target receiving device of the data packet (this process is described later in detail). In addition, by using, for example, the polyphase perfect sequence, properties (for example, formula generation) of the polyphase perfect sequence can be used to generate multiple LTSs quickly and conveniently and determine a mapping relationship between the multiple LTSs and receiving devices (specifically, first sub-identity information of each receiving device) (this process is described later in detail).

The sequences with good correlation properties may include a polyphase perfect sequence, a Gold sequence, a Gold-like sequence, and a pseudo-random sequence with good correlation properties. Herein, properties, concepts, and the like of the polyphase perfect sequence, the Gold sequence, and the pseudo-random sequence may be similar to those in the prior art, and to avoid repetition, description thereof is omitted herein. In addition, it should be noted that the foregoing illustrated sequences used as the sequences with good correlation properties are only examples for description, and the present disclosure is not limited thereto. Other sequences with good correlation properties all fall within the protection scope of the present disclosure.

The polyphase perfect sequence may include a Zadoff-Chu sequence, a Frank sequence, a Combined Frank/Zadoff-Chu sequence, and the like. Herein, properties, concepts, and the like of the Zadoff-Chu sequence, the Frank sequence, or the Combined Frank/Zadoff-Chu sequence may be similar to those in the prior art (for example, a sequence length of the Frank sequence can only be the square of a natural number), and to avoid repetition, description thereof is omitted herein. In addition, it should be noted that the foregoing illustrated sequences used as the polyphase perfect sequence are only examples for description, and the present disclosure is not limited thereto. Other sequences that can be used as the polyphase perfect sequence, namely, sequences that have ideal autocorrelation properties and optimum cross-correlation properties, all fall within the protection scope of the present disclosure. For ease of understanding and description, exemplarily, the following uses the Zadoff-Chu sequence as a long training sequence to describe a process for generating the long training sequence set in the embodiment of the present disclosure.

In an embodiment of the present disclosure, a long training sequence set with multiple LTSs may be generated according to the properties of the polyphase perfect sequence (herein, specifically, properties of the Zadoff-Chu sequence) by using a conventional Zadoff-Chu sequence generation formula.

For example, a length of the Zadoff-Chu sequence may be set according to a preset rule, and a basic long training sequence set C may be determined according to the determined sequence length and the following formula 1:

$$C = \{\hat{a}^{(1)}, \ldots, \hat{a}^{(r)}, \ldots, \hat{a}^{(N-1)}\}, \qquad \text{formula 1}$$

$$r = \{1, \ldots, N-1\},$$

$$gcd(r, N) = 1,$$

$$\hat{a}^{(r)} = (\hat{a}_0^{(r)}, \hat{a}_1^{(r)}, \ldots, \hat{a}_{N-1}^{(r)}),$$

$$\hat{a}_n^{(r)} = \begin{cases} e^{\frac{i\pi}{N}r(n+1)n}, & N \text{ odd,} \\ e^{\frac{i\pi}{N}m^2}, & N \text{ even,} \end{cases}$$

$$0 \le n \le N;$$

$$gcd(r, N) = 1,$$

where N indicates a sequence length, and an r set is a set of natural numbers that are less than N and are coprime to N. Because two adjacent natural numbers are coprime, the last element in the set is N−1. $\hat{a}^{(r)}$ indicates a basic long training sequence in the basic long training sequence set C, and $\hat{a}_n^{(r)}$ indicates an $n^{th}$ element in the basic long training sequence $\hat{a}^{(r)}$, where r is less than N and r and N are coprime, and i indicates an imaginary unit (namely, $i^2=-1$). It should be noted that because a quantity M of basic long training sequences in a Zadoff-Chu sequence set (in other words, a quantity of elements in the r set) is decided by the sequence length N, that is, M is "a quantity of natural numbers that are less than the sequence length and are coprime to the sequence length", when the Zadoff-Chu sequence is selected, under a premise of improving accuracy of channel estimation (this effect is described later in detail), a quantity of sequences included in the sequence set can be as great as possible if a value of the sequence length is less than or equal to a quantity of subcarriers, and therefore a quantity of represented receiving devices can be increased.

Optionally, a length of the long training sequence is determined according to a quantity of available subcarriers in the communications system.

Specifically, in an embodiment of the present disclosure, because the long training sequence is used for channel estimation, for example, if the length of the long training sequence is equal to the quantity of available subcarriers in the communications system, each element in the long training sequence can correspond to each subcarrier on a one-to-one basis, and therefore, accuracy of channel estimation is improved.

First, the device A may determine a system bandwidth. For example, the device A may acquire a bandwidth parameter (CH_BANDWIDTH) from a transceiver (TRX, Transceiver), determine the system bandwidth according to the bandwidth parameter, and further determine the quantity of available subcarriers in the system. For example, in a Wi-Fi system of the IEEE 802.11g standard, when the system bandwidth is 20 megahertz (MHz), the quantity of available subcarriers in the system is 53.

As described above, when the Zadoff-Chu sequence is selected, a quantity of sequences included in the sequence set can be as great as possible if the sequence length is less than or equal to a quantity of subcarriers, and therefore a quantity of represented receiving devices can be increased. In the following description, exemplarily, the sequence length is set to 53.

If the sequence length is set to 53 (namely, N=53), according to the foregoing formula 1, the following basic long training sequence set C may be generated:

$$C=\{\hat{a}^{(1)}, \ldots, \hat{a}^{(r)}, \ldots, \hat{a}^{(52)}\}, r=\{1,2,\ldots,52\},$$

where:

a(1)={0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0}, a(2)={0, 4, 12, 24, 40, 60, 84, 6, 38, 74, 8, 52, 100, 46, 102, 56, 14, 82, 48, 18, 98, 76, 58, 44, 34, 28, 26, 28, 34, 44, 58, 76, 98, 18, 48, 82, 14, 56, 102, 46, 100, 52, 8, 74, 38, 6, 84, 60, 40, 24, 12, 4, 0}, a(3)={0, 6, 18, 36, 60, 90, 20, 62, 4, 58, 12, 78, 44, 16, 100, 84, 74, 70, 72, 80, 94, 8, 34, 66, 104, 42, 92, 42, 104, 66, 34, 8, 94, 80, 72, 70, 74, 84, 100, 16, 44, 78, 12, 58, 4, 62, 20, 90, 60, 36, 18, 6, 0}, a(4)={0, 8, 24, 48, 80, 14, 62, 12, 76, 42, 16, 104, 94, 92, 98, 6, 28, 58, 96, 36, 90, 46, 10, 88, 68, 56, 52, 56, 68, 88, 10, 46, 90, 36, 96, 58, 28, 6, 98, 92, 94, 104, 16, 42, 76, 12, 62, 14, 80, 48, 24, 8, 0}, a(5)={0, 10, 30, 60, 100, 44, 104, 68, 42, 26, 20, 24, 38, 62, 96, 34, 88, 46, 14, 98, 86, 84, 92, 4, 32, 70, 12, 70, 32, 4, 92, 84, 86, 98, 14, 46, 88, 34, 96, 62, 38, 24, 20, 26, 42, 68, 104, 44, 100, 60, 30, 10, 0}, a(6)={0, 12, 36, 72, 14, 74, 40, 18, 8, 10, 24, 50, 88, 32, 94, 62, 42, 34, 38, 54, 82, 16, 68, 26, 102, 84, 78, 84, 102, 26, 68, 16, 82, 54, 38, 34, 42, 62, 94, 32, 88, 50, 24, 10, 8, 18, 40, 74, 14, 72, 36, 12, 0}, a(7)={0, 14, 42, 84, 34, 104, 82, 74, 80, 100, 28, 76, 32, 2, 92, 90, 102, 22, 62, 10, 78, 54, 44, 48, 66, 98, 38, 98, 66, 48, 44, 54, 78, 10, 62, 22, 102, 90, 92, 2, 32, 76, 28, 100, 80, 74, 82, 104, 34, 84, 42, 14, 0}, a(8)={0, 16, 48, 96, 54, 28, 18, 24, 46, 84, 32, 102, 82, 78, 90, 12, 56, 10, 86, 72, 74, 92, 20, 70, 30, 6, 104, 6, 30, 70, 20, 92, 74, 72, 86, 10, 56, 12, 90, 78, 82, 102, 32, 84, 46, 24, 18, 28, 54, 96, 48, 16, 0}, a(9)={0, 18, 54, 2, 74, 58, 60, 80, 12, 68, 36, 22, 26, 48, 88, 40, 10, 104, 4, 28, 70, 24, 102, 92, 100, 20, 64, 20, 100, 92, 102, 24, 70, 28, 4, 104, 10, 40, 88, 48, 26, 22, 36, 68, 12, 80, 60, 58, 74, 2, 54, 18, 0}, a(10)={0, 20, 60, 14, 94, 88, 102, 30, 84, 52, 40, 48, 76, 18, 86, 68, 70, 92, 28, 90, 66, 62, 78, 8, 64, 34, 24, 34, 64, 8, 78, 62, 66, 90, 28, 92, 70, 68, 86, 18, 76, 48, 40, 52, 84, 30, 102, 88, 94, 14, 60, 20, 0}, a(11)={0, 22, 66, 26, 8, 12, 38, 86, 50, 36, 44, 74, 20, 94, 84, 96, 24, 80, 52, 46, 62, 100, 54, 30, 28, 48, 90, 48, 28, 30, 54, 100, 62, 46, 52, 80, 24, 96, 84, 94, 20, 74, 44, 36, 50, 86, 38, 12, 8, 26, 66, 22, 0}, a(12)={0, 24, 72, 38, 28, 42, 80, 36, 16, 20, 48, 100, 70, 64, 82, 18, 84, 68, 76, 2, 58, 32, 30, 52, 98, 62, 50, 62, 98, 52, 30, 32, 58, 2, 76, 68, 84, 18, 82, 64, 70, 100, 48, 20, 16, 36, 80, 42, 28, 38, 72, 24, 0}, a(13)={0, 26, 78, 50, 48, 72, 16, 92, 88, 4, 52, 20, 14, 34, 80, 46, 38, 56, 100, 64, 54, 70, 6, 74, 62, 76, 10, 76, 62, 74, 6, 70, 54, 64, 100, 56, 38, 46, 80, 34, 14, 20, 52, 4, 88, 92, 16, 72, 48, 50, 78, 26, 0}, a(14)={0, 28, 84, 62, 68, 102, 58, 42, 54, 94, 56, 46, 64, 4, 78, 74, 98, 44, 18, 20, 50, 2, 88, 96, 26, 90, 76, 90, 26, 96, 88, 2, 50, 20, 18, 44, 98, 74, 78, 4, 64, 46, 56, 94, 54, 42, 58, 102, 68, 62, 84, 28, 0}, a(15)={0, 30, 90, 74, 88, 26, 100, 98, 20, 78, 60, 72, 8, 80, 76, 102, 52, 32, 42, 82, 46, 40, 64, 12, 96, 104, 36, 104, 96, 12, 64, 40, 46, 82, 42, 32, 52, 102, 76, 80, 8, 72, 60, 78, 20, 98, 100, 26, 88, 74, 90, 30, 0}, a(16)={0, 32, 96, 86, 2, 56, 36, 48, 92, 62, 64, 98, 58, 50, 74, 24, 6, 20, 66, 38, 42, 78, 40, 34, 60, 12, 102, 12, 60, 34, 40, 78, 42, 38, 66, 20, 6, 24, 74, 50, 58, 98, 64, 62, 92, 48, 36, 56, 2, 86, 96, 32, 0}, a(17)={0, 34, 102, 98, 22, 86, 78, 104, 58, 46, 68, 18, 2, 20, 72, 52, 66, 8, 90, 100, 38, 10, 16, 56, 24, 26, 62, 26, 24, 56, 16, 10, 38, 100, 90, 8, 66, 52, 72, 20, 2, 18, 68, 46, 58, 104, 78, 86, 22, 98, 102, 34, 0}, a(18)={0, 36, 2, 4, 42, 10, 14, 54, 24, 30, 72, 44, 52, 96, 70, 80, 20, 102, 8, 56, 34, 48, 98, 78, 94, 40, 22, 40, 94, 78, 98, 48, 34, 56, 8, 102, 20, 80, 70, 96, 52, 44, 72, 30, 24, 54, 14, 10, 42, 4, 2, 36, 0}, a(19)={0, 38, 8, 16, 62, 40, 56, 4, 96, 14, 76, 70, 102, 66, 68, 2, 80, 90, 32, 12, 30, 86, 74, 100, 58, 54, 88, 54, 58, 100, 74, 86, 30, 12, 32, 90, 80, 2, 68, 66, 102, 70, 76, 14, 96, 4, 56, 40, 62, 16, 8, 38, 0}, a(20)={0, 40, 14, 28, 82, 70, 98, 60, 62, 104, 80, 96, 46, 36, 66, 30, 34, 78, 56, 74, 26, 18, 50, 16, 22, 68, 48, 68, 22, 16, 50, 18, 26, 74, 56, 78, 34, 30, 66, 36, 46, 96, 80, 104, 62, 60, 98, 70, 82, 28, 14, 40, 0}, a(21)={0, 42, 20, 40, 102, 100, 34, 10, 28, 88, 84, 16, 96, 6, 64, 58, 94, 66, 80, 30, 22, 56, 26, 38, 92, 82, 8, 82, 92, 38, 26, 56, 22, 30, 80, 66, 94, 58, 64, 6, 96, 16, 84, 88, 28, 10, 34, 100, 102, 40, 20, 42, 0}, a(22)={0, 44, 26, 52, 16, 24, 76, 66, 100, 72, 88, 42, 40, 82, 62, 86, 48, 54, 104, 92, 18, 94, 2, 60, 56, 96, 74, 96, 56, 60, 2, 94, 18, 92, 104, 54, 48, 86, 62, 82, 40, 42, 88, 72, 100, 66, 76, 24, 16, 52, 26, 44, 0}, a(23)={0, 46, 32, 64, 36, 54, 12, 16, 66, 56, 92, 68, 90, 52, 60, 8, 2, 42, 22, 48, 14, 26, 84, 82, 20, 4, 34, 4, 20, 82, 84, 26, 14, 48, 22, 42, 2, 8, 60, 52, 90, 68, 92, 56, 66, 16, 12, 54, 36, 64, 32, 46, 0}, a(24)={0, 48, 38, 76, 56, 84, 54, 72, 32, 40, 96, 94, 34, 22, 58, 36, 62, 30, 46, 4, 10, 64, 60, 104, 90, 18, 100, 18, 90, 104, 60, 64, 10, 4, 46, 30, 62, 36, 58, 22, 34, 94, 96, 40, 32, 72, 54, 84, 56, 76, 38, 48, 0}, a(25)={0, 50, 44, 88, 76, 8, 96, 22, 104, 24, 100, 14, 84, 98, 56, 64, 16, 18, 70, 66, 6, 102, 36, 20, 54, 32, 60, 32, 54, 20, 36, 102, 6, 66, 70, 18, 16, 64, 56, 98, 84, 14, 100, 24, 104, 22, 96, 8, 76, 88, 44, 50, 0}, a(26)={0, 52, 50, 100, 96, 38, 32, 78, 70, 8, 104, 40, 28, 68, 54, 92, 76, 6, 94, 22, 2, 34, 12, 42, 18, 46, 20, 46, 18, 42, 12, 34, 2, 22, 94, 6, 76, 92, 54, 68, 28, 40, 104, 8, 70, 78, 32, 38, 96, 100, 50, 52, 0}, a(27)={0, 54, 56, 6, 10, 68, 74, 28, 36, 98, 2, 66, 78, 38, 52, 14, 30, 100, 12, 84, 104, 72, 94, 64, 88, 60, 86, 60, 88, 64, 94, 72, 104, 84, 12, 100, 30, 14, 52, 38, 78, 66, 2, 98, 36, 28, 74, 68, 10, 6, 56, 54, 0}, a(28)={0, 56, 62, 18, 30, 98, 10, 84, 2, 82, 6, 92, 22, 8, 50, 42, 90, 88, 36, 40, 100, 4, 70, 86, 52, 74, 46, 74, 52, 86, 70, 4, 100, 40, 36, 88, 90, 42, 50, 8, 22, 92, 6, 82, 2, 84, 10, 98, 30, 18, 62, 56, 0}, a(29)={0, 58, 68, 30, 50, 22, 52, 34, 74, 66, 10, 12, 72, 84, 48, 70, 44, 76, 60, 102, 96, 42, 46, 2, 16, 88, 6, 88, 16, 2, 46, 42, 96, 102, 60, 76, 44, 70, 48, 84, 72, 12, 10, 66, 74, 34, 52, 22, 50, 30, 68, 58, 0}, a(30)={0, 60, 74, 42, 70, 52, 94, 90, 40, 50, 14, 38, 16, 54, 46, 98, 104, 64, 84, 58, 92, 80, 22, 24, 86, 102, 72, 102, 86, 24, 22, 80, 92, 58, 84, 64, 104, 98, 46, 54, 16, 38, 14, 50, 40, 90, 94, 52, 70, 42, 74, 60, 0}, a(31)={0, 62, 80, 54, 90, 82, 30, 40, 6, 34, 18, 64, 66, 24, 44, 20, 58, 52, 2, 14, 88, 12, 104, 46, 50, 10, 32, 10, 50, 46, 104, 12, 88, 14, 2, 52, 58, 20, 44, 24, 66, 64, 18, 34, 6, 40, 30, 82, 90, 54, 80, 62, 0}, a(32)={0, 64, 86, 66, 4, 6, 72, 96, 78, 18, 22, 90, 10, 100, 42, 48, 12, 40, 26, 76, 84, 50, 80, 68, 14, 24, 98, 24, 14, 68, 80, 50, 84, 76, 26, 40, 12, 48, 42, 100, 10, 90, 22, 18, 78, 96, 72, 6, 4, 66, 86, 64, 0}, a(33)={0, 66, 92, 78, 24, 36, 8, 46, 44, 2, 26, 10, 60, 70, 40, 76, 72, 28, 50, 32, 80, 88, 56, 90, 84, 38, 58, 38, 84, 90, 56, 88, 80, 32, 50, 28, 72, 76, 40, 70, 60, 10, 26, 2, 44, 46, 8, 36, 24, 78, 92, 66, 0}, a(34)={0, 68, 98, 90, 44, 66, 50, 102, 10, 92, 30, 36, 4, 40, 38, 104, 26, 16, 74, 94, 76, 20, 32, 6, 48, 52, 18, 52, 48, 6, 32, 20, 76, 94, 74, 16, 26, 104, 38, 40, 4, 36, 30, 92, 10, 102, 50, 66, 44, 90, 98, 68, 0}, a(35)={0, 70, 104, 102, 64, 96, 92, 52, 82, 76, 34, 62, 54, 10, 36, 26, 86, 4, 98, 50, 72, 58, 8, 28, 12, 66, 84, 66, 12, 28, 8, 58, 72, 50, 98, 4, 86, 26, 36, 10, 54, 62, 34, 76, 82, 52, 92, 96, 64, 102, 104, 70, 0}, a(36)={0, 72, 4, 8, 84, 20, 28, 2, 48, 60, 38, 88, 104, 86, 34, 54, 40, 98, 16, 6, 68, 96, 90, 50, 82, 80, 44, 80, 82, 50, 90, 96, 68, 6, 16, 98, 40, 54, 34, 86, 104, 88, 38, 60, 48, 2, 28, 20, 84, 8, 4, 72, 0}, a(37)={0, 74, 10, 20, 104, 50, 70, 58, 14, 44, 42, 8, 48, 56, 32, 82, 100, 86, 40, 68, 64, 28, 66, 72, 46, 94, 4, 94, 46, 72, 66, 28, 64, 68, 40, 86, 100, 82, 32, 56, 48, 8, 42, 44, 14, 58, 70, 50, 104, 20, 10, 74, 0}, a(38)={0, 76, 16, 32, 18, 80, 6, 8, 86, 28, 46, 34, 98, 26, 30, 4, 54, 74, 64, 24, 60, 66, 42, 94, 10, 2, 70, 2, 10, 94, 42, 66, 60, 24, 64, 74, 54, 4, 30, 26, 98, 34, 46, 28, 86, 8, 6, 80, 18, 32, 16, 76, 0}, a(39)={0, 78, 22, 44, 38, 4, 48, 64, 52, 12, 50, 60, 42, 102, 28, 32, 8, 62, 88, 86, 56, 104, 18, 10, 80, 16, 30, 16, 80, 10, 18, 104, 56, 86, 88, 62, 8, 32, 28, 102, 42, 60, 50, 12, 52, 64, 48, 4, 38, 44, 22, 78, 0}, a(40)={0, 80, 28, 56, 58, 34, 90, 14, 18, 102, 54, 86, 92, 72, 26, 60, 68, 50, 6, 42, 52, 36, 100, 32, 44, 30, 96, 30, 44, 32, 100, 36, 52, 42, 6, 50, 68, 60, 26, 72, 92, 86, 54, 102, 18, 14, 90, 34, 58, 56, 28, 80, 0}, a(41)={0, 82, 34, 68, 78, 64, 26, 70, 90, 86, 58, 6, 36, 42, 24, 88, 22, 38, 30, 104, 48, 74, 76, 54, 8, 44, 56, 44, 8, 54, 76, 74, 48, 104, 30, 38, 22, 88, 24, 42, 36, 6, 58, 86, 90, 70, 26, 64, 78, 68, 34, 82, 0}, a(42)={0, 84, 40, 80, 98, 94, 68, 20, 56, 70, 62, 32, 86, 12, 22, 10, 82, 26, 54, 60, 44, 6, 52, 76, 78, 58, 16, 58, 78, 76, 52, 6, 44, 60, 54, 26, 82, 10, 22, 12, 86, 32, 62, 70, 56, 20, 68, 94, 98, 80, 40, 84, 0}, a(43)={0, 86, 46, 92, 12, 18, 4, 76, 22, 54, 66, 58, 36, 88, 20, 38, 36, 14, 78, 16, 40, 44, 28, 98, 42, 72, 82, 72, 42, 98, 28, 44, 40, 16, 78, 14, 36, 38, 20, 88, 30, 58, 66, 54, 22, 76, 4, 18, 12, 92, 46, 86, 0}, a(44)={0, 88, 52, 104, 32, 48, 46, 26, 94, 38, 70, 84, 80, 58, 18, 66, 96, 2, 102, 78, 36, 82, 4, 14, 6, 86, 42, 86, 6, 14, 4, 82, 36, 78, 102, 2, 96, 66, 18, 58, 80, 84, 70, 38, 94, 26, 46, 48, 32, 104, 52, 88, 0}, a(45)={0, 90, 58, 10, 52, 78, 88, 82, 60, 22, 74, 4, 24, 28, 16, 94, 50, 96, 20, 34, 32, 14, 86, 36, 76, 100, 2, 100, 76, 36, 86, 14, 32, 34, 20, 96, 50, 94, 16, 28, 24, 4, 74, 22, 60, 82, 88, 78, 52, 10, 58, 90, 0}, a(46)={0, 92, 64, 22, 72, 2, 24, 32, 26, 6, 78, 30, 74, 104, 14, 16, 4, 84, 44, 96, 28, 52, 62, 58, 40, 8, 68, 8, 40, 58, 62, 52, 28, 96, 44, 84, 4, 16, 14, 104, 74, 30, 78, 6, 26, 32, 24, 2, 72, 22, 64, 92, 0}, a(47)={0, 94, 70, 34, 92, 32, 66, 88, 98, 96, 82, 56, 18, 74, 12, 44, 64, 72, 68, 52, 24, 90, 38, 80, 4, 22, 28, 22, 4, 80, 38, 90, 24, 52, 68, 72, 64, 44, 12, 74, 18, 56, 82, 96, 98, 88, 66, 32, 92, 34, 70, 94, 0}, a(48)={0, 96, 76, 46, 6, 62, 2, 38, 64, 80, 86, 82, 68, 44, 10, 72, 18, 60, 92, 8, 20, 22, 14, 102, 74, 36, 94, 36, 74, 102, 14, 22, 20, 8, 92, 60, 18, 72, 10, 44, 68, 82, 86, 80, 64, 38, 2, 62, 6, 46, 76, 96, 0}, a(49)={0, 98, 82, 58, 26, 92, 44, 94, 30, 64, 90, 2, 12, 14, 8, 100, 78, 48, 10, 70, 16, 60, 96, 18, 38, 50, 54, 50, 38, 18, 96, 60, 16, 70, 10, 48, 78, 100, 8, 14, 12, 2, 90, 64, 30, 94, 44, 92, 26, 58, 82, 98, 0}, a(50)={0, 100, 88, 70, 46, 16, 86, 44, 102, 48, 94, 28, 62, 90, 6, 22, 32, 36, 34, 26, 12, 98, 72, 40, 2, 64, 14, 64, 2, 40, 72, 98, 12, 26, 34, 36, 32, 22, 6, 90, 62, 28, 94, 48, 102, 44, 86, 16, 46, 70, 88, 100, 0}, a(51)={0, 102, 94, 82, 66, 46, 22, 100, 68, 32, 98, 54, 6, 60, 4, 50, 92, 24, 58, 88, 8, 30, 48, 62, 72, 78, 80, 78, 72, 62, 48, 30, 8, 88, 58, 24, 92, 50, 4, 60, 6, 54, 98, 32, 68, 100, 22, 46, 66, 82, 94, 102, 0}, and a(52)={0, 104, 100, 94, 86, 76, 64, 50, 34, 16, 102, 80, 56, 30, 2, 78, 46, 12, 82, 44, 4, 68, 24, 84, 36, 92, 40, 92, 36, 84, 24, 68, 4, 44, 82, 12, 46, 78, 2, 30, 56, 80, 102, 16, 34, 50, 64, 76, 86, 94, 100, 104, 0}.

Herein it should be noted that a number in the foregoing sequence set is equal to a number obtained after a modulo-2N operation is performed on rn(n+1) in the generation formula 1, and represents a complex-number point on a unit circle. For example, 104 in a(52) (the second element in a(52)) represents a complex number $$e^{\frac{i2\pi}{2*53}*52*1*(1+1)} = e^{\frac{i2\pi}{2*53}*104}.$$

In the embodiment of the present disclosure, each numeric value in the set may also be illustrated in a complete complex-number expression manner according to an actual requirement, which is not particularly limited in the present disclosure.

Afterward, a cyclic shift may be performed on the sequences in the basic sequence set to generate a complete long training sequence set C'. For example, as described above, if the sequence length is 53, a cyclic shift of 1 to 52 positions may be performed on, for example, a(1), to generate sequences a(1, 0), . . . , a(1, t), . . . , a(1, 52), where t indicates a quantity of positions cyclically shifted.

That is C'={$\hat{a}^{(1,0)}$, . . . $\hat{a}^{(1,52)}$, . . . , $\hat{a}^{(r,0)}$, . . . $\hat{a}^{(r,52)}$, . . . , $\hat{a}^{(52,0)}$, . . . , $\hat{a}^{(52,52)}$}, r={1, 2, . . . , 52}, where:

a(1, 0)={0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0}, a(1, 1)={2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0}, a(1, 2)={6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2}, a(1, 3)={12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6}, a(1, 4)={20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12}, a(1, 5)={30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20}, a(1, 6)={42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30}, a(1, 7)={56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42}, a(1, 8)={72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56}, a(1, 9)={90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72}, a(1, 10)={4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90}, a(1, 11)={26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4}, a(1, 12)={50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26}, a(1, 13)={76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50}, a(1, 14)={104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76}, a(1, 15)={28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104}, a(1, 16)={60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28}, a(1, 17)={94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60}, a(1, 18)={24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94}, a(1, 19)={62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24}, a(1, 20)={102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62}, a(1, 21)={38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102}, a(1, 22)={82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38}, a(1, 23)={22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82}, a(1, 24)={70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22}, a(1, 25)={14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70}, a(1, 26)={66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14}, a(1, 27)={14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66}, a(1, 28)={70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14}, a(1, 29)={22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70}, a(1, 30)={82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22}, a(1, 31)={38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82}, a(1, 32)={102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38}, a(1, 33)={62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102}, a(1, 34)={24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62}, a(1, 35)={94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24}, a(1, 36)={60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94}, a(1, 37)={28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60}, a(1, 38)={104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28}, a(1, 39)={76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104}, a(1, 40)={50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76}, a(1, 41)={26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50}, a(1, 42)={4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26}, a(1, 43)={90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4}, a(1, 44)={72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90}, a(1, 45)={56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72}, a(1, 46)={42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56}, a(1, 47)={30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42}, a(1, 48)={20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30}, a(1, 49)={12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20}, a(1, 50)={6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12}, a(1, 51)={2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6}, and a(1, 52)={0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2}.

The same method may be used to perform a cyclic shift on a(2) to a(52), and to avoid repetition, description thereof is omitted herein.

As described above, the long training sequence set C' is generated in the embodiment of the present disclosure. That is, in the method for generating the long training sequence according to the embodiment of the present disclosure, for example, if a quantity of available subcarriers in the system is 53, if a Zadoff-Chu sequence with a length of 53 is selected, 52×53=2756 long training sequences may be generated. Therefore, 2756 devices can be distinguished by using the long training sequences generated according to the embodiment of the present disclosure, and this quantity is far greater than a quantity of devices that can be distinguished by a partial association identifier, which may meet a development requirement as a quantity of users increases quickly.

It should be understood that the foregoing illustrated method for determining each parameter in the method for generating the long training sequence is only an example for description. A person skilled in the art may modify or select a used parameter at random according to the communications system to which the embodiment of the present disclosure is applied. For example, the length of the long training sequence may be set at random. For another example, after the foregoing basic long training sequence set C is obtained, no cyclic shift is performed, but instead, the basic long training sequence set C may be directly used as a long raining sequence set C', or cyclic shifts may be performed in a length range of the long training sequence for any times (in other words, any quantity of positions), which is not particularly limited in the present disclosure. In addition, in the embodiment of the present disclosure, for example, a pseudo-random sequence may also be used as a basic sequence for generating multiple LTSs used by the communications system, to generate the multiple different LTSs.

In addition, in the embodiment of the present disclosure, the device A may further number each long training sequence in the long training sequence set C' determined in the foregoing step S210, for example, may set sequence numbers of basic long training sequences to i=1, . . . , 52. Therefore, a shift of each long training sequence relative to the basic long training sequence is j=0, 1, . . . , 52. Therefore, the sequence number of each long training sequence in the long training sequence set C' may be set to LTS ID=(i−1)×53+j.

It should be understood that the foregoing illustrated numbering method is only an example for description, and that the present disclosure is not limited thereto. Other numbering methods that can be used to uniquely distinguish a long training sequence from the long training sequence set C' all fall within the protection scope of the present disclosure.

Afterward, the device A may group each receiving device in the system to determine at least one receiving device set. Each receiving device in a same receiving device set is a target receiving device of same data.

In the embodiment of the present disclosure, the foregoing grouping may be performed according to a preset rule. The preset rule may include the following rules:

For information that has strong pertinence to a geographical location, for example, earthquake and tsunami warning information and weather forecast information, target receiving devices of the information may be located at a same geographical location. Therefore, in the embodiment of the present disclosure, grouping may be performed according to the geographical location of each device in the system. In addition, the geographical location may be at any level, and is not particularly limited in the present disclosure, for example, may be a city level, may be a province level, or may be a country level.

For receiving devices that access services of a same service type, data that needs to be transmitted by a transmitting device may be the same. Therefore, in the embodiment of the present disclosure, grouping may be performed according to the service type of the services accessed by the devices in the system, and in addition, the service type may be set at random, and is not particularly limited in the present disclosure. For example, a video service, a web browse service, and a voice call service may be illustrated.

For receiving devices that have a same access permission, data that needs to be transmitted by a transmitting device may be the same. For example, for a receiving device whose access permission is only web browse, data that can be received by the receiving device is all data of a web page type. For another example, for a receiving device that is allowed to only a specified server, data that can be received by the receiving device all comes from the same server. Therefore, in the embodiment of the present disclosure, grouping may be performed according to an access permission of each device in the system, and in addition, the access permission may be any permission, and is not particularly limited in the present disclosure. For example, a permission that is set according to a service type allowed to be accessed, a permission that is set according to a geographical location of a receiving device, and a permission that is set according to a geographical location of a server that is allowed to be accessed by a receiving device may be illustrated.

For example, in a wireless local area network, for receiving devices with a same group identifier (Group ID), data transmitted by a transmitting device may be the same. For another example, in a cellular network, for receiving devices with a same cell identifier (Cell ID), data transmitted by a transmitting device is generally the same. Therefore, in the embodiment of the present disclosure, grouping may be performed according to a group identifier or a cell identifier of each device in the system, and in addition, in the present disclosure, group identifiers or cell identifiers of receiving devices in a receiving device set may be the same or may be different, which is not particularly limited in the present disclosure.

It should be understood that the foregoing illustrated grouping criteria are only examples for description, and that the present disclosure is not limited thereto. Other parameters that can be used as a grouping criterion all fall within the protection scope of the present disclosure.

It should be noted that in an embodiment of the present disclosure, for another example, if same data needs to be transmitted to all receiving devices in the system in different time periods, transmitting devices may also be grouped at random.

The device A may select, according to a quantity of the determined receiving device sets, a same quantity of long training sequences from the foregoing determined long training sequence set C', and use the long training sequences as set-use long training sequences.

Afterward, the device A may perform one-to-one mapping on the determined receiving device sets and the determined set-use long training sequences, that is, in the embodiment of the present disclosure, a receiving device set corresponds only to one set-use long training sequence, so that effect and reliability of the data transmission method in the embodiment of the present disclosure are improved.

It should be noted that because different receiving device sets correspond to different set-use long training sequences, in the embodiment of the present disclosure, the quantity of determined receiving device sets needs to be less than or equal to a quantity of long training sequences included in the determined long training sequence set.

The device A may transmit the foregoing determined mapping relationship (the first mapping relationship) between each receiving device set and each set-use long training sequence to each device in each receiving device set or each device in the system.

For example, the first mapping relationship may be a mapping relationship between identity information of receiving devices in the receiving device set and the set-use long training sequences.

In addition, in an embodiment of the present disclosure, the device A may select identity information of a device, where the identity information of the device is used to generate the foregoing first mapping relationship.

In an embodiment of the present disclosure, the identity information of the device refers to information that can uniquely identify the device when the communications system in the embodiment of the present disclosure is used. It should be noted that in the embodiment of the present disclosure, the identity information may be factory-set information in the device, or may be allocated by the system to the device, which is not particularly limited in the present disclosure.

In an embodiment of the present disclosure, the identity information may include information such as a Media Access Control (MAC, Media Access Control) address, an Internet Protocol (IP, Internet Protocol) address, a basic service set identifier (BSSID, Basic Service Set Identifier), an association identifier (AID, Association Identifier), a mobile phone number, an international mobile subscriber identity (IMSI, International Mobile Subscriber Identity), and an international mobile equipment identity (IMEI, International Mobile Equipment Identity). It should be understood that a user identifier in the embodiment of the present disclosure is not limited to the foregoing information. Other information elements that can uniquely indicate the user identifier all fall within the scope of the embodiment of the present disclosure.

In an embodiment of the present disclosure, the device A may select and use identity information that can uniquely identify the terminal device in each communications system. Therefore, all terminal devices that can be identified by the identity information may be considered as devices connected to and using the communications system in the embodiment of the present disclosure.

For ease of understanding, the following uses a MAC address as identity information for description.

First, a structure of the MAC address is described. FIG. 2 shows the structure of the MAC address. As shown in FIG. 2, the MAC address includes 48 bits, where:

an organization unique identifier (OUI, Organization Unique Identifier) occupies b24 to b47 bits of the MAC address, is allocated by the Institute of Electrical and Electronics Engineers (IEEE, Institute of Electrical and Electronics Engineers), and may be understood as an identifier of a device manufacturer; and a product serial number (PSN, Product Serial Number) occupies bits b0 to b23 of the MAC address, and is allocated by a device manufacturer.

In an embodiment of the present disclosure, for example, if an organization unique identifier (an example of the third sub-identity information) is different from organization unique identifiers of other receiving devices in the system, the organization unique identifier and the set-use long training sequence may be used to constitute the first mapping relationship.

Certainly, the whole MAC address (another example of the third sub-identity information) and the set-use long training sequence may be used to constitute the first mapping relationship.

The foregoing Table 1 shows an example of the first mapping relationship in the embodiment of the present disclosure.

For example, in a wireless local area network, for receiving devices that access a same access point (AP, Access Point), the system allocates a same Group ID (an example of the grouping information).

For another example, in a cellular network, for receiving devices that access a same base station, the system allocates a same Cell ID (another example of the grouping information).

Therefore, in the embodiment of the present disclosure, if the device A performs grouping according to the group identifier or cell identifier of each device in the system, the grouping information and the set-use long training sequence may be used to constitute the first mapping relationship.

The foregoing Table 2 shows another example of the first mapping relationship in the embodiment of the present disclosure.

For another example, if grouping is performed according to the feature information of the receiving device, the feature information and the set-use long training sequence may be used to constitute the first mapping relationship.

The foregoing Table 3 shows still another example of the first mapping relationship in the embodiment of the present disclosure.

In addition, in an embodiment of the present disclosure, after determining each receiving device set, the device A may notify (for example, by using first indication information) each receiving device in the system of receiving devices included in each receiving device set that are determined by the device A. Therefore, each receiving device may determine the receiving device set to which each receiving device belongs, and determine, according to the foregoing first indication information, a set-use long training sequence corresponding to the receiving device set.

When the device A needs to transmit data (the first data) to a receiving device set (the target receiving device set), the device A performs encapsulation processing on the data that needs to be transmitted, to generate a data packet (the first data packet). In the embodiment of the present disclosure, because the used long training sequence (the target set-use long training sequence) is different from a long training sequence used in the prior art, herein a process for generating a long training sequence symbol is mainly described in detail.

Specifically, when a quantity of subcarriers used in the system is greater than a quantity of elements in a long training sequence (or a sequence length), direct-current carrier components may be set to 0. Afterward, subcarriers with "a quantity same as the quantity of elements in the long training sequence" are selected from the indirect-current carrier components, and the elements in the long training sequence are mapped to the selected subcarriers one by one. Finally, a specific numeric value or a cyclic shift element of the long training sequence is inserted in the remaining subcarriers. For example, a numeric value "1" is inserted, used by the receiving device for channel estimation; or a numeric value "0" may be inserted, that is, no information is transmitted on the subcarriers.

When the quantity of subcarriers is equal to the quantity of elements in the long training sequence, one-to-one mapping may be performed on the elements in the long training sequence and the subcarriers, and afterward the direct-current carrier components may be set to 0.

When the quantity of subcarriers is less than the quantity of elements in the long training sequence, elements with "a quantity same as the quantity of subcarriers" may be selected from the elements in the long training sequence. Afterward, one-to-one mapping is performed on the selected elements and the subcarriers. Finally, the direct-current carrier components are set to 0.

In an embodiment of the present disclosure, the device A may add the target set-use long training sequence to the long training sequence field (field) in the physical layer of the data packet, and then transmit the data packet to each receiving device.

The device A, for example, may transmit the first data packet to each device (including the target receiving device set) in the system in a broadcast manner over an air interface. In the embodiment of the present disclosure, the method and process for transmitting the data packet may be the same as those in the prior art, and to avoid repetition, description thereof is omitted herein.

A device (hereinafter for ease of understanding and description, unless otherwise specified, a device C is used as an example for describing an action of the receiving device) that can receive the first indication information and the first data packet may determine the first mapping information in step S210. It should be noted that in the embodiment of the present disclosure, the device C may determine the first mapping relationship by itself by using the same method and process used by the device A, or may receive second indication information transmitted by the device A, and determine the foregoing first mapping relationship according to the second indication information.

That is, the determining, by a first receiving device in at least one receiving device in a communications system, a first mapping relationship, includes:

receiving second indication information transmitted by the transmitting device, where the second indication information is used to indicate the first mapping relationship; and determining the first mapping relationship according to the second indication information.

In step S220, the device C may determine a receiving device set (the first receiving device set) to which the device C belongs.

Optionally, the at least one receiving device set is determined according to grouping information of each receiving device in the communications system, the grouping information is allocated by the communications system and used to uniquely indicate one receiving device group in the communications system, and the receiving device group includes at least one receiving device; and the determining, from the at least one receiving device set, a first receiving device set to which the first receiving device belongs includes:

determining, according to grouping information of the first receiving device, the first receiving device set to which the first receiving device belongs.

In addition, the grouping information includes a group identifier Group ID or a cell identifier Cell ID.

Specifically, for example, in a wireless local area network, for receiving devices with a same group identifier (Group ID), data transmitted by a transmitting device may be the same. For another example, in a cellular network, for receiving devices with a same cell identifier (Cell ID), data transmitted by a transmitting device is generally the same. Therefore, in the embodiment of the present disclosure, grouping may be performed according to a group identifier or a cell identifier of each device in the system, and in addition, in the present disclosure, group identifiers or cell identifiers of receiving devices in a receiving device set may be the same or may be different, which is not particularly limited in the present disclosure.

Therefore, if the receiving device and the transmitting device perform grouping according to the grouping information, the device C may determine the first receiving device set according to the grouping information of the device C.

Optionally, the at least one receiving device set is determined according to feature information of each receiving device in the communications system, where the feature information includes any one of the following information:

a service type of a service accessed by the receiving device, a geographical location of the receiving device, an access permission of the receiving device, and a priority of the receiving device; and the determining, from the at least one receiving device set, a first receiving device set to which the first receiving device belongs includes:

determining, according to feature information of the first receiving device, the first receiving device set to which the first receiving device belongs.

Specifically, for information that has strong pertinence to a geographical location, for example, earthquake and tsunami warning information and weather forecast information, target receiving devices of the information may be located at a same geographical location. Therefore, in the embodiment of the present disclosure, grouping may be performed according to the geographical location of each device in the system. In addition, the geographical location may be at any level, and is not particularly limited in the present disclosure, for example, may be a city level, may be a province level, or may be a country level.

For receiving devices that access services of a same service type, data that needs to be transmitted by a transmitting device may be the same. Therefore, in the embodiment of the present disclosure, grouping may be performed according to the service type of the services accessed by the devices in the system, and in addition, the service type may be set at random, and is not particularly limited in the present disclosure. For example, a video service, a web browse service, and a voice call service may be illustrated.

For receiving devices that have a same access permission, data that needs to be transmitted by a transmitting device may be the same. For example, for a receiving device whose access permission is only web browse, data that can be received by the receiving device is all data of a web page type. For another example, for a receiving device that is allowed to access only a specified server, data that can be received by the receiving device all comes from the same server. Therefore, in the embodiment of the present disclosure, grouping may be performed according to an access permission of each device in the system, and in addition, the access permission may be any permission, and is not particularly limited in the present disclosure. For example, a permission that is set according to a service type allowed to be accessed, a permission that is set according to a geographical location of a receiving device, and a permission that is set according to a geographical location of a server that is allowed to be accessed by a receiving device may be illustrated.

Therefore, if the receiving device and the transmitting device perform grouping according to the feature information, the device C may determine the first receiving device set according to the feature information of the device C.

Optionally, the at least one receiving device set is determined by the transmitting device according to data that needs to be transmitted, where same data needs to be transmitted by the transmitting device to each receiving device in a same receiving device set; and the determining, from the at least one receiving device set, a first receiving device set to which the first receiving device belongs includes:

receiving first indication information, where the first indication information is used to indicate receiving devices included in each receiving device set; and determining, according to the first indication information, the first receiving device set to which the first receiving device belongs.

Specifically, the device A may determine each receiving device (hereinafter for ease of description, referred to as a to-be-communicated receiving device for short) to which data needs to be transmitted in a specified time period, and group the to-be-communicated receiving devices according to the data that needs to be transmitted, that is, group, into a same receiving device set, to-be-communicated receiving devices to which same data needs to be transmitted.

In this case, because the process is determined by the transmitting device, each receiving device in the system cannot know a receiving device set to which each receiving device belongs. Therefore, the device A needs to further transmit information (the first indication information) indicating receiving devices included in each receiving device set, to each receiving device in the system. Therefore, each receiving device in the system may determine, according to the first indication information, the receiving device set to which each receiving device belongs.

In addition, in an embodiment of the present disclosure, the first indication information may be specifically a part or all of identity information of the receiving devices included in each receiving device set.

In step S230, the device C may receive the first data packet transmitted by the device A, and may acquire, from the first data packet, the first long training sequence symbol indicating the target set-use long training sequence.

In step S240, the device C may parse the first long training sequence symbol to acquire the target set-use long training sequence.

In step S250, the device C may determine whether the device C belongs to the receiving device set corresponding to the target set-use long training sequence, or determine whether the device C is the target receiving device of the data packet that carries the target set-use long training sequence.

Optionally, the processing the first data packet according to the target set-use long training sequence, the first receiving device set, and the first mapping relationship includes:

determining, according to the first receiving device set and the first mapping relationship, a first set-use long training sequence corresponding to the first receiving device set; and if the first set-use long training sequence is the same as the target set-use long training sequence, acquiring the first data from the first data packet; or if the first set-use long training sequence is different from the target set-use long training sequence, discarding the first data packet.

In addition, optionally, the first mapping relationship is a mapping relationship between each set-use long training sequence and third sub-identity information in identity information of each receiving device in a corresponding receiving device set, where one piece of the identity information is used to uniquely indicate one receiving device in the communications system, and the third sub-identity information is a part or all of the identity information.

Specifically, if the first mapping relationship is a mapping relationship between a set-use long training sequence and third sub-identity information of each receiving device in a receiving device set (an example of the first mapping relationship), if third sub-identity information of the device C is the same as third sub-identity information (recorded in the first mapping relationship) corresponding to the target set-use long training sequence, the device C may determine that the device C is the target receiving device of the data packet that carries the target set-use long training sequence.

Herein it should be noted that in an embodiment of the present disclosure, the method for selecting the third sub-identity information by the receiving device needs to be consistent with the method for selecting the third sub-identity information by the transmitting device.

Optionally, the at least one receiving device set is determined by the transmitting device according to grouping information of each receiving device in the communications system, the grouping information is allocated by the communications system and used to uniquely indicate one receiving device group in the communications system, and the receiving device group includes at least one receiving device; and the first mapping relationship is a mapping relationship between each set-use long training sequence and grouping information of each receiving device in a corresponding receiving device set.

In addition, optionally, the grouping information includes a group identifier Group ID or a cell identifier Cell ID.

Specifically, if the first mapping relationship is a mapping relationship between a set-use long training sequence and grouping information of each receiving device in a receiving device set (another example of the first mapping relationship), if grouping information of the device C is the same as grouping information (recorded in the first mapping relationship) corresponding to the target set-use long training sequence, the device C may determine that the device C is the target receiving device of the data packet that carries the target set-use long training sequence.

Optionally, the at least one receiving device set is determined by the transmitting device according to feature information of each receiving device in the communications system, where the feature information includes any one of the following information:

a service type of a service accessed by the receiving device, a geographical location of the receiving device, an access permission of the receiving device, and a priority of the receiving device; and the first mapping relationship is a mapping relationship between each set-use long training sequence and feature information of each receiving device in a corresponding receiving device set.

Specifically, if the first mapping relationship is a mapping relationship between a set-use long training sequence and feature information of each receiving device in a receiving device set (still another example of the first mapping relationship), if feature information of the device C is the same as feature information (recorded in the first mapping relationship) corresponding to the target set-use long training sequence, the device C may determine that the device C is the target receiving device of the data packet that carries the target set-use long training sequence.

If the device C determines that the device C is the target receiving device of the data packet that carries the target set-use long training sequence, if the device C receives the data packet that carries the target set-use long training sequence, the device C may parse the data packet to acquire data.

If the device C determines that the device C is not the target receiving device of the data packet that carries the target set-use long training sequence, the device C may discard the data packet.

Optionally, the processing the first data packet according to the target set-use long training sequence, the first receiving device set, and the first mapping relationship includes:

determining, according to the first mapping relationship and the target set-use long training sequence, the target receiving device set corresponding to the target set-use long training sequence; and if the first receiving device set is the same as the target receiving device set, acquiring the first data from the first data packet; or if the first receiving device set is different from the target receiving device set, discarding the first data packet.

In addition, optionally, the first mapping relationship is a mapping relationship between each set-use long training sequence and third sub-identity information in identity information of each receiving device in a corresponding receiving device set, where one piece of the identity information is used to uniquely indicate one receiving device in the communications system, and the third sub-identity information is a part or all of the identity information.

Specifically, if the first mapping relationship is a mapping relationship between a set-use long training sequence and third sub-identity information of each receiving device in a receiving device set (an example of the first mapping relationship), if the device C may find, from the first mapping relationship, (one or more pieces of) third sub-identity information corresponding to the target set-use long training sequence, and the found third sub-identity information (any one of multiple pieces of third sub-identity information) is the same as the third sub-identity information of the device C, the device C may determine that the device C is the target receiving device of the data packet that carries the target set-use long training sequence.

Herein it should be noted that in an embodiment of the present disclosure, the method for selecting the third sub-identity information by the receiving device needs to be consistent with the method for selecting the third sub-identity information by the transmitting device.

Optionally, the at least one receiving device set is determined by the transmitting device according to grouping information of each receiving device in the communications system, the grouping information is allocated by the communications system and used to uniquely indicate one receiving device group in the communications system, and the receiving device group includes at least one receiving device; and the first mapping relationship is a mapping relationship between each set-use long training sequence and grouping information of each receiving device in a corresponding receiving device set.

In addition, the grouping information includes a group identifier Group ID or a cell identifier Cell ID.

Specifically, if the first mapping relationship is a mapping relationship between a set-use long training sequence and grouping information of each receiving device in a receiving device set (another example of the first mapping relationship), if the device C may find, from the first mapping relationship, (one or more pieces of) grouping information corresponding to the target set-use long training sequence, and the found grouping information (any one of multiple pieces of grouping information) is the same as the grouping information of the device C, the device C may determine that the device C is the target receiving device of the data packet that carries the target set-use long training sequence.

Optionally, the at least one receiving device set is determined by the transmitting device according to feature information of each receiving device in the communications system, where the feature information includes any one of the following information:

a service type of a service accessed by the receiving device, a geographical location of the receiving device, an access permission of the receiving device, and a priority of the receiving device; and the first mapping relationship is a mapping relationship between each set-use long training sequence and feature information of each receiving device in a corresponding receiving device set.

Specifically, if the first mapping relationship is a mapping relationship between a set-use long training sequence and feature information of each receiving device in a receiving device set (still another example of the first mapping relationship), if the device C may find, from the first mapping relationship, (one or more pieces of) feature information corresponding to the target set-use long training sequence, and the found feature information (any one of multiple pieces of feature information) is the same as the feature information of the device C, the device C may determine that the device C is the target receiving device of the data packet that carries the target set-use long training sequence.

If the device C determines that the device C is the target receiving device of the data packet that carries the target set-use long training sequence, if the device C receives the data packet that carries the target set-use long training sequence, the device C may parse the data packet to acquire data.

If the device C determines that the device C is not the target receiving device of the data packet that carries the target set-use long training sequence, the device C may discard the data packet.

According to the data transmission method in an embodiment of the present disclosure, a transmitting device notifies each receiving device in a communications system of a mapping relationship between each set-use long training sequence and each receiving device group; a first receiving device may determine a first set-use long training sequence corresponding to a receiving device set to which the first receiving device belongs; when the transmitting device needs to transmit data to a target device, a target set-use long training sequence corresponding to the target device may be carried in a physical layer of a data packet; therefore, the first receiving device may process the data packet according to a relationship between the first set-use long training sequence and the target set-use long training sequence, so that the first receiving device can determine, on condition that the first receiving device parses only a long training sequence field in the physical layer, whether the first receiving device is a target receiving device of the data packet. Therefore, burden of the receiving device can be reduced, waste of hardware resources can be reduced, and user experience can be improved.

Optionally, the method further includes:

determining the long training sequence set;

determining a second mapping relationship, where the second mapping relationship is a mapping relationship between each long training sequence in a long training sequence subset and first sub-identity information in identity information of each receiving device in the communications system, where one piece of the identity information is used to uniquely indicate one receiving device in the communications system, the first sub-identity information is a part or all of the identity information, the long training sequence subset belongs to the long training sequence set, and the long training sequence subset does not include the first set-use long training sequence;

when receiving a second data packet transmitted by the transmitting device, acquiring a second long training sequence symbol carried in a long training sequence field in a physical layer of the second data packet, where the second long training sequence symbol is used to indicate a target long training sequence, where the target long training sequence is selected by the transmitting device from the long training sequence subset according to first sub-identity information of a target receiving device of the second data packet and the second mapping relationship;

determining the target long training sequence according to the second long training sequence symbol; and processing the second data packet according to the target long training sequence.

Specifically, the device C (an example of the first receiving device, for example, may be an AP or a STA) in the communications system may predetermine a long training sequence set including multiple long training sequences (LTSs, Long Training Sequences).

In the embodiment of the present disclosure, the long training sequence set may be generated by each device (including the receiving device and the transmitting device) in the system according to a preset rule, or may be generated by an external device independent of the receiving device and the transmitting device according to the preset rule and delivered to each device (including the receiving device and the transmitting device) in the system. For ease of understanding and description, the following uses the device A as an execution entity to describe a method and a process for generating the long training sequence set.

Optionally, the long training sequence is a sequence with good correlation properties.

The sequence with good correlation properties is any one of the following sequences:

a polyphase perfect sequence, a Gold sequence, a Gold-like sequence, and a pseudo-random sequence, for example, an m sequence.

In addition, the polyphase perfect sequence is any one of the following sequences: a Zadoff-Chu sequence, a Frank sequence, a Combined Frank/Zadoff-Chu sequence, and the like.

Specifically, currently, a great progress is made in a sequence design field, and people's research emphasis has shifted from a binary pseudo-random sequence to a sequence with good correlation properties such as a polyphase perfect sequence (Perfect sequence). Because the sequence with good correlation properties has good auto-correlation properties and cross-correlation properties, in the embodiment of the present disclosure, the sequence with good correlation properties may be used as the LTS. Therefore, the receiving device may use the good autocorrelation properties and cross-correlation properties of the LTS to accurately determine whether the LTS allocated by the system to the receiving device is the same as the LTS carried in the data packet, and therefore, can determine whether the receiving device is the target receiving device of the data packet (this process is described later in detail). In addition, by using, for example, the polyphase perfect sequence, properties (for example, formula generation) of the polyphase perfect sequence can be used to generate multiple LTSs quickly and conveniently and determine a mapping relationship between the multiple LTSs and receiving devices (specifically, first sub-identity information of each receiving device) (this process is described later in detail).

The sequences with good correlation properties may include a polyphase perfect sequence, a Gold sequence, and a pseudo-random sequence with good correlation properties. Herein, properties, concepts, and the like of the polyphase perfect sequence, the Gold sequence, and the pseudo-random sequence may be similar to those in the prior art, and to avoid repetition, description thereof is omitted herein. In addition, it should be noted that the foregoing illustrated sequences used as the sequences with good correlation properties are only examples for description, and the present disclosure is not limited thereto. Other sequences with good correlation properties all fall within the protection scope of the present disclosure.

The polyphase perfect sequence, a Zadoff-Chu sequence, a Frank sequence, a Combined Frank/Zadoff-Chu sequence, and the like. Herein, properties, concepts, and the like of the Zadoff-Chu sequence, the Frank sequence, or the Combined Frank/Zadoff-Chu sequence may be similar to those in the prior art (for example, a sequence length of the Frank sequence can only be the square of a natural number), and to avoid repetition, description thereof is omitted herein. In addition, it should be noted that the foregoing illustrated sequences used as the polyphase perfect sequence are only examples for description, and the present disclosure is not limited thereto. Other sequences that can be used as the polyphase perfect sequence, namely, sequences that have ideal autocorrelation properties and optimum cross-correlation properties, all fall within the protection scope of the present disclosure. For ease of understanding and description, exemplarily, the following uses the Zadoff-Chu sequence as a long training sequence to describe a process for generating the long training sequence set in the embodiment of the present disclosure.

In an embodiment of the present disclosure, a long training sequence set with multiple LTSs may be generated according to the properties of the polyphase perfect sequence (herein, specifically, properties of the Zadoff-Chu sequence) by using a conventional Zadoff-Chu sequence generation formula.

For example, a length of the Zadoff-Chu sequence may be set according to a preset rule, and a basic long training sequence set C may be determined according to the determined sequence length and the foregoing formula 1.

Optionally, a length of the long training sequence is determined according to a quantity of available subcarriers in the communications system.

Specifically, in an embodiment of the present disclosure, because the long training sequence is used for channel estimation, for example, if the length of the long training sequence is equal to the quantity of available subcarriers in the communications system, each element in the long training sequence can correspond to each subcarrier on a one-to-one basis, and therefore, accuracy of channel estimation is improved.

First, the device C may determine a system bandwidth. For example, the device C may acquire a bandwidth parameter (CH_BANDWIDTH) from a transceiver (TRX, Transceiver), determine the system bandwidth according to the bandwidth parameter, and further determine the quantity of available subcarriers in the system. For example, in a Wi-Fi system of the IEEE 802.11g standard, when the system bandwidth is 20 megahertz (MHz), the quantity of available subcarriers in the system is 53.

As described above, when the Zadoff-Chu sequence is selected, a quantity of sequences included in the sequence set can be as great as possible if the sequence length is less than or equal to a quantity of subcarriers, and therefore a quantity of represented receiving devices can be increased. In the following description, exemplarily, the sequence length is set to 53.

If the sequence length is set to 53 (namely, N=53), according to the foregoing formula 1, the following basic long training sequence set C may be generated:

$$C=\{\hat{a}^{(1)}, \ldots, \hat{a}^{(r)}, \ldots, \hat{a}^{(52)}\}, r=\{1,2,\ldots,52\},$$
where:

a(1)={0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0}, a(2)={0, 4, 12, 24, 40, 60, 84, 6, 38, 74, 8, 52, 100, 46, 102, 56, 14, 82, 48, 18, 98, 76, 58, 44, 34, 28, 26, 28, 34, 44, 58, 76, 98, 18, 48, 82, 14, 56, 102, 46, 100, 52, 8, 74, 38, 6, 84, 60, 40, 24, 12, 4, 0}, a(3)={0, 6, 18, 36, 60, 90, 20, 62, 4, 58, 12, 78, 44, 16, 100, 84, 74, 70, 72, 80, 94, 8, 34, 66, 104, 42, 92, 42, 104, 66, 34, 8, 94, 80, 72, 70, 74, 84, 100, 16, 44, 78, 12, 58, 4, 62, 20, 90, 60, 36, 18, 6, 0}, a(4)={0, 8, 24, 48, 80, 14, 62, 12, 76, 42, 16, 104, 94, 92, 98, 6, 28, 58, 96, 36, 90, 46, 10, 88, 68, 56, 52, 56, 68, 88, 10, 46, 90, 36, 96, 58, 28, 6, 98, 92, 94, 104, 16, 42, 76, 12, 62, 14, 80, 48, 24, 8, 0}, a(5)={0, 10, 30, 60, 100, 44, 104, 68, 42, 26, 20, 24, 38, 62, 96, 34, 88, 46, 14, 98, 86, 84, 92, 4, 32, 70, 12, 70, 32, 4, 92, 84, 86, 98, 14, 46, 88, 34, 96, 62, 38, 24, 20, 26, 42, 68, 104, 44, 100, 60, 30, 10, 0}, a(6)={0, 12, 36, 72, 14, 74, 40, 18, 8, 10, 24, 50, 88, 32, 94, 62, 42, 34, 38, 54, 82, 16, 68, 26, 102, 84, 78, 84, 102, 26, 68, 16, 82, 54, 38, 34, 42, 62, 94, 32, 88, 50, 24, 10, 8, 18, 40, 74, 14, 72, 36, 12, 0}, a(7)={0, 14, 42, 84, 34, 104, 82, 74, 80, 100, 28, 76, 32, 2, 92, 90, 102, 22, 62, 10, 78, 54, 44, 48, 66, 98, 38, 98, 66, 48, 44, 54, 78, 10, 62, 22, 102, 90, 92, 2, 32, 76, 28, 100, 80, 74, 82, 104, 34, 84, 42, 14, 0}, a(8)={0, 16, 48, 96, 54, 28, 18, 24, 46, 84, 32, 102, 82, 78, 90, 12, 56, 10, 86, 72, 74, 92, 20, 70, 30, 6, 104, 6, 30, 70, 20, 92, 74, 72, 86, 10, 56, 12, 90, 78, 82, 102, 32, 84, 46, 24, 18, 28, 54, 96, 48, 16, 0}, a(9)={0, 18, 54, 2, 74, 58, 60, 80, 12, 68, 36, 22, 26, 48, 88, 40, 10, 104, 4, 28, 70, 24, 102, 92, 100, 20, 64, 20, 100, 92, 102, 24, 70, 28, 4, 104, 10, 40, 88, 48, 26, 22, 36, 68, 12, 80, 60, 58, 74, 2, 54, 18, 0}, a(10)={0, 20, 60, 14, 94, 88, 102, 30, 84, 52, 40, 48, 76, 18, 86, 68, 70, 92, 28, 90, 66, 62, 78, 8, 64, 34, 24, 34, 64, 8, 78, 62, 66, 90, 28, 92, 70, 68, 86, 18, 76, 48, 40, 52, 84, 30, 102, 88, 94, 14, 60, 20, 0}, a(11)={0, 22, 66, 26, 8, 12, 38, 86, 50, 36, 44, 74, 20, 94, 84, 96, 24, 80, 52, 46, 62, 100, 54, 30, 28, 48, 90, 48, 28, 30, 54, 100, 62, 46, 52, 80, 24, 96, 84, 94, 20, 74, 44, 36, 50, 86, 38, 12, 8, 26, 66, 22, 0}, a(12)={0, 24, 72, 38, 28, 42, 80, 36, 16, 20, 48, 100, 70, 64, 82, 18, 84, 68, 76, 2, 58, 32, 30, 52, 98, 62, 50, 62, 98, 52, 30, 32, 58, 2, 76, 68, 84, 18, 82, 64, 70, 100, 48, 20, 16, 36, 80, 42, 28, 38, 72, 24, 0}, a(13)={0, 26, 78, 50, 48, 72, 16, 92, 88, 4, 52, 20, 14, 34, 80, 46, 38, 56, 100, 64, 54, 70, 6, 74, 62, 76, 10, 76, 62, 74, 6, 70, 54, 64, 100, 56, 38, 46, 80, 34, 14, 20, 52, 4, 88, 92, 16, 72, 48, 50, 78, 26, 0}, a(14)={0, 28, 84, 62, 68, 102, 58, 42, 54, 94, 56, 46, 64, 4, 78, 74, 98, 44, 18, 20, 50, 2, 88, 96, 26, 90, 76, 90, 26, 96, 88, 2, 50, 20, 18, 44, 98, 74, 78, 4, 64, 46, 56, 94, 54, 42, 58, 102, 68, 62, 84, 28, 0}, a(15)={0, 30, 90, 74, 88, 26, 100, 98, 20, 78, 60, 72, 8, 80, 76, 102, 52, 32, 42, 82, 46, 40, 64, 12, 96, 104, 36, 104, 96, 12, 64, 40, 46, 82, 42, 32, 52, 102, 76, 80, 8, 72, 60, 78, 20, 98, 100, 26, 88, 74, 90, 30, 0}, a(16)={0, 32, 96, 86, 2, 56, 36, 48, 92, 62, 64, 98, 58, 50, 74, 24, 6, 20, 66, 38, 42, 78, 40, 34, 60, 12, 102, 12, 60, 34, 40, 78, 42, 38, 66, 20, 6, 24, 74, 50, 58, 98, 64, 62, 92, 48, 36, 56, 2, 86, 96, 32, 0}, a(17)={0, 34, 102, 98, 22, 86, 78, 104, 58, 46, 68, 18, 2, 20, 72, 52, 66, 8, 90, 100, 38, 10, 16, 56, 24, 26, 62, 26, 24, 56, 16, 10, 38, 100, 90, 8, 66, 52, 72, 20, 2, 18, 68, 46, 58, 104, 78, 86, 22, 98, 102, 34, 0}, a(18)={0, 36, 2, 4, 42, 10, 14, 54, 24, 30, 72, 44, 52, 96, 70, 80, 20, 102, 8, 56, 34, 48, 98, 78, 94, 40, 22, 40, 94, 78, 98, 48, 34, 56, 8, 102, 20, 80, 70, 96, 52, 44, 72, 30, 24, 54, 14, 10, 42, 4, 2, 36, 0}, a(19)={0, 38, 8, 16, 62, 40, 56, 4, 96, 14, 76, 70, 102, 66, 68, 2, 80, 90, 32, 12, 30, 86, 74, 100, 58, 54, 88, 54, 58, 100, 74, 86, 30, 12, 32, 90, 80, 2, 68, 66, 102, 70, 76, 14, 96, 4, 56, 40, 62, 16, 8, 38, 0}, a(20)={0, 40, 14, 28, 82, 70, 98, 60, 62, 104, 80, 96, 46, 36, 66, 30, 34, 78, 56, 74, 26, 18, 50, 16, 22, 68, 48, 68, 22, 16, 50, 18, 26, 74, 56, 78, 34, 30, 66, 36, 46, 96, 80, 104, 62, 60, 98, 70, 82, 28, 14, 40, 0}, a(21)={0, 42, 20, 40, 102, 100, 34, 10, 28, 88, 84, 16, 96, 6, 64, 58, 94, 66, 80, 30, 22, 56, 26, 38, 92, 82, 8, 82, 92, 38, 26, 56, 22, 30, 80, 66, 94, 58, 64, 6, 96, 16, 84, 88, 28, 10, 34, 100, 102, 40, 20, 42, 0}, a(22)={0, 44, 26, 52, 16, 24, 76, 66, 100, 72, 88, 42, 40, 82, 62, 86, 48, 54, 104, 92, 18, 94, 2, 60, 56, 96, 74, 96, 56, 60, 2, 94, 18, 92, 104, 54, 48, 86, 62, 82, 40, 42, 88, 72, 100, 66, 76, 24, 16, 52, 26, 44, 0}, a(23)={0, 46, 32, 64, 36, 54, 12, 16, 66, 56, 92, 68, 90, 52, 60, 8, 2, 42, 22, 48, 14, 26, 84, 82, 20, 4, 34, 4, 20, 82, 84, 26, 14, 48, 22, 42, 2, 8, 60, 52, 90, 68, 92, 56, 66, 16, 12, 54, 36, 64, 32, 46, 0}, a(24)={0, 48, 38, 76, 56, 84, 54, 72, 32, 40, 96, 94, 34, 22, 58, 36, 62, 30, 46, 4, 10, 64, 60, 104, 90, 18, 100, 18, 90, 104, 60, 64, 10, 4, 46, 30, 62, 36, 58, 22, 34, 94, 96, 40, 32, 72, 54, 84, 56, 76, 38, 48, 0}, a(25)={0, 50, 44, 88, 76, 8, 96, 22, 104, 24, 100, 14, 84, 98, 56, 64, 16, 18, 70, 66, 6, 102, 36, 20, 54, 32, 60, 32, 54, 20, 36, 102, 6, 66, 70, 18, 16, 64, 56, 98, 84, 14, 100, 24, 104, 22, 96, 8, 76, 88, 44, 50, 0}, a(26)={0, 52, 50, 100, 96, 38, 32, 78, 70, 8, 104, 40, 28, 68, 54, 92, 76, 6, 94, 22, 2, 34, 12, 42, 18, 46, 20, 46, 18, 42, 12, 34, 2, 22, 94, 6, 76, 92, 54, 68, 28, 40, 104, 8, 70, 78, 32, 38, 96, 100, 50, 52, 0}, a(27)={0, 54, 56, 6, 10, 68, 74, 28, 36, 98, 2, 66, 78, 38, 52, 14, 30, 100, 12, 84, 104, 72, 94, 64, 88, 60, 86, 60, 88, 64, 94, 72, 104, 84, 12, 100, 30, 14, 52, 38, 78, 66, 2, 98, 36, 28, 74, 68, 10, 6, 56, 54, 0}, a(28)={0, 56, 62, 18, 30, 98, 10, 84, 2, 82, 6, 92, 22, 8, 50, 42, 90, 88, 36, 40, 100, 4, 70, 86, 52, 74, 46, 74, 52, 86, 70, 4, 100, 40, 36, 88, 90, 42, 50, 8, 22, 92, 6, 82, 2, 84, 10, 98, 30, 18, 62, 56, 0}, a(29)={0, 58, 68, 30, 50, 22, 52, 34, 74, 66, 10, 12, 72, 84, 48, 70, 44, 76, 60, 102, 96, 42, 46, 2, 16, 88, 6, 88, 16, 2, 46, 42, 96, 102, 60, 76, 44, 70, 48, 84, 72, 12, 10, 66, 74, 34, 52, 22, 50, 30, 68, 58, 0}, a(30)={0, 60, 74, 42, 70, 52, 94, 90, 40, 50, 14, 38, 16, 54, 46, 98, 104, 64, 84, 58, 92, 80, 22, 24, 86, 102, 72, 102, 86, 24, 22, 80, 92, 58, 84, 64, 104, 98, 46, 54, 16, 38, 14, 50, 40, 90, 94, 52, 70, 42, 74, 60, 0}, a(31)={0, 62, 80, 54, 90, 82, 30, 40, 6, 34, 18, 64, 66, 24, 44, 20, 58, 52, 2, 14, 88, 12, 104, 46, 50, 10, 32, 10, 50, 46, 104, 12, 88, 14, 2, 52, 58, 20, 44, 24, 66, 64, 18, 34, 6, 40, 30, 82, 90, 54, 80, 62, 0}, a(32)={0, 64, 86, 66, 4, 6, 72, 96, 78, 18, 22, 90, 10, 100, 42, 48, 12, 40, 26, 76, 84, 50, 80, 68, 14, 24, 98, 24, 14, 68, 80, 50, 84, 76, 26, 40, 12, 48, 42, 100, 10, 90, 22, 18, 78, 96, 72, 6, 4, 66, 86, 64, 0}, a(33)={0, 66, 92, 78, 24, 36, 8, 46, 44, 2, 26, 10, 60, 70, 40, 76, 72, 28, 50, 32, 80, 88, 56, 90, 84, 38, 58, 38, 84, 90, 56, 88, 80, 32, 50, 28, 72, 76, 40, 70, 60, 10, 26, 2, 44, 46, 8, 36, 24, 78, 92, 66, 0}, a(34)={0, 68, 98, 90, 44, 66, 50, 102, 10, 92, 30, 36, 4, 40, 38, 104, 26, 16, 74, 94, 76, 20, 32, 6, 48, 52, 18, 52, 48, 6, 32, 20, 76, 94, 74, 16, 26, 104, 38, 40, 4, 36, 30, 92, 10, 102, 50, 66, 44, 90, 98, 68, 0}, a(35)={0, 70, 104, 102, 64, 96, 92, 52, 82, 76, 34, 62, 54, 10, 36, 26, 86, 4, 98, 50, 72, 58, 8, 28, 12, 66, 84, 66, 12, 28, 8, 58, 72, 50, 98, 4, 86, 26, 36, 10, 54, 62, 34, 76, 82, 52, 92, 96, 64, 102, 104, 70, 0}, a(36)={0, 72, 4, 8, 84, 20, 28, 2, 48, 60, 38, 88, 104, 86, 34, 54, 40, 98, 16, 6, 68, 96, 90, 50, 82, 80, 44, 80, 82, 50, 90, 96, 68, 6, 16, 98, 40, 54, 34, 86, 104, 88, 38, 60, 48, 2, 28, 20, 84, 8, 4, 72, 0}, a(37)={0, 74, 10, 20, 104, 50, 70, 58, 14, 44, 42, 8, 48, 56, 32, 82, 100, 86, 40, 68, 64, 28, 66, 72, 46, 94, 4, 94, 46, 72, 66, 28, 64, 68, 40, 86, 100, 82, 32, 56, 48, 8, 42, 44, 14, 58, 70, 50, 104, 20, 10, 74, 0}, a(38)={0, 76, 16, 32, 18, 80, 6, 8, 86, 28, 46, 34, 98, 26, 30, 4, 54, 74, 64, 24, 60, 66, 42, 94, 10, 2, 70, 2, 10, 94, 42, 66, 60, 24, 74, 54, 4, 30, 26, 98, 34, 46, 28, 86, 8, 6, 80, 18, 32, 16, 76, 0}, a(39)={0, 78, 22, 44, 38, 4, 48, 64, 52, 12, 50, 60, 42, 102, 28, 32, 8, 62, 88, 86, 56, 104, 18, 10, 80, 16, 30, 16, 80, 10, 18, 104, 56, 86, 88, 62, 8, 32, 28, 102, 42, 60, 50, 12, 52, 64, 48, 4, 38, 44, 22, 78, 0}, a(40)={0, 80, 28, 56, 58, 34, 90, 14, 18, 102, 54, 86, 92, 72, 26, 60, 68, 50, 6, 42, 52, 36, 100, 32, 44, 30, 96, 30, 44, 32, 100, 36, 52, 42, 6, 50, 68, 60, 26, 72, 92, 86, 54, 102, 18, 14, 90, 34, 58, 56, 28, 80, 0}, a(41)={0, 82, 34, 68, 78, 64, 26, 70, 90, 86, 58, 6, 36, 42, 24, 88, 22, 38, 30, 104, 48, 74, 76, 54, 8, 44, 56, 44, 8, 54, 76, 74, 48, 104, 30, 38, 22, 88, 24, 42, 36, 6, 58, 86, 90, 70, 26, 64, 78, 68, 34, 82, 0}, a(42)={0, 84, 40, 80, 98, 94, 68, 20, 56, 70, 62, 32, 86, 12, 22, 10, 82, 26, 54, 60, 44, 6, 52, 76, 78, 58, 16, 58, 78, 76, 52, 6, 44, 60, 54, 26, 82, 10, 22, 12, 86, 32, 62, 70, 56, 20, 68, 94, 98, 80, 40, 84, 0}, a(43)={0, 86, 46, 92, 12, 18, 4, 76, 22, 54, 66, 58, 30, 88, 20, 38, 36, 14, 78, 16, 40, 44, 28, 98, 42, 72, 82, 72, 42, 98, 28, 44, 40, 16, 78, 14, 36, 38, 20, 88, 30, 58, 66, 54, 22, 76, 4, 18, 12, 92, 46, 86, 0}, a(44)={0, 88, 52, 104, 32, 48, 46, 26, 94, 38, 70, 84, 80, 58, 18, 66, 96, 2, 102, 78, 36, 82, 4, 14, 6, 86, 42, 86, 6, 14, 4, 82, 36, 78, 102, 2, 96, 66, 18, 58, 80, 84, 70, 38, 94, 26, 46, 48, 32, 104, 52, 88, 0}, a(45)={0, 90, 58, 10, 52, 78, 88, 82, 60, 22, 74, 4, 24, 28, 16, 94, 50, 96, 20, 34, 32, 14, 86, 36, 76, 100, 2, 100, 76, 36, 86, 14, 32, 34, 20, 96, 50, 94, 16, 28, 24, 4, 74, 22, 60, 82, 88, 78, 52, 10, 58, 90, 0}, a(46)={0, 92, 64, 22, 72, 2, 24, 32, 26, 6, 78, 30, 74, 104, 14, 16, 4, 84, 44, 96, 28, 52, 62, 58, 40, 8, 68, 8, 40, 58, 62, 52, 28, 96, 44, 84, 4, 16, 14, 104, 74, 30, 78, 6, 26, 32, 24, 2, 72, 22, 64, 92, 0}, a(47)={0, 94, 70, 34, 92, 32, 66, 88, 98, 96, 82, 56, 18, 74, 12, 44, 64, 72, 68, 52, 24, 90, 38, 80, 4, 22, 28, 22, 4, 80, 38, 90, 24, 52, 68, 72, 64, 44, 12, 74, 18, 56, 82, 96, 98, 88, 66, 32, 92, 34, 70, 94, 0}, a(48)={0, 96, 76, 46, 6, 62, 2, 38, 64, 80, 86, 82, 68, 44, 10, 72, 18, 60, 92, 8, 20, 22, 14, 102, 74, 36, 94, 36, 74, 102, 14, 22, 20, 8, 92, 60, 18, 72, 10, 44, 68, 82, 86, 80, 64, 38, 2, 62, 6, 46, 76, 96, 0}, a(49)={0, 98, 82, 58, 26, 92, 44, 94, 30, 64, 90, 2, 12, 14, 8, 100, 78, 48, 10, 70, 16, 60, 96, 18, 38, 50, 54, 50, 38, 18, 96, 60, 16, 70, 10, 48, 78, 100, 8, 14, 12, 2, 90, 64, 30, 94, 44, 92, 26, 58, 82, 98, 0}, a(50)={0, 100, 88, 70, 46, 16, 86, 44, 102, 48, 94, 28, 62, 90, 6, 22, 32, 36, 34, 26, 12, 98, 72, 40, 2, 64, 14, 64, 2, 40, 72, 98, 12, 26, 34, 36, 32, 22, 6, 90, 62, 28, 94, 48, 102, 44, 86, 16, 46, 70, 88, 100, 0}, a(51)={0, 102, 94, 82, 66, 46, 22, 100, 68, 32, 98, 54, 6, 60, 4, 50, 92, 24, 58, 88, 8, 30, 48, 62, 72, 78, 80, 78, 72, 62, 48, 30, 8, 88, 58, 24, 92, 50, 4, 60, 6, 54, 98, 32, 68, 100, 22, 46, 66, 82, 94, 102, 0}, and a(52)={0, 104, 100, 94, 86, 76, 64, 50, 34, 16, 102, 80, 56, 30, 2, 78, 46, 12, 82, 44, 4, 68, 24, 84, 36, 92, 40, 92, 36, 84, 24, 68, 4, 44, 82, 12, 46, 78, 2, 30, 56, 80, 102, 16, 34, 50, 64, 76, 86, 94, 100, 104, 0}.

Herein it should be noted that a number in the foregoing sequence set is equal to a number obtained after a modulo-2N operation is performed on rn(n+1) in the generation formula 1, and represents a complex-number point on a unit circle. For example, 104 in a(52) (the second element in a(52)) represents a complex number $$e^{\frac{i2\pi}{2*53}*52*1*(1+1)} = e^{\frac{i2\pi}{2*53}*104}.$$

In the embodiment of the present disclosure, each numeric value in the set may also be illustrated in a complete complex-number expression manner according to an actual requirement, which is not particularly limited in the present disclosure.

Afterward, a cyclic shift may be performed on the sequences in the basic sequence set to generate a complete long training sequence set C'. For example, as described above, if the sequence length is 53, a cyclic shift of 1 to 52 positions may be performed on, for example, a(1), to generate sequences a(1, 0), . . . , a(1, t), . . . , a(1, 52), where t indicates a quantity of positions cyclically shifted.

That is C'={â$^{(1,0)}$, . . . â$^{(1,52)}$, . . . , â$^{(r,0)}$, . . . â$^{(r,52)}$, . . . , â$^{(52,0)}$, . . . , â$^{(52,52)}$}, r={1, 2, . . . , 52}, where:

a(1, 0)={0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0}, a(1, 1)={2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0}, a(1, 2)={6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2}, a(1, 3)={12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6}, a(1, 4)={20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12}, a(1, 5)={30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20}, a(1, 6)={42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30}, a(1, 7)={56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42}, a(1, 8)={72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56}, a(1, 9)={90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72}, a(1, 10)={4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90}, a(1, 11)={26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4}, a(1, 12)={50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26}, a(1, 13)={76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50}, a(1, 14)={104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76}, a(1, 15)={28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104}, a(1, 16)={60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28}, a(1, 17)={94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60}, a(1, 18)={24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94}, a(1, 19)={62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24}, a(1, 20)={102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62}, a(1, 21)={38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102}, a(1, 22)={82, 22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38}, a(1, 23)={22, 70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82}, a(1, 24)={70, 14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22}, a(1, 25)={14, 66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70}, a(1, 26)={66, 14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14}, a(1, 27)={14, 70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66}, a(1, 28)={70, 22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14}, a(1, 29)={22, 82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70}, a(1, 30)={82, 38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22}, a(1, 31)={38, 102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82}, a(1, 32)={102, 62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38}, a(1, 33)={62, 24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102}, a(1, 34)={24, 94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62}, a(1, 35)={94, 60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24}, a(1, 36)={60, 28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94}, a(1, 37)={28, 104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60}, a(1, 38)={104, 76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28}, a(1, 39)={76, 50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104}, a(1, 40)={50, 26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76}, a(1, 41)={26, 4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50}, a(1, 42)={4, 90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26}, a(1, 43)={90, 72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4}, a(1, 44)={72, 56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90}, a(1, 45)={56, 42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72}, a(1, 46)={42, 30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56}, a(1, 47)={30, 20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42}, a(1, 48)={20, 12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30}, a(1, 49)={12, 6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20}, a(1, 50)={6, 2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12}, a(1, 51)={2, 0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6}, and a(1, 52)={0, 0, 2, 6, 12, 20, 30, 42, 56, 72, 90, 4, 26, 50, 76, 104, 28, 60, 94, 24, 62, 102, 38, 82, 22, 70, 14, 66, 14, 70, 22, 82, 38, 102, 62, 24, 94, 60, 28, 104, 76, 50, 26, 4, 90, 72, 56, 42, 30, 20, 12, 6, 2}.

The same method may be used to perform a cyclic shift on a(2) to a(52), and to avoid repetition, description thereof is omitted herein.

As described above, the long training sequence set C' is generated in the embodiment of the present disclosure. That is, in the method for generating the long training sequence according to the embodiment of the present disclosure, for example, if a quantity of available subcarriers in the system is 53, if a Zadoff-Chu sequence with a length of 53 is selected, 52×53=2756 long training sequences may be generated. Therefore, 2756 devices can be distinguished by using the long training sequences generated according to the embodiment of the present disclosure, and this quantity is far greater than a quantity of devices that can be distinguished by a partial association identifier, which may meet a development requirement as a quantity of users increases quickly.

It should be understood that the foregoing illustrated method for determining each parameter in the method for generating the long training sequence is only an example for description. A person skilled in the art may modify or select a used parameter at random according to the communications system to which the embodiment of the present disclosure is applied. For example, the length of the long training sequence may be set at random. For another example, after the foregoing basic long training sequence set C is obtained, no cyclic shift is performed, but instead, the basic long training sequence set C may be directly used as a long raining sequence set C', or cyclic shifts may be performed in a length range of the long training sequence for any times (in other words, any quantity of positions), which is not particularly limited in the present disclosure. In addition, in the embodiment of the present disclosure, for example, a pseudo-random sequence may also be used as a basic sequence for generating multiple LTSs used by the communications system, to generate the multiple different LTSs.

In addition, in the embodiment of the present disclosure, the device C may further number each long training sequence in the long training sequence set C' determined in the foregoing step S210, for example, may set sequence numbers of basic long training sequences to i=1, . . . , 52. Therefore, a shift of each long training sequence relative to the basic long training sequence is j=0, 1, . . . , 52. Therefore, the sequence number of each long training sequence in the long training sequence set C' may be set to LTS ID=(i−1)×53+j.

It should be understood that the foregoing illustrated numbering method is only an example for description, and that the present disclosure is not limited thereto. Other numbering methods that can be used to uniquely distinguish a long training sequence from the long training sequence set C' all fall within the protection scope of the present disclosure.

Specifically, the device C may determine a mapping relationship (the second mapping relationship) between a long training sequence set C" constituted by all long training sequences, except the first set-use long training sequence, in the foregoing acquired long training sequence set C' and each terminal device in the system.

In the embodiment of the present disclosure, the foregoing second mapping relationship may be generated by each device (including the receiving device and the transmitting device) in the system according to a preset rule, or may be generated by an external device independent of the receiving device and the transmitting device according to the preset rule and delivered to each device (including the receiving device and the transmitting device) in the system. For ease of understanding and description, the following uses the device C as an execution entity to describe in detail a method and a process for determining the mapping relationship between the long training sequence set C" and each terminal device in the system (specifically, a part or all of identity information of the terminal device, which is described later in detail).

First the device C may select identity information of a device, where the identity information of the device is used to generate the foregoing mapping relationship.

Optionally, the identity information is any one of the following information:

a Media Access Control MAC address, an Internet Protocol IP address, a basic service set identifier BSSID, an association identifier AID, a mobile phone number, an international mobile subscriber identity IMSI, and an international mobile equipment identity IMEI.

Specifically, in an embodiment of the present disclosure, the identity information of the device refers to information that can uniquely identify the device when the communications system in the embodiment of the present disclosure is used. It should be noted that in the embodiment of the present disclosure, the identity information may be factory-set information in the device, or may be allocated by the system to the device, which is not particularly limited in the present disclosure.

In an embodiment of the present disclosure, the identity information may include information such as a Media Access Control (MAC, Media Access Control) address, an Internet Protocol (IP, Internet Protocol) address, a basic service set identifier (BSSID, Basic Service Set Identifier), an association identifier (AID, Association Identifier), a mobile phone number, an international mobile subscriber identity (IMSI, International Mobile Subscriber Identity), and an international mobile equipment identity (IMEI, International Mobile Equipment Identity). It should be understood that a user identifier in the embodiment of the present disclosure is not limited to the foregoing information. Other information elements that can uniquely indicate the user identifier all fall within the scope of the embodiment of the present disclosure.

For example, the device C may acquire a quantity of terminal devices connected to the system and identity information (for example, BSSIDs or AIDs) of the terminal devices, and therefore may generate a mapping relationship between the identity information of the terminal devices and long training sequences according to the quantity of the terminal devices and the quantity of the foregoing generated long training sequences. For example:

If the quantity of the generated long training sequences is greater than the quantity of the terminal devices connected to the system, long training sequences with a quantity same as the quantity of the terminal devices may be selected, where the long training sequences correspond to the identity information of the terminal devices on a one-to-one basis.

If the quantity of the generated long training sequences is equal to the quantity of the terminal devices connected to the system, the long training sequences may correspond to the identity information of the terminal devices on a one-to-one basis.

If the quantity of the generated long training sequences is less than the quantity of the terminal devices connected to the system, some or all of the long training sequences may correspond to a part of the identity information of the terminal devices (an example of the first sub-identity information). In addition, a part or all of the remaining part (an example of the second sub-identity information) is carried in other fields in the physical layer, which is described later in detail.

In the foregoing process, each device in the system needs to communicate in real time or periodically with a management device or the like in the system, to determine the identity information of the terminal devices connected to the system and adjust the foregoing mapping relationship, which increases device burden and occupies communication resources.

Therefore, in an embodiment of the present disclosure, identity information that can uniquely identify the terminal device in each communications system may be selected and used. Therefore, all terminal devices that can be identified by the identity information may be considered as devices connected to and using the communications system in the embodiment of the present disclosure.

For ease of understanding, the following uses a MAC address as identity information for description.

First, a structure of the MAC address is described. FIG. 2 shows the structure of the MAC address. As shown in FIG. 2, the MAC address includes 48 bits, where:

an organization unique identifier (OUI, Organization Unique Identifier) occupies bits b24 to b47 of the MAC address, is allocated by the Institute of Electrical and Electronics Engineers (IEEE, Institute of Electrical and Electronics Engineers), and may be understood as an identifier of a device manufacturer; and a product serial number (PSN, Product Serial Number) occupies bits b0 to b23 of the MAC address, and is allocated by a device manufacturer.

Because the MAC address includes 48 bits, in theory, the MAC address can identify $2^{48}$ devices. The quantity is far greater than the quantity of the foregoing generated long training sequences. Therefore, in the embodiment of the present disclosure, some bits (the first sub-identity information) may be selected from the MAC address, and a mapping relationship between the first sub-identity information and each long training sequence may be set. That is, in the embodiment of the present disclosure, one long training sequence may be mapped to multiple devices that have same first sub-identity information, and some or all of the remaining bits (an example of the second sub-identify information) are carried in other fields in the physical layer (this process is described later in detail).

In an embodiment of the present disclosure, the device A may determine the first sub-identity information from the identity information according to the quantity of the long training sequences generated in step S210. As described above, if 52×53=2756 long training sequences are generated, for example, 11 bits (for example, bits b0 to b10 in the MAC address, namely, first 11 bits in the PSN, which can identify $2^{11}$=2048 devices) may be selected from the MAC address, and used as the first sub-identity information.

For another example, 22 bits, for example, bits b0 to b21, may be selected from the MAC address, and 11 bits are generated according to a preset operation rule, for example, the following formula 2, and the 11 bits are used as the first sub-identity information (which can identify $2^{11}$=2048 devices).

$$c(i)=b(2i)\oplus b(2i+1), i=0,1,\ldots,10 \quad \text{formula 2}$$

Alternatively, 24 bits, for example, bits b0 to b23, may be selected from the MAC address, and 11 bits are generated according to a preset operation rule, for example, the following formula 3, and the 11 bits are used as the first sub-identity information (which can identify $2^{11}$=2048 devices).

$$c(i)=b(2i)\oplus b(2i+1), i=0,1,\ldots,8$$

$$c(9)=b(18)\oplus b(19)\oplus b(20)$$

$$c(10)=b(21)\oplus b(22)\oplus b(23) \quad \text{formula 3}$$

In the formula 2 and the formula 3, "$\oplus$" indicates exclusive-OR processing.

Therefore, the mapping relationship between each long training sequence and each piece of first sub-identity information may be determined according to the preset rule. As the preset rule, for example, the 11-bit binary first-sub-identity-information may be converted into a decimal numeral, and the numeral of converted first sub-identity information corresponds to a long training sequence having a same ID numeral as the foregoing determined long training sequence.

For another example, more than 11 bits (for example, bits b0 to b23 in the MAC address, namely, the whole PSN, which can identify $2^{24}$ devices) may be selected from the MAC address, and used as the first sub-identity information. In this case, the quantity of the long training sequences is less than the quantity of the devices that the first sub-identity information can identify. Therefore, the 24-bit binary first-sub-identity-information may be converted into a decimal numeral, and modulo-preset-numeral (for example, modulo the quantity of the long training sequences) operation processing is performed on the numeral of converted first sub-identity information, and multiple pieces of the first sub-identity information with a same modulus value correspond to one long training sequence.

It should be noted that the mapping relationship between each piece of the foregoing determined first sub-identity information and each long training sequence may be recorded in an entry to form a list of mapping relationships, or may be expressed as a function relation, which is not particularly limited in the present disclosure.

It should be understood that the foregoing illustrated method for selecting the first sub-identity information is only an example for description, which is not particularly limited in the present disclosure. For example, the first sub-identity information may be determined from the OUI of the MAC address; or a part of consecutive or nonconsecutive bytes may be selected from the IP address, the BSSID, the AID, the mobile phone number, the IMSI, or the IMEI, and used as the first sub-identity information. In addition, the foregoing illustrated method for determining the mapping relationship between each piece of the first sub-identity information and each long training sequence is only an example for description, which is not particularly limited in the present disclosure. It should be noted that all devices in the system need to be consistent in the methods for determining the foregoing first sub-identity information and the foregoing mapping relationship, to ensure that the long training sequence (or the first sub-identity information) determined by the transmitting device and corresponding to the target receiving device is the same as the long training sequence (or the first sub-identity information) determined by the target receiving device and corresponding to the target receiving device.

When the device A (an example of the transmitting device) needs to transmit data to a device B (an example of the target receiving device), the device A may determine a long training sequence set (same as the long training sequence set determined by the device C), and a mapping relationship between each long training sequence in the long training sequence set and each receiving device in the system (same as the mapping relationship determined by the device C). In addition, the device A may determine first sub-identity information of the device B, for example, if a MAC address is used as identity information, may determine the first sub-identity information from a destination MAC address according to a preset rule (same as the rule used by the device C to determine the first sub-identity information), and determine, according to the mapping relationship and the first sub-identity information of the device B, (by looking up the list or substituting into the function relation), a long training sequence (hereinafter recorded as a long training sequence B) corresponding to the device B.

Afterward, the device A may perform encapsulation processing on the data that needs to be transmitted, to generate a data packet. In the embodiment of the present disclosure, because the used long training sequence is different from a long training sequence used in the prior art, herein a process for generating a long training sequence symbol is mainly described in detail.

Specifically, when a quantity of subcarriers used in the system is greater than a quantity of elements in a long training sequence (or a sequence length), direct-current carrier components may be set to 0. Afterward, subcarriers with "a quantity same as the quantity of elements in the long training sequence" are selected from the indirect-current carrier components, and the elements in the long training sequence are mapped to the selected subcarriers one by one. Finally, a specific numeric value or a cyclic shift element of the long training sequence is inserted in the remaining subcarriers. For example, a numeric value "1" is inserted, used by the receiving device for channel estimation; or a numeric value "0" may be inserted, that is, no information is transmitted on the subcarriers.

When the quantity of subcarriers is equal to the quantity of elements in the long training sequence, one-to-one mapping may be performed on the elements in the long training sequence and the subcarriers, and afterward the direct-current carrier components may be set to 0.

When the quantity of subcarriers is less than the quantity of elements in the long training sequence, elements with "a quantity same as the quantity of subcarriers" may be selected from the elements in the long training sequence. Afterward, one-to-one mapping is performed on the selected elements and the subcarriers. Finally, the direct-current carrier components are set to 0.

In an embodiment of the present disclosure, the device A may add the long training sequence corresponding to the device B to the long training sequence field (field) in the physical layer of the data packet, and then transmit the data packet to each receiving device.

In an embodiment of the present disclosure, if the first sub-identity information is a part of the identity information, one long training sequence can identify multiple devices, and the receiving device cannot accurately determine, by using only the long training sequence, whether the receiving device is a target receiving device of the data packet. Therefore, in an embodiment of the present disclosure, the transmitting device may further determine, according to the preset rule, the second sub-identity information, except the first sub-identity information, in the identity information of the target receiving device.

For example, the device A may use a part of information (for example, bits b24 to b32 in the MAC address), except the first sub-identity information (for example, bits b0 to b10 in the MAC address), in the MAC address of the device B as the second sub-identity information (hereinafter recorded as second sub-identity information B).

In the embodiment of the present disclosure, to enable the receiving device to obtain the second sub-identity information of the target receiving device by means of parsing in the physical layer, the device A may add the second sub-identity information (or a symbol indicating the second sub-identity information) to available space in the physical layer of the data packet. Therefore, the device A may further determine the second sub-identity information (specifically, a length of the second sub-identity information) according to the available space in the physical layer of the data packet. For example, in a case of a Wi-Fi system of the IEEE 802.11ac standard, a partial association identifier field (field) of 9 bits is added to a signal field (signal field) in the physical layer of the data packet. Therefore, in the embodiment of the present disclosure, the device A may use information in 9 bits (for example, bits b24 to b32 in the MAC address), except the first sub-identity information (for example, bits b0 to b10 in the MAC address), in the MAC address of the device B as the second sub-identity information B.

It should be understood that the foregoing illustrated method for determining the second sub-identity information is only an example for description, and that the present disclosure is not limited thereto. For example, the second sub-identity information may be consecutive bits or non-consecutive bits in the identity information. For another example, the second sub-identity information may be all information, except the first sub-identity information, in the identity information.

It should be noted that in an embodiment of the present disclosure, the methods for determining the second sub-identity information by all devices in the system need to be consistent, to ensure that the second sub-identity information of the target receiving device determined by the transmitting device is the same as the second sub-identity information determined by the target receiving device.

According to the data transmission method in an embodiment of the present disclosure, a long training sequence symbol (or first sub-identity information) and a second sub-identity information symbol (or second sub-identity information) are used to jointly indicate devices in the system, so that more devices can be identified, which further improves the effect of the present disclosure.

After determining the second sub-identity information, the device A may generate a second sub-identity information symbol used to indicate second sub-identity information of the device B, and add the second sub-identity information symbol to a physical layer of a data packet, so that the receiving device can obtain the second sub-identity information of the target receiving device by means of parsing in the physical layer.

If an embodiment of the present disclosure is applied, for example, to a Wi-Fi system of the IEEE 802.11ac standard, a partial association identifier field (field) of 9 bits is added to the signal field (signal field) in the physical layer of the data packet, and the foregoing generated second sub-identity information symbol may be carried in the partial association identifier field. Alternatively, the second sub-identity information may be used as a partial association identifier.

It should be understood that the foregoing illustrated method for carrying the second sub-identity information (or the second sub-identity information symbol) is only an example for description, and that the present disclosure is not limited thereto. Other methods that can enable the receiving device to acquire the second sub-identity information from the physical layer (or other layers before the physical layer in parsing order) all fall within the protection scope of the present disclosure.

In addition, in the embodiment of the present disclosure, in transmission order, the second sub-identity information symbol may be located before the long training sequence symbol, or may be located after the long training sequence symbol, which is not particularly limited in the present disclosure.

In addition, other processes for generating the data packet may be similar to those in the prior art, and to avoid repetition, description thereof is omitted herein.

The foregoing Table 4 to Table 6 show examples of a part (the second sub-identity information) of the identity information of the target receiving device carried in the partial association identifier field and a part (the first sub-identity information) of the identity information of the target receiving device corresponding to the long training sequence field in the data packet.

As described above, by using the partial association identifier field and the long training sequence field to jointly identify user equipments in the system, multiple devices can be identified. For example, if the system bandwidth is 20 MHz, a quantity of available subcarriers in the system is 53, and therefore more than $2^{11}$ long training sequences may be generated and can correspond to $2^{11}$ devices. In addition, the partial association identifier field includes 9 bits, which can correspond to $2^9$ devices. Therefore, by combining the partial association identifier field and the long training sequence field (20 bits in total), $2^{11} \times 2^9 = 2^{20}$ devices can be identified.

Afterward, the device A, for example, may transmit the data packet to each device (including the device B) in the system in a broadcast manner over the air interface. In the embodiment of the present disclosure, the method and process for transmitting the data packet may be the same as those in the prior art, and to avoid repetition, description thereof is omitted herein.

The device C receives the data packet (the second data packet) transmitted by the device A, and may acquire, from the physical layer of the data packet, the long training sequence B determined by the device A according to the target receiving device (namely, the device B).

Therefore, the device C may process the data packet according to the long training sequence B. The processing according to the long training sequence B may include the following processes:

When the first sub-identity information is all of the identity information, the long training sequence B corresponds only to one receiving device (namely, case 3); when the first sub-identity information is a part of the identity information, the long training sequence B may correspond to multiple receiving devices (namely, case 4). The following describes processing processes in the foregoing two cases separately.

Case 3

Optionally, the processing the data packet according to the target long training sequence and the mapping relationship includes:

determining, according to first sub-identity information of the first receiving device and the mapping relationship, a first set-use long training sequence corresponding to the first receiving device; and processing the data packet according to a relationship between the target long training sequence and the first set-use long training sequence.

Specifically, after the determining a mapping relationship between the long training sequence set C'' and each terminal device in the system, the device C may determine a long training sequence (an example of the first set-use long training sequence, hereinafter recorded as a long training sequence C) corresponding to the device C.

Therefore, whether the long training sequence C is the same as the long training sequence B may be determined.

Herein it should be noted that if a polyphase perfect sequence (for example, a Zadoff-Chu sequence) is used as a long training sequence, ideal autocorrelation properties and optimum cross-correlation properties of the polyphase perfect sequence may be used to quickly and conveniently distinguish whether the long training sequence C is the same as the long training sequence B.

Specifically, the device C may perform correlation calculation on the long training sequence C and the long training sequence B according to the foregoing formula 4.

FIG. 3 is a line chart of an autocorrelation function and a cross-correlation function of a Zadoff-Chu sequence. As shown in FIG. 3, if the long training sequence C is the same as the long training sequence B, a peak occurs. Therefore, the device C may determine, according to whether a peak occurs, whether the long training sequence C is the same as the long training sequence B.

It should be understood that the foregoing illustrated method for determining whether the long training sequence C is the same as the long training sequence B is only an example for description, and that the present disclosure is not limited thereto. For example, the long training sequence C may be compared with the long training sequence B in a bitwise manner to determine whether the long training sequence C is the same as the long training sequence B.

The processing the data packet according to a relationship between the target long training sequence and the first set-use long training sequence includes:

if the target long training sequence is different from the first set-use long training sequence, discarding the data packet.

Specifically, if the long training sequence C is different from the long training sequence B, the device C may determine that the device C is not the target receiving device of the data packet, and therefore may, for example, discard the data packet.

Optionally, when the first sub-identity information is all of the identity information, the processing the data packet according to a relationship between the target long training sequence and the first set-use long training sequence includes:

if the target long training sequence is the same as the first set-use long training sequence, acquiring, from the data packet, data that needs to be transmitted by the transmitting device.

Specifically, if the long training sequence C is the same as the long training sequence B, the device C may determine that the device C is the target receiving device of the data packet, and therefore may, for example, parse the data packet to acquire the data that needs to be transmitted by the device A.

Optionally, the processing the data packet according to the target long training sequence and the mapping relationship includes:

determining the first sub-identity information of the target receiving device of the data packet according to the target long training sequence and the mapping relationship; and processing the data packet according to a relationship between the first sub-identity information of the first receiving device and the first sub-identity information of the target receiving device.

Specifically, when receiving the data packet transmitted by the device A, the device C may acquire, from the physical layer of the data packet, the long training sequence B determined by the device A according to the target receiving device (namely, the device B). In addition, according to the foregoing determined mapping relationship, the device C finds first sub-identity information of a device (herein, the device B) corresponding to the long training sequence B.

Optionally, the processing the data packet according to a relationship between the first sub-identity information of the first receiving device and the first sub-identity information of the target receiving device includes:

if the first sub-identity information of the first receiving device is different from the first sub-identity information of the target receiving device, discarding the data packet.

Specifically, if the first sub-identity information of the device B is different from the first sub-identity information of the device C, the device C may determine that the device C is not the target receiving device of the data packet, and therefore may, for example, discard the data packet.

Optionally, when the first sub-identity information is all of the identity information, the processing the data packet according to a relationship between the first sub-identity information of the first receiving device and the first sub-identity information of the target receiving device includes:

if the first sub-identity information of the first receiving device is the same as the first sub-identity information of the target receiving device, acquiring, from the data packet, data that needs to be transmitted by the transmitting device.

Specifically, if the first sub-identity information of the device B is the same as the first sub-identity information of the device C, the device C may determine that the device C is the target receiving device of the data packet, and therefore may, for example, parse the data packet to acquire the data that needs to be transmitted by the device A.

Case 4

Optionally, when the first sub-identity information is a part of the identity information, the processing the data packet according to a relationship between the first sub-identity information of the first receiving device and the first sub-identity information of the target receiving device includes:

if the first sub-identity information of the first receiving device is the same as the first sub-identity information of the target receiving device, acquiring a second sub-identity information symbol carried in the physical layer of the data packet, where the second sub-identity information symbol is used to indicate second sub-identity information of the target receiving device; and processing the data packet according to a relationship between the second sub-identity information of the target receiving device and second sub-identity information of the first receiving device, where the second sub-identity information belongs to a part, except the first sub-identity information, in the identity information.

Specifically, when receiving the data packet transmitted by the device A, the device C may acquire, from the physical layer of the data packet, the long training sequence B determined by the device A according to the target receiving device (namely, the device B). In addition, according to the foregoing determined mapping relationship, the device C finds first sub-identity information of a device (herein, the device B) corresponding to the long training sequence B.

If the first sub-identity information of the device B is different from the first sub-identity information of the device C, the device C may determine that the device C is not the target receiving device of the data packet, and therefore may, for example, discard the data packet.

Because the first sub-identity information is only a part of the identity information, that is, one piece of the first sub-identity information may correspond to multiple devices, if the first sub-identity information of the device B is the same as the first sub-identity information of the device C, the device C may determine that the device C may be the target receiving device of the data packet, and therefore may continue to parse the data packet and acquire, from the physical layer of the data packet, the second sub-identity information (namely, the second sub-identity information B) of the target receiving device.

The device C may determine second sub-identity information (hereinafter recorded as second sub-identity information C) of the device C according to a preset rule (same as the preset rule used by the device A to determine the second sub-identity information). In addition, the process is the same as the foregoing process for determining the second sub-identity information by the device A, and to avoid repetition, description thereof is omitted herein.

Therefore, if the second sub-identity information B is different from the second sub-identity information C, the device C may determine that the device C is not the target receiving device of the data packet, and therefore may, for example, discard the data packet.

If the second sub-identity information B is the same as the second sub-identity information C, the device C may determine that the device C is the target receiving device of the data packet, and therefore may, for example, parse the data packet to acquire the data that needs to be transmitted by the device A.

Optionally, when the first sub-identity information is a part of the identity information, the processing the data packet according to a relationship between the target long training sequence and the first set-use long training sequence includes:

if the target long training sequence is the same as the first set-use long training sequence, acquiring a second sub-identity information symbol carried in the physical layer of the data packet, where the second sub-identity information symbol is used to indicate second sub-identity information of the target receiving device; and processing the data packet according to a relationship between the second sub-identity information of the target receiving device and second sub-identity information of the first receiving device, where the second sub-identity information belongs to a part, except the first sub-identity information, in the identity information.

Specifically, after the determining a mapping relationship between the long training sequence set C' and each terminal device in the system, the device C may determine a long training sequence (hereinafter recorded as a long training sequence C) corresponding to the device C.

Therefore, whether the long training sequence C is the same as the long training sequence B may be determined.

Herein it should be noted that if a polyphase perfect sequence (for example, a Zadoff-Chu sequence) is used as a long training sequence, ideal autocorrelation properties and optimum cross-correlation properties of the polyphase perfect sequence may be used to quickly and conveniently distinguish whether the long training sequence C is the same as the long training sequence B.

Specifically, the device C may perform correlation calculation on the long training sequence C and the long training sequence B according to the foregoing formula 4. If the long training sequence C is the same as the long training sequence B, a peak occurs. Therefore, the device C may determine, according to whether a peak occurs, whether the long training sequence C is the same as the long training sequence B.

It should be understood that the foregoing illustrated method for determining whether the long training sequence C is the same as the long training sequence B is only an example for description, and that the present disclosure is not limited thereto. For example, the long training sequence C may be compared with the long training sequence B in a bitwise manner to determine whether the long training sequence C is the same as the long training sequence B.

Therefore, if the long training sequence C is different from the long training sequence B, the device C may determine that the device C is not the target receiving device of the data packet, and therefore may, for example, discard the data packet.

Because the first sub-identity information is only a part of the identity information, that is, one piece of the first sub-identity information may correspond to multiple devices, if the long training sequence C is the same as the long training sequence B, the device C may determine that the device C may be the target receiving device of the data packet, and therefore may continue to parse the data packet and acquire, from the physical layer of the data packet, the second sub-identity information (namely, the second sub-identity information B) of the target receiving device.

In addition, the device C may determine second sub-identity information (hereinafter recorded as second sub-identity information C) of the device C according to a preset rule (same as the preset rule used by the device A to determine the second sub-identity information). In addition, the process is the same as the foregoing process for determining the second sub-identity information by the device A, and to avoid repetition, description thereof is omitted herein.

Therefore, if the second sub-identity information B is different from the second sub-identity information C, the device C may determine that the device C is not the target receiving device of the data packet, and therefore may, for example, discard the data packet.

If the second sub-identity information B is the same as the second sub-identity information C, the device C may determine that the device C is the target receiving device of the data packet, and therefore may, for example, parse the data packet to acquire the data that needs to be transmitted by the device A.

In an embodiment of the present disclosure, the data packet received by the device C may be a data packet that is transmitted by the device A to the device C only, or may be a data packet broadcast by the device A. Therefore, in the embodiment of the present disclosure, the processing the data packet according to the target long training sequence further includes:

determining, from the long training sequence set, a third long training sequence corresponding to the first sub-identity information of all the receiving devices in the communications system; and if the target long training sequence is the same as the third long training sequence, acquiring, from the data packet, data that needs to be transmitted by the transmitting device.

Specifically, if the device A needs to transmit a data packet to each receiving device in the system, or if each receiving device in the system is the target receiving device of the data packet, the device A may select a long training sequence (the third long training sequence) from the determined long training sequence set according to a preset rule, for example, a long training sequence that corresponds to the device A and whose bits are all 0 or 1, or the first or the last long training sequence in the long training sequence set, and use the long training sequence as the target long training sequence, to identify that the target receiving device of the data packet is all the receiving devices in the system.

Each receiving device in the system may determine the third long training sequence according to the preset rule (same as the rule used by the device A). If the target long training sequence carried in the data packet is the third long training sequence, it indicates that the data is broadcast data and therefore may be received.

It should be noted that in an embodiment of the present disclosure, the process for determining whether the data packet is broadcast data may be before or after the process for determining whether the device C is the target receiving device of the data packet, which is not particularly limited in the present disclosure.

In addition, it should be noted that if, for example, the device A needs to transmit a data packet to each receiving device in the system, or each receiving device in the system is the target receiving device of the data packet, the device A may configure, through negotiation, a special long training sequence symbol to identify that the target receiving device of the data packet is all the receiving devices in the system.

It should be noted that in an embodiment of the present disclosure, the first sub-identity information and the third sub-identity information may be the same or different, which is not particularly limited in the present disclosure. Likewise, the second sub-identity information and the third sub-identity information may be the same or different, which is not particularly limited in the present disclosure.

According to the data transmission method in an embodiment of the present disclosure, when a transmitting device needs to transmit data to a target receiving device, the transmitting device selects, from a long training sequence set, a target long training sequence corresponding to the target receiving device, and adds the target long training sequence to a long training sequence field in a physical layer of a generated data packet; a receiving device can determine the target receiving device of the data packet according to the target long training sequence. Therefore, if the receiving device is not the target receiving device of the data packet, the receiving device does not need to continue to parse the data packet, which can reduce burden of the receiving device, reduce waste of hardware resources, and improve user experience.

The data transmission methods in the embodiments of the present disclosure have been described above in detail with reference to FIG. 1 to FIG. 4. The following describes in detail data transmission apparatuses in the embodiments of the present disclosure with reference to FIG. 5 and FIG. 6.

Figure 5:
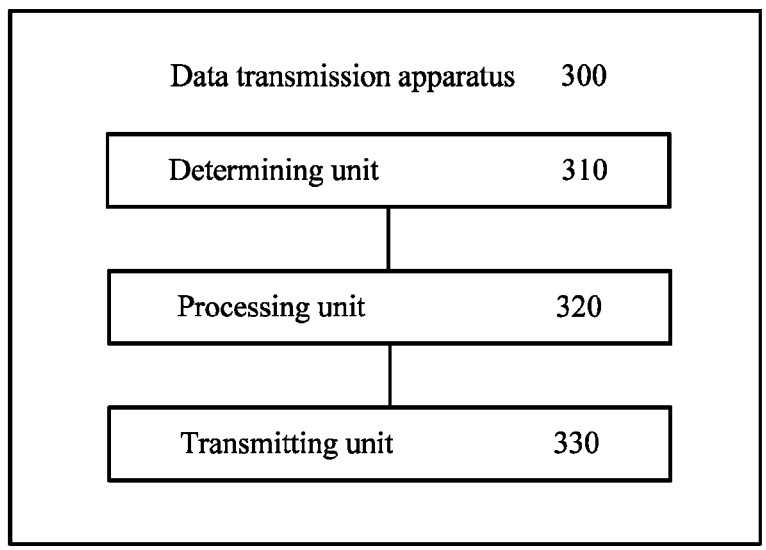
FIG. 5 is a schematic block diagram of a data transmission apparatus according to an embodiment of the present disclosure.

FIG. 5 shows a data transmission apparatus 300 according to an embodiment of the present disclosure. As shown in FIG. 5, the apparatus 300 includes:

a determining unit 310, configured to determine a long training sequence set, where the long training sequence set includes at least two long training sequences;

determine at least one receiving device set, where the receiving device set includes at least one receiving device in a communications system; and determine a first mapping relationship, where the first mapping relationship is a mapping relationship between at least one set-use long training sequence in the long training sequence set and the at least one receiving device set, and the at least one set-use long training sequence corresponds to the at least one receiving device set on a one-to-one basis;

a processing unit 320, configured to determine, when first data needs to be transmitted to a target receiving device set, a target set-use long training sequence according to the target receiving device set and the first mapping relationship; and perform encapsulation processing on the first data according to the target set-use long training sequence to generate a first data packet, so that a long training sequence field in a physical layer of the first data packet carries a first long training sequence symbol used to indicate the target set-use long training sequence; and a transmitting unit 330, configured to transmit the first data packet, so that after a receiving device receives the first data packet, and acquires the target set-use long training sequence from the first data packet, the receiving device processes the data packet according to the target set-use long training sequence.

Optionally, the determining unit 310 is specifically configured to determine the at least one receiving device set according to grouping information of each receiving device in the communications system, where the grouping information is allocated by the communications system and used to uniquely indicate one receiving device group in the communications system, and the receiving device group includes at least one receiving device.

Optionally, the grouping information includes a group identifier Group ID or a cell identifier Cell ID.

Optionally, the determining unit 310 is specifically configured to determine the at least one receiving device set according to feature information of each receiving device in the communications system, where the feature information includes any one of the following information:

a service type of a service accessed by the receiving device, a geographical location of the receiving device, an access permission of the receiving device, and a priority of the receiving device.

Optionally, the determining unit 310 is specifically configured to determine the at least one receiving device set according to data that needs to be transmitted, so that data that needs to be transmitted to each receiving device in a same receiving device set is the same; and the transmitting unit 330 is further configured to transmit first indication information, where the first indication information is used to indicate receiving devices included in each receiving device set.

Optionally, the transmitting unit 330 is further configured to transmit second indication information, where the second indication information is used to indicate the first mapping relationship.

Optionally, the first mapping relationship is a mapping relationship between each set-use long training sequence and third sub-identity information in identity information of each receiving device in a corresponding receiving device set, where one piece of the identity information is used to uniquely indicate one receiving device in the communications system, and the third sub-identity information is a part or all of the identity information.

Optionally, the determining unit 310 is further configured to determine a second mapping relationship, where the second mapping relationship is a mapping relationship between each long training sequence in a long training sequence subset and first sub-identity information in identity information of each receiving device in the communications system, where one piece of the identity information is used to uniquely indicate one receiving device in the communications system, the first sub-identity information is a part or all of the identity information, the long training sequence subset belongs to the long training sequence set, and the long training sequence subset does not include the set-use long training sequence;

the processing unit 320 is further configured to select, when second data needs to be transmitted to a target receiving device, a target long training sequence from the long training sequence subset according to first sub-identity information of the target receiving device and the second mapping relationship; and perform encapsulation processing on the second data according to the target long training sequence to generate a second data packet, so that a long training sequence field in a physical layer of the second data packet carries a second long training sequence symbol used to indicate the target long training sequence; and the transmitting unit 330 is further configured to transmit the second data packet, so that the target receiving device acquires the target long training sequence from the second data packet and processes the second data packet according to the target long training sequence.

Optionally, when the target receiving device is one receiving device in the communications system, the determining unit 310 is specifically configured to select, from the long training sequence subset according to the first sub-identity information of the target receiving device and the second mapping relationship, a second long training sequence only corresponding to the first sub-identity information of the target receiving device, and use the second long training sequence as the target long training sequence.

Optionally, when the first sub-identity information is a part of the identity information, the processing unit 320 is specifically configured to perform encapsulation processing on the second data to generate the second data packet, where the physical layer of the second data packet carries a second sub-identity information symbol, the second sub-identity information symbol is used to indicate second sub-identity information of the target receiving device, and the second sub-identity information belongs to a part, except the first sub-identity information, in the identity information.

Optionally, the second sub-identity information symbol is carried in a partial association identifier field in the physical layer of the data packet.

Optionally, when the target receiving device is all the receiving devices in the communications system, the processing unit 320 is specifically configured to select, from the long training sequence subset according to the first sub-identity information of the target receiving device and the mapping relationship, a third long training sequence corresponding to the first sub-identity information of all the receiving devices in the communications system, and use the third long training sequence as the target long training sequence.

Optionally, the long training sequence is a sequence with good correlation properties.

Optionally, the sequence with good correlation properties is any one of the following sequences:

a polyphase perfect sequence, a Gold sequence, a Gold-like sequence, and a pseudo-random sequence.

Optionally, the polyphase perfect sequence is any one of the following sequences:

a Zadoff-Chu sequence, a Frank sequence, and a combined Frank/Zadoff-Chu sequence.

Optionally, a length of the long training sequence is determined according to a quantity of available subcarriers in the communications system.

Optionally, the identity information is any one of the following information:

a Media Access Control MAC address, an Internet Protocol IP address, a basic service set identifier BSSID, an association identifier AID, a mobile phone number, an international mobile subscriber identity IMSI, and an international mobile equipment identity IMEI.

The data transmission apparatus 300 according to the embodiment of the present disclosure may correspond to the transmitting device (the device A) in the method embodiment of the present disclosure, and furthermore, each unit, namely, each module, in the data transmission apparatus 300 and the foregoing other operations and/or functions are respectively intended to implement the corresponding procedure of the method 100 in FIG. 1, which is not further described herein for brevity.

According to the data transmission apparatus in the embodiment of the present disclosure, a transmitting device notifies each receiving device in a communications system of a mapping relationship between each set-use long training sequence and each receiving device group; a first receiving device may determine a first set-use long training sequence corresponding to a receiving device set to which the first receiving device belongs; when the transmitting device needs to transmit data to a target device, a target set-use long training sequence corresponding to the target device may be carried in a physical layer of a data packet; therefore, the first receiving device may process the data packet according to a relationship between the first set-use long training sequence and the target set-use long training sequence, so that the first receiving device can determine, on condition that the first receiving device parses only a long training sequence field in the physical layer, whether the first receiving device is a target receiving device of the data packet. Therefore, burden of the receiving device can be reduced, waste of hardware resources can be reduced, and user experience can be improved.

Figure 6:
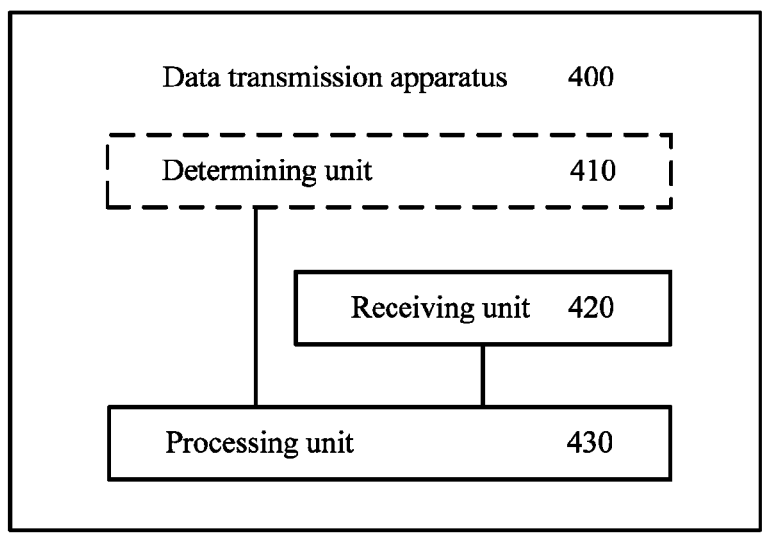
FIG. 6 is a schematic block diagram of a data transmission apparatus according to another embodiment of the present disclosure.

FIG. 6 shows a data transmission apparatus 400 according to an embodiment of the present disclosure. As shown in FIG. 6, the apparatus 400 includes:

a determining unit 410, configured to determine a first mapping relationship, where the first mapping relationship is a mapping relationship between at least one set-use long training sequence in the long training sequence set and the at least one receiving device set, the at least one set-use long training sequence corresponds to the at least one receiving device set on a one-to-one basis, the receiving device set includes at least one receiving device in a communications system, and the long training sequence set includes at least two long training sequences; and determine, from the at least one receiving device set, a first receiving device set to which the apparatus belongs;

a receiving unit 420, configured to receive a first data packet transmitted by a transmitting device; and a processing unit 430, configured to acquire a first long training sequence symbol carried in a long training sequence field in a physical layer of the first data packet, where the first long training sequence symbol is used to indicate a target set-use long training sequence, the target set-use long training sequence is determined by the transmitting device according to a target receiving device set of the first data packet and the first mapping relationship, and the first data packet is generated after the transmitting device performs encapsulation processing on first data;

determine the target set-use long training sequence according to the first long training sequence symbol; and process the first data packet according to the target set-use long training sequence, the first receiving device set, and the first mapping relationship.

Optionally, the processing unit 430 is specifically configured to determine, according to the first receiving device set and the first mapping relationship, a first set-use long training sequence corresponding to the first receiving device set; and if the first set-use long training sequence is the same as the target set-use long training sequence, acquire the first data from the first data packet; or if the first set-use long training sequence is different from the target set-use long training sequence, discard the first data packet.

Optionally, the processing unit 430 is specifically configured to determine, according to the first mapping relationship and the target set-use long training sequence, the target receiving device set corresponding to the target set-use long training sequence; and if the first receiving device set is the same as the target receiving device set, acquire the first data from the first data packet; or if the first receiving device set is different from the target receiving device set, discard the first data packet.

Optionally, the at least one receiving device set is determined according to grouping information of each receiving device in the communications system, the grouping information is allocated by the communications system and used to uniquely indicate one receiving device group in the communications system, and the receiving device group includes at least one receiving device; and the determining unit 410 is specifically configured to determine, according to grouping information of the first receiving device, the first receiving device set to which the first receiving device belongs.

Optionally, the grouping information includes a group identifier Group ID or a cell identifier Cell ID.

Optionally, the at least one receiving device set is determined according to feature information of each receiving device in the communications system, where the feature information includes any one of the following information:

a service type of a service accessed by the receiving device, a geographical location of the receiving device, an access permission of the receiving device, and a priority of the receiving device; and the determining unit 410 is specifically configured to determine, according to feature information of the first receiving device, the first receiving device set to which the first receiving device belongs.

Optionally, the at least one receiving device set is determined by the transmitting device according to data that needs to be transmitted, where same data needs to be transmitted by the transmitting device to each receiving device in a same receiving device set;

the receiving unit 420 is further configured to receive first indication information, where the first indication information is used to indicate receiving devices included in each receiving device set; and the determining unit 410 is specifically configured to determine, according to the first indication information, the first receiving device set to which the first receiving device belongs.

Optionally, the receiving unit 420 is further configured to receive second indication information transmitted by the transmitting device, where the second indication information is used to indicate the first mapping relationship; and the determining unit 410 is specifically configured to determine the first mapping relationship according to the second indication information.

Optionally, the first mapping relationship is a mapping relationship between each set-use long training sequence and third sub-identity information in identity information of each receiving device in a corresponding receiving device set, where one piece of the identity information is used to uniquely indicate one receiving device in the communications system, and the third sub-identity information is a part or all of the identity information.

Optionally, the determining unit 410 is further configured to determine the long training sequence set; and determine a second mapping relationship, where the second mapping relationship is a mapping relationship between each long training sequence in a long training sequence subset and first sub-identity information in identity information of each receiving device in the communications system, where one piece of the identity information is used to uniquely indicate one receiving device in the communications system, the first sub-identity information is a part or all of the identity information, the long training sequence subset belongs to the long training sequence set, and the long training sequence subset does not include the set-use long training sequence;

the processing unit 430 is further configured to acquire, when a second data packet transmitted by the transmitting device is received, a second long training sequence symbol carried in a long training sequence field in a physical layer of the second data packet, where the second long training sequence symbol is used to indicate a target long training sequence, and the target long training sequence is selected by the transmitting device from the long training sequence subset according to first sub-identity information of a target receiving device of the second data packet and the second mapping relationship;

determine the target long training sequence according to the second long training sequence symbol; and process the second data packet according to the target long training sequence.

Optionally, the processing unit 430 is specifically configured to determine the first sub-identity information of the target receiving device of the second data packet according to the target long training sequence and the second mapping relationship; and process the second data packet according to a relationship between first sub-identity information of the first receiving device and the first sub-identity information of the target receiving device.

Optionally, the processing unit 430 is specifically configured to discard the second data packet if the first sub-identity information of the first receiving device is different from the first sub-identity information of the target receiving device.

Optionally, when the first sub-identity information is all of the identity information, the processing unit 430 is specifically configured to acquire, from the second data packet if the first sub-identity information of the first receiving device is the same as the first sub-identity information of the target receiving device, second data that needs to be transmitted by the transmitting device.

Optionally, when the first sub-identity information is a part of the identity information, the processing unit 430 is specifically configured to acquire, if the first sub-identity information of the first receiving device is the same as the first sub-identity information of the target receiving device, a second sub-identity information symbol carried in the physical layer of the second data packet, where the second sub-identity information symbol is used to indicate second sub-identity information of the target receiving device; and process the second data packet according to a relationship between the second sub-identity information of the target receiving device and second sub-identity information of the first receiving device, where the second sub-identity information belongs to a part, except the first sub-identity information, in the identity information.

Optionally, the processing unit 430 is specifically configured to determine, from the long training sequence set according to the first sub-identity information of the first receiving device and the second mapping relationship, a first long training sequence only corresponding to the first sub-identity information of the first receiving device; and process the second data packet according to a relationship between the target long training sequence and the first long training sequence.

Optionally, the processing unit 430 is specifically configured to discard the second data packet if the target long training sequence is different from the first long training sequence.

Optionally, when the first sub-identity information is all of the identity information, the processing unit 430 is specifically configured to acquire, from the second data packet if the target long training sequence is the same as the first long training sequence, second data that needs to be transmitted by the transmitting device.

Optionally, the first sub-identity information is a part of the identity information, and the processing unit 430 is specifically configured to acquire, if the target long training sequence is the same as the first long training sequence, a second sub-identity information symbol carried in the physical layer of the second data packet, where the second sub-identity information symbol is used to indicate second sub-identity information of the target receiving device; and process the second data packet according to a relationship between the second sub-identity information of the target receiving device and second sub-identity information of the first receiving device, where the second sub-identity information belongs to a part, except the first sub-identity information, in the identity information.

Optionally, the processing unit 430 is specifically configured to discard the second data packet if the second sub-identity information of the target receiving device is different from the second sub-identity information of the first receiving device; or if the second sub-identity information of the target receiving device is the same as the second sub-identity information of the first receiving device, acquire, from the second data packet, second data that needs to be transmitted by the transmitting device.

Optionally, the second sub-identity information symbol is carried in a partial association identifier field in the physical layer of the data packet.

Optionally, the processing unit 430 is specifically configured to determine, from the long training sequence set, a third long training sequence corresponding to the first sub-identity information of all the receiving devices in the communications system; and if the target long training sequence is the same as the third long training sequence, acquire, from the second data packet, second data that needs to be transmitted by the transmitting device.

Optionally, the long training sequence is a sequence with good correlation properties.

Optionally, the sequence with good correlation properties is any one of the following sequences:

a polyphase perfect sequence, a Gold sequence, a Gold-like sequence, and a pseudo-random sequence.

Optionally, the polyphase perfect sequence is any one of the following sequences:

a Zadoff-Chu sequence, a Frank sequence, and a combined Frank/Zadoff-Chu sequence.

Optionally, a length of the long training sequence is determined according to a quantity of available subcarriers in the communications system.

Optionally, the identity information is any one of the following information:

a Media Access Control MAC address, an Internet Protocol IP address, a basic service set identifier BSSID, an association identifier AID, a mobile phone number, an international mobile subscriber identity IMSI, and an international mobile equipment identity IMEI.

The data transmission apparatus 400 according to the embodiment of the present disclosure may correspond to the receiving device (the device C) in the method embodiment of the present disclosure, and furthermore, each unit, namely, each module, in the data transmission apparatus 400 and the foregoing other operations and/or functions are respectively intended to implement the corresponding procedure of the method 200 in FIG. 4, which is not further described herein for brevity.

According to the data transmission apparatus in the embodiment of the present disclosure, a transmitting device notifies each receiving device in a communications system of a mapping relationship between each set-use long training sequence and each receiving device group; a first receiving device may determine a first set-use long training sequence corresponding to a receiving device set to which the first receiving device belongs; when the transmitting device needs to transmit data to a target device, a target set-use long training sequence corresponding to the target device may be carried in a physical layer of a data packet; therefore, the first receiving device may process the data packet according to a relationship between the first set-use long training sequence and the target set-use long training sequence, so that the first receiving device can determine, on condition that the first receiving device parses only a long training sequence field in the physical layer, whether the first receiving device is a target receiving device of the data packet. Therefore, burden of the receiving device can be reduced, waste of hardware resources can be reduced, and user experience can be improved.

The data transmission methods in the embodiments of the present disclosure have been described above in detail with reference to FIG. 1 to FIG. 4. The following describes in detail data transmission apparatuses in the embodiments of the present disclosure with reference to FIG. 7 and FIG. 8.

Figure 7:
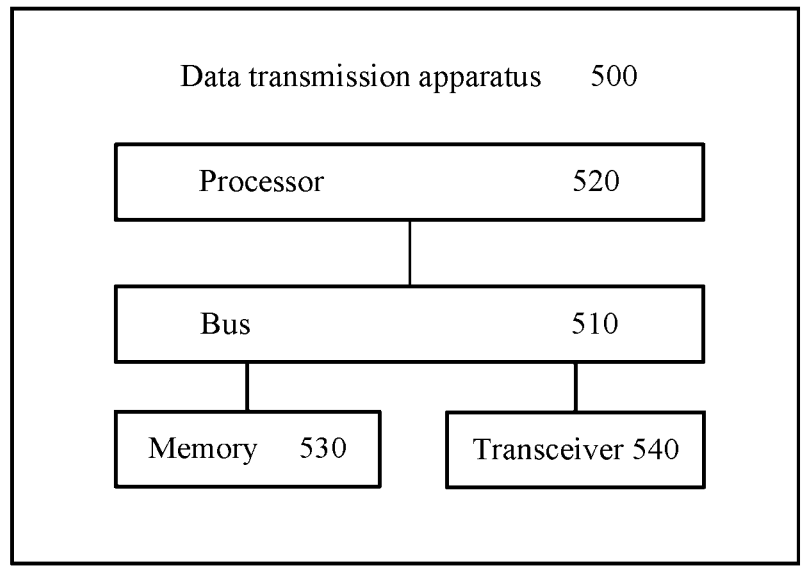
FIG. 7 is a schematic structural diagram of a data transmission apparatus according to an embodiment of the present disclosure.

FIG. 7 shows a data transmission apparatus 500 according to an embodiment of the present disclosure. As shown in FIG. 7, the apparatus 500 includes:

a bus 510;
a processor 520 connected to the bus 510;
a memory 530 connected to the bus 510; and
a transceiver 540 connected to the bus 510.

The processor 520 is configured to invoke, through the bus 510, a program stored in the memory 530 to determine a long training sequence set, where the long training sequence set includes at least two long training sequences;

determine at least one receiving device set, where the receiving device set includes at least one receiving device in a communications system;

determine a first mapping relationship, where the first mapping relationship is a mapping relationship between at least one set-use long training sequence in the long training sequence set and the at least one receiving device set, and the at least one set-use long training sequence corresponds to the at least one receiving device set on a one-to-one basis;

determine, when first data needs to be transmitted to a target receiving device set, according to the target receiving device set and the first mapping relationship, a target set-use long training sequence corresponding to the target receiving device set;

perform encapsulation processing on the first data according to the target set-use long training sequence to generate a first data packet, so that a long training sequence field in a physical layer of the first data packet carries a first long training sequence symbol used to indicate the target set-use long training sequence; and control the transceiver 540 to transmit the first data packet, so that after a receiving device receives the first data packet, and acquires the target set-use long training sequence from the first data packet, the receiving device processes the data packet according to the target set-use long training sequence.

Optionally, the processor 520 is specifically configured to determine the at least one receiving device set according to grouping information of each receiving device in the communications system, where the grouping information is allocated by the communications system and used to uniquely indicate one receiving device group in the communications system, and the receiving device group includes at least one receiving device.

Optionally, the grouping information includes a group identifier Group ID or a cell identifier Cell ID.

Optionally, the processor 520 is specifically configured to determine the at least one receiving device set according to feature information of each receiving device in the communications system, where the feature information includes any one of the following information:

a service type of a service accessed by the receiving device, a geographical location of the receiving device, an access permission of the receiving device, and a priority of the receiving device.

Optionally, the processor 520 is specifically configured to determine the at least one receiving device set according to data that needs to be transmitted, so that data that needs to be transmitted to each receiving device in a same receiving device set is the same; and control the transceiver 540 to transmit first indication information, where the first indication information is used to indicate receiving devices included in each receiving device set.

Optionally, the processor 520 is specifically configured to control the transceiver 540 to transmit second indication information, where the second indication information is used to indicate the first mapping relationship.

Optionally, the first mapping relationship is a mapping relationship between each set-use long training sequence and third sub-identity information in identity information of each receiving device in a corresponding receiving device set, where one piece of the identity information is used to uniquely indicate one receiving device in the communications system, and the third sub-identity information is a part or all of the identity information.

Optionally, the processor 520 is specifically configured to determine a second mapping relationship, where the second mapping relationship is a mapping relationship between each long training sequence in a long training sequence subset and first sub-identity information in identity information of each receiving device in the communications system, where one piece of the identity information is used to uniquely indicate one receiving device in the communications system, the first sub-identity information is a part or all of the identity information, the long training sequence subset belongs to the long training sequence set, and the long training sequence subset does not include the set-use long training sequence;

select, when second data needs to be transmitted to a target receiving device, a target long training sequence from the long training sequence subset according to first sub-identity information of the target receiving device and the second mapping relationship;

perform encapsulation processing on the second data according to the target long training sequence to generate a second data packet, so that a long training sequence field in a physical layer of the second data packet carries a second long training sequence symbol used to indicate the target long training sequence; and control the transceiver 540 to transmit the second data packet, so that the target receiving device acquires the target long training sequence from the second data packet and processes the second data packet according to the target long training sequence.

Optionally, the target receiving device is one receiving device in the communications system, and the processor 520 is specifically configured to select, from the long training sequence subset according to the first sub-identity information of the target receiving device and the second mapping relationship, a second long training sequence only corresponding to the first sub-identity information of the target receiving device, and use the second long training sequence as the target long training sequence.

Optionally, the first sub-identity information is a part of the identity information, and the processor 520 is specifically configured to perform encapsulation processing on the second data to generate the second data packet, where the physical layer of the second data packet carries a second sub-identity information symbol, the second sub-identity information symbol is used to indicate second sub-identity information of the target receiving device, and the second sub-identity information belongs to a part, except the first sub-identity information, in the identity information.

Optionally, the second sub-identity information symbol is carried in a partial association identifier field in the physical layer of the data packet.

Optionally, the target receiving device is all the receiving devices in the communications system, and the processor 520 is specifically configured to select, from the long training sequence subset according to the first sub-identity information of the target receiving device and the mapping relationship, a third long training sequence corresponding to the first sub-identity information of all the receiving devices in the communications system, and use the third long training sequence as the target long training sequence.

Optionally, the long training sequence is a sequence with good correlation properties.

Optionally, the sequence with good correlation properties is any one of the following sequences:

a polyphase perfect sequence, a Gold sequence, and a pseudo-random sequence.

Optionally, the polyphase perfect sequence is any one of the following sequences:

a Zadoff-Chu sequence, a Frank sequence, and a combined Frank/Zadoff-Chu sequence.

Optionally, a length of the long training sequence is determined according to a quantity of available subcarriers in the communications system.

Optionally, the identity information is any one of the following information:

a Media Access Control MAC address, an Internet Protocol IP address, a basic service set identifier BSSID, an association identifier AID, a mobile phone number, an international mobile subscriber identity IMSI, and an international mobile equipment identity IMEI.

In the embodiment of the present disclosure, the processor may also be referred to as a CPU. The memory may include a read-only memory and a random access memory, and provide an instruction and data to the processor. A part of the memory may further include a non-volatile random access memory (NVRAM). In a specific application, the data transmission apparatus may be embedded in or the data transmission apparatus itself may be, for example, a standard Ethernet communications device such as a personal computer; modules of the data transmission apparatus are coupled together by using a bus system, where the bus system further includes a power bus, a control bus, and a status signal bus in addition to a data bus.

The processor may implement or execute steps and logical block diagrams disclosed in the method embodiments of the present disclosure. A general purpose processor may be a microprocessor or the processor may be any conventional processor, decoder, and the like. Steps of the disclosed methods with reference to the embodiments of the present disclosure may be directly executed and completed by means of a hardware processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and a decoding unit or processing unit reads information in the memory and completes the steps in the foregoing methods in combination with hardware of the decoding unit or processing unit.

It should be understood that in the embodiments of the present disclosure, the processor may be a central processing unit (Central Processing Unit, "CPU" for short), or the processor may be another general purpose processor, a digital signal processor (DSP), an application-specific integrated circuit (ASIC), a field programmable gate array (FPGA), or another programmable logical device, discrete gate or transistor logical device, discrete hardware component, or the like. The general purpose processor may be a microprocessor or the processor may be any conventional processor and the like.

In an implementation process, each step of the foregoing method may be completed by using an integrated logic circuit of hardware in the processor or an instruction in a form of software. Steps of the disclosed methods with reference to the embodiments of the present disclosure may be directly executed and completed by means of a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor. To avoid repetition, details are not described herein again.

The data transmission apparatus 500 according to the embodiment of the present disclosure may correspond to the transmitting device (the device A) in the method embodiment of the present disclosure, and furthermore, each unit, namely, each module, in the data transmission apparatus 500 and the foregoing other operations and/or functions are respectively intended to implement the corresponding procedure of the method 100 in FIG. 1, which is not further described herein for brevity.

According to the data transmission apparatus in the embodiment of the present disclosure, a transmitting device notifies each receiving device in a communications system of a mapping relationship between each set-use long training sequence and each receiving device group; a first receiving device may determine a first set-use long training sequence corresponding to a receiving device set to which the first receiving device belongs; when the transmitting device needs to transmit data to a target device, a target set-use long training sequence corresponding to the target device may be carried in a physical layer of a data packet; therefore, the first receiving device may process the data packet according to a relationship between the first set-use long training sequence and the target set-use long training sequence, so that the first receiving device can determine, on condition that the first receiving device parses only a long training sequence field in the physical layer, whether the first receiving device is a target receiving device of the data packet. Therefore, burden of the receiving device can be reduced, waste of hardware resources can be reduced, and user experience can be improved.

Figure 8:
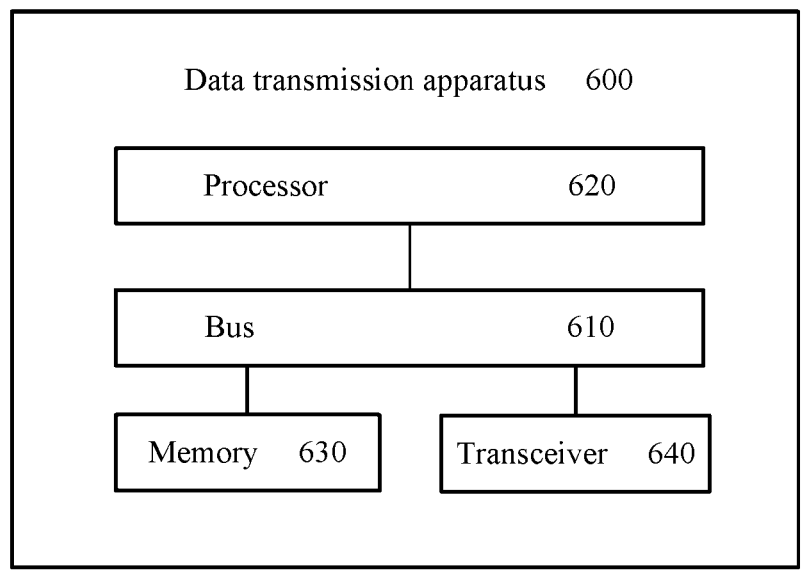
FIG. 8 is a schematic structural diagram of a data transmission apparatus according to another embodiment of the present disclosure.

FIG. 8 shows a data transmission apparatus 600 according to an embodiment of the present disclosure. The data transmission apparatus 600 is a first receiving device. As shown in FIG. 8, the apparatus 600 includes:

a bus 610;
a processor 620 connected to the bus 610;
a memory 630 connected to the bus 610; and
a transceiver 640 connected to the bus 610.

The processor 620 is configured to invoke, through the bus 610, a program stored in the memory 630 to determine a first mapping relationship, where the first mapping relationship is a mapping relationship between at least one receiving device set and at least one set-use long training sequence in a long training sequence set, the at least one receiving device set corresponds to the at least one set-use long training sequence on a one-to-one basis, the receiving device set includes at least one receiving device in a communications system, and the long training sequence set includes at least two long training sequences;

determine, from the at least one receiving device set, a first receiving device set to which the apparatus 600 belongs;

control the transceiver 640 to receive a first data packet transmitted by a transmitting device;

acquire a first long training sequence symbol carried in a long training sequence field in a physical layer of the first data packet, where the first long training sequence symbol is used to indicate a target set-use long training sequence, the target set-use long training sequence is determined by the transmitting device according to a target receiving device set of the first data packet and the first mapping relationship, and the first data packet is generated after the transmitting device performs encapsulation processing on first data;

determine the target set-use long training sequence according to the first long training sequence symbol; and process the first data packet according to the target set-use long training sequence, the first receiving device set, and the first mapping relationship.

Optionally, the processor 620 is specifically configured to determine, according to the first receiving device set and the first mapping relationship, a first set-use long training sequence corresponding to the first receiving device set; and if the first set-use long training sequence is the same as the target set-use long training sequence, acquire the first data from the first data packet; or if the first set-use long training sequence is different from the target set-use long training sequence, discard the first data packet.

Optionally, the processor 620 is specifically configured to determine, according to the first mapping relationship and the target set-use long training sequence, the target receiving device set corresponding to the target set-use long training sequence; and if the first receiving device set is the same as the target receiving device set, acquire the first data from the first data packet; or if the first receiving device set is different from the target receiving device set, discard the first data packet.

Optionally, the at least one receiving device set is determined according to grouping information of each receiving device in the communications system, the grouping information is allocated by the communications system and used to uniquely indicate one receiving device group in the communications system, and the receiving device group includes at least one receiving device; and the processor 620 is specifically configured to determine, according to grouping information of the first receiving device, the first receiving device set to which the first receiving device belongs.

Optionally, the grouping information includes a group identifier Group ID or a cell identifier Cell ID.

Optionally, the at least one receiving device set is determined according to feature information of each receiving device in the communications system, where the feature information includes any one of the following information:

a service type of a service accessed by the receiving device, a geographical location of the receiving device, an access permission of the receiving device, and a priority of the receiving device; and the processor 620 is specifically configured to determine, according to feature information of the first receiving device, the first receiving device set to which the first receiving device belongs.

Optionally, the at least one receiving device set is determined by the transmitting device according to data that needs to be transmitted, where same data needs to be transmitted by the transmitting device to each receiving device in a same receiving device set; and the processor 620 is specifically configured to control the transceiver 640 to receive first indication information, where the first indication information is used to indicate receiving devices included in each receiving device set; and determine, according to the first indication information, the first receiving device set to which the first receiving device belongs.

Optionally, the processor 620 is specifically configured to control the transceiver 640 to receive second indication information transmitted by the transmitting device, where the second indication information is used to indicate the first mapping relationship; and determine the first mapping relationship according to the second indication information.

Optionally, the first mapping relationship is a mapping relationship between each set-use long training sequence and third sub-identity information in identity information of each receiving device in a corresponding receiving device set, where one piece of the identity information is used to uniquely indicate one receiving device in the communications system, and the third sub-identity information is a part or all of the identity information.

Optionally, the processor 620 is further configured to determine the long training sequence set;

determine a second mapping relationship, where the second mapping relationship is a mapping relationship between each long training sequence in a long training sequence subset and first sub-identity information in identity information of each receiving device in the communications system, where one piece of the identity information is used to uniquely indicate one receiving device in the communications system, the first sub-identity information is a part or all of the identity information, the long training sequence subset belongs to the long training sequence set, and the long training sequence subset does not include the set-use long training sequence;

acquire, when a second data packet transmitted by the transmitting device is received, a second long training sequence symbol carried in a long training sequence field in a physical layer of the second data packet, where the second long training sequence symbol is used to indicate a target long training sequence, and the target long training sequence is selected by the transmitting device from the long training sequence subset according to first sub-identity information of a target receiving device of the second data packet and the second mapping relationship;

determine the target long training sequence according to the second long training sequence symbol; and process the second data packet according to the target long training sequence.

Optionally, the processor 620 is specifically configured to determine the first sub-identity information of the target receiving device of the second data packet according to the target long training sequence and the second mapping relationship; and process the second data packet according to a relationship between first sub-identity information of the first receiving device and the first sub-identity information of the target receiving device.

Optionally, the processor 620 is specifically configured to discard the second data packet if the first sub-identity information of the first receiving device is different from the first sub-identity information of the target receiving device.

Optionally, the first sub-identity information is all of the identity information, and the processor 620 is specifically configured to acquire, from the second data packet if the first sub-identity information of the first receiving device is the same as the first sub-identity information of the target receiving device, second data that needs to be transmitted by the transmitting device.

Optionally, the first sub-identity information is a part of the identity information, and the processor 620 is specifically configured to acquire, if the first sub-identity information of the first receiving device is the same as the first sub-identity information of the target receiving device, a second sub-identity information symbol carried in the physical layer of the second data packet, where the second sub-identity information symbol is used to indicate second sub-identity information of the target receiving device; and process the second data packet according to a relationship between the second sub-identity information of the target receiving device and second sub-identity information of the first receiving device, where the second sub-identity information belongs to a part, except the first sub-identity information, in the identity information.

Optionally, the processor 620 is specifically configured to determine, from the long training sequence set according to the first sub-identity information of the first receiving device and the second mapping relationship, a first long training sequence only corresponding to the sub-identity information of the first receiving device; and process the second data packet according to a relationship between the target long training sequence and the first long training sequence.

Optionally, the processor 620 is specifically configured to discard the second data packet if the target long training sequence is different from the first long training sequence.

Optionally, the first sub-identity information is all of the identity information, and the processor 620 is specifically configured to acquire, from the second data packet if the target long training sequence is the same as the first long training sequence, second data that needs to be transmitted by the transmitting device.

Optionally, the first sub-identity information is a part of the identity information, and the processor 620 is specifically configured to acquire, if the target long training sequence is the same as the first long training sequence, a second sub-identity information symbol carried in the physical layer of the second data packet, where the second sub-identity information symbol is used to indicate second sub-identity information of the target receiving device; and process the second data packet according to a relationship between the second sub-identity information of the target receiving device and second sub-identity information of the first receiving device, where the second sub-identity information belongs to a part, except the first sub-identity information, in the identity information.

Optionally, the processor 620 is specifically configured to discard the second data packet if the second sub-identity information of the target receiving device is different from the second sub-identity information of the first receiving device; or if the second sub-identity information of the target receiving device is the same as the second sub-identity information of the first receiving device, acquire, from the second data packet, second data that needs to be transmitted by the transmitting device.

Optionally, the second sub-identity information symbol is carried in a partial association identifier field in the physical layer of the data packet.

Optionally, the processor 620 is specifically configured to determine, from the long training sequence set, a third long training sequence corresponding to the first sub-identity information of all the receiving devices in the communications system; and if the target long training sequence is the same as the third long training sequence, acquire, from the second data packet, second data that needs to be transmitted by the transmitting device.

Optionally, the long training sequence is a sequence with good correlation properties.

Optionally, the sequence with good correlation properties is any one of the following sequences:

a polyphase perfect sequence, a Gold sequence, and a pseudo-random sequence.

Optionally, the polyphase perfect sequence is any one of the following sequences:

a Zadoff-Chu sequence, a Frank sequence, and a combined Frank/Zadoff-Chu sequence.

Optionally, a length of the long training sequence is determined according to a quantity of available subcarriers in the communications system.

Optionally, the identity information is any one of the following information:

a Media Access Control MAC address, an Internet Protocol IP address, a basic service set identifier BSSID, an association identifier AID, a mobile phone number, an international mobile subscriber identity IMSI, and an international mobile equipment identity IMEI.

In an embodiment of the present disclosure, the processor may also be referred to as a CPU. The memory may include a read-only memory and a random access memory, and provide an instruction and data to the processor. A part of the memory may further include a non-volatile random access memory (NVRAM). In a specific application, the data transmission apparatus may be embedded in or the data transmission apparatus itself may be, for example, a standard Ethernet communications device such as a personal computer; modules of the data transmission apparatus are coupled together by using a bus system, where the bus system further includes a power bus, a control bus, and a status signal bus in addition to a data bus.

The processor may implement or execute steps and logical block diagrams disclosed in the method embodiments of the present disclosure. A general purpose processor may be a microprocessor or the processor may be any conventional processor, decoder, and the like. Steps of the disclosed methods with reference to the embodiments of the present disclosure may be directly executed and completed by means of a hardware processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and a decoding unit or processing unit reads information in the memory and completes the steps in the foregoing methods in combination with hardware of the decoding unit or processing unit.

It should be understood that in the embodiments of the present disclosure, the processor may be a central processing unit (Central Processing Unit, "CPU" for short), or the processor may be another general purpose processor, a digital signal processor (DSP), an application-specific integrated circuit (ASIC), a field programmable gate array (FPGA), or another programmable logical device, discrete gate or transistor logical device, discrete hardware component, or the like. The general purpose processor may be a microprocessor or the processor may be any conventional processor and the like.

In an implementation process, each step of the foregoing method may be completed by using an integrated logic circuit of hardware in the processor or an instruction in a form of software. Steps of the disclosed methods with reference to the embodiments of the present disclosure may be directly executed and completed by means of a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor. To avoid repetition, details are not described herein again.

The data transmission apparatus 600 according to an embodiment of the present disclosure may correspond to the receiving device (the apparatus C) in the method embodiment of the present disclosure, and furthermore, each unit, namely, each module, in the data transmission apparatus 600 and the foregoing other operations and/or functions are respectively intended to implement the corresponding procedure of the method 200 in FIG. 4, which is not further described herein for brevity.

According to the data transmission apparatus in the embodiment of the present disclosure, a transmitting device notifies each receiving device in a communications system of a mapping relationship between each set-use long training sequence and each receiving device group; a first receiving device may determine a first set-use long training sequence corresponding to a receiving device set to which the first receiving device belongs; when the transmitting device needs to transmit data to a target device, a target set-use long training sequence corresponding to the target device may be carried in a physical layer of a data packet; therefore, the first receiving device may process the data packet according to a relationship between the first set-use long training sequence and the target set-use long training sequence, so that the first receiving device can determine, on condition that the first receiving device parses only a long training sequence field in the physical layer, whether the first receiving device is a target receiving device of the data packet. Therefore, burden of the receiving device can be reduced, waste of hardware resources can be reduced, and user experience can be improved.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely example for description. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data transmission method, wherein the method comprises:
   determining, by a transmitting device, a long training sequence set, wherein the long training sequence set comprises at least two long training sequences;
   determining at least one receiving device set, wherein the at least one receiving device set comprises at least one receiving device in a communications system;
   determining a first mapping relationship, wherein the first mapping relationship is a mapping relationship between at least one set-use long training sequence in the long training sequence set and the at least one receiving device set, and the at least one set-use long training sequence corresponds to the at least one receiving device set on a one-to-one basis;
   determining, when a first data needs to be transmitted to a target receiving device set, a target set-use long training sequence according to the target receiving device set and the first mapping relationship;
   performing encapsulation processing on the first data according to the target set-use long training sequence to generate a first data packet, so that a long training sequence field in a physical layer of the first data packet carries a first long training sequence symbol that indicates the target set-use long training sequence; and
   transmitting the first data packet, to enable, after a receiving device receives the first data packet and acquires the target set-use long training sequence from the first data packet, the receiving device to process the data packet according to the target set-use long training sequence, and
   wherein the method further comprises:
   determining a second mapping relationship, wherein the second mapping relationship is a mapping relationship between each long training sequence in a long training sequence subset and first sub-identity information in identity information of each receiving device in the communications system, wherein one piece of the identity information uniquely indicates one receiving device in the communications system, the first sub-identity information is a part or all of the identity information, the long training sequence subset belongs to the long training sequence set, and the long training sequence subset does not comprise the set-use long training sequence;
   selecting, when second data needs to be transmitted to a target receiving device, a target long training sequence from the long training sequence subset according to first sub-identity information of the target receiving device and the second mapping relationship;

performing encapsulation processing on the second data according to the target long training sequence to generate a second data packet, so that a long training sequence field in a physical layer of the second data packet carries a second long training sequence symbol that indicates the target long training sequence; and transmitting the second data packet, to enable the target receiving device to acquire the target long training sequence from the second data packet and process the second data packet according to the target long training sequence.

2. The method according to claim 1, wherein the determining at least one receiving device set comprises:

determining the at least one receiving device set according to grouping information of each receiving device in the communications system, wherein the grouping information is allocated by the communications system and uniquely indicates one receiving device group in the communications system, and the receiving device group comprises at least one receiving device.

3. The method according to claim 2, wherein the grouping information comprises a group identifier (Group ID) or a cell identifier (Cell ID).

4. The method according to claim 1, wherein the determining at least one receiving device set comprises:

determining the at least one receiving device set according to feature information of each receiving device in the communications system, wherein the feature information comprises any one of the following information:

a service type of a service accessed by the receiving device, a geographical location of the receiving device, an access permission of the receiving device, and a priority of the receiving device.

5. The method according to claim 1, wherein the determining at least one receiving device set comprises:

determining the at least one receiving device set according to data that needs to be transmitted, so that data that needs to be transmitted to each receiving device in a same receiving device set is the same; and the method further comprises:

transmitting first indication information, wherein the first indication information indicates receiving devices comprised in each receiving device set.

6. The method according to claim 1, wherein the method further comprises:

transmitting second indication information, wherein the second indication information indicates the first mapping relationship.

7. The method according to claim 1, wherein the first mapping relationship is a mapping relationship between each set-use long training sequence and third sub-identity information in identity information of each receiving device in a corresponding receiving device set, wherein one piece of the identity information uniquely indicates one receiving device in the communications system, and the third sub-identity information is a part or all of the identity information.

8. The method according to claim 1, wherein when the target receiving device is one receiving device in the communications system, the selecting a target long training sequence from the long training sequence subset according to first sub-identity information of the target receiving device and the second mapping relationship comprises:

selecting, from the long training sequence subset according to the first sub-identity information of the target receiving device and the second mapping relationship, a second long training sequence only corresponding to the first sub-identity information of the target receiving device, and using the second long training sequence as the target long training sequence.

9. The method according to claim 8 wherein when the first sub-identity information is a part of the identity information, the performing encapsulation processing on the second data according to the target long training sequence to generate a second data packet comprises:

performing encapsulation processing on the second data according to the target long training sequence to generate the second data packet, so that a second sub-identity information symbol that indicates second sub-identity information of the target receiving device is carried in the physical layer of the second data packet, wherein the second sub-identity information belongs to a part, except the first sub-identity information, in the identity information.

10. The method according to claim 9, wherein the second sub-identity information symbol is carried in a partial association identifier field in the physical layer of the data packet.

11. The method according to claim 1, wherein when the target receiving device includes all the receiving devices in the communications system, the selecting a target long training sequence from the long training sequence subset according to first sub-identity information of the target receiving device and the second mapping relationship comprises:

selecting, from the long training sequence subset according to the first sub-identity information of the target receiving device and the mapping relationship, a third long training sequence corresponding to the first sub-identity information of all the receiving devices in the communications system, and using the third long training sequence as the target long training sequence.

12. A data transmission method, wherein the method comprises:

determining, by a first receiving device in a communications system, a first mapping relationship, wherein the first mapping relationship is a mapping relationship between at least one set-use long training sequence in a long training sequence set and at least one receiving device set, the at least one set-use long training sequence corresponds to the at least one receiving device set on a one-to-one basis, the at least one receiving device set comprises at least one receiving device in the communications system, and the long training sequence set comprises at least two long training sequences;

determining, from the at least one receiving device set, a first receiving device set to which the first receiving device belongs;

acquiring, when receiving a first data packet transmitted by a transmitting device, a first long training sequence symbol carried in a long training sequence field in a physical layer of the first data packet, wherein the first long training sequence symbol indicates a target set-use long training sequence, the target set-use long training sequence is determined by the transmitting device according to a target receiving device set of the first data packet and the first mapping relationship, and the first data packet is generated after the transmitting device performs encapsulation processing on a first data;

determining the target set-use long training sequence according to the first long training sequence symbol; and processing the first data packet according to the target set-use long training sequence, the first receiving device set, and the first mapping relationship, and wherein the method further comprises:

determining, by the first receiving device, a second mapping relationship, wherein the second mapping relationship is a mapping relationship between each long training sequence in a long training sequence subset and first sub-identity information in identity information of each receiving device in the communications system, wherein one piece of the identity information uniquely indicates one receiving device in the communications system, the first sub-identity information is a part or all of the identity information, the long training sequence subset belongs to the long training sequence set, and the long training sequence subset does not comprise the set-use long training sequence;

when receiving a second data packet transmitted by a transmitting device, acquiring a second long training sequence symbol carried in a long training sequence field in a physical layer of the second data packet, wherein the second long training sequence symbol indicates a second target set-use long training sequence, the second target set-use long training sequence is determined according to a second target receiving device set of the second data packet and the second mapping relationship, and the second data packet is generated after encapsulation processing on a second data;

determining the second target set-use long training sequence according to the second long training sequence symbol; and processing the second data packet according to the second target set-use long training sequence, the second receiving device set, and the second mapping relationship.

13. The method according to claim 12, wherein the processing the first data packet according to the target set-use long training sequence, the first receiving device set, and the first mapping relationship comprises:

determining, according to the first receiving device set and the first mapping relationship, a first set-use long training sequence corresponding to the first receiving device set; and further processing the first data packet such that:
if the first set-use long training sequence is the same as the target set-use long training sequence, acquiring the first data from the first data packet; and
if the first set-use long training sequence is different from the target set-use long training sequence, discarding the first data packet.

14. The method according to claim 12, wherein the processing the first data packet according to the target set-use long training sequence, the first receiving device set, and the first mapping relationship comprises:

determining, according to the first mapping relationship and the target set-use long training sequence, the target receiving device set corresponding to the target set-use long training sequence; and further processing the first data packet such that:
if the first receiving device set is the same as the target receiving device set, acquiring the first data from the first data packet; and
if the first receiving device set is different from the target receiving device set, discarding the first data packet.

15. A data transmission apparatus, wherein the apparatus comprises:

a processing hardware; and a non-transitory computer-readable medium including computer executable instructions that, when executed by the processing hardware, facilitate the data transmission apparatus performing a method comprising:

determining a long training sequence set, wherein the long training sequence set comprises at least two long training sequences;

determining at least one receiving device set, wherein the at least one receiving device set comprises at least one receiving device in a communications system;

determining a first mapping relationship, wherein the first mapping relationship is a mapping relationship between at least one set-use long training sequence in the long training sequence set and the at least one receiving device set, and the at least one set-use long training sequence corresponds to the at least one receiving device set on a one-to-one basis;

determining, when a first data needs to be transmitted to a target receiving device set, a target set-use long training sequence according to the target receiving device set and the first mapping relationship;

performing encapsulation processing on the first data according to the target set-use long training sequence to generate a first data packet, so that a long training sequence field in a physical layer of the first data packet carries a first long training sequence symbol that indicates the target set-use long training sequence; and transmitting the first data packet, to enable, after a receiving device receives the first data packet and acquires the target set-use long training sequence from the first data packet, the receiving device to process the data packet according to the target set-use long training sequence, and wherein the method further comprises:

determining a second mapping relationship, wherein the second mapping relationship is a mapping relationship between each long training sequence in a long training sequence subset and first sub-identity information in identity information of each receiving device in the communications system, wherein one piece of the identity information uniquely indicates one receiving device in the communications system, the first sub-identity information is a part or all of the identity information, the long training sequence subset belongs to the long training sequence set, and the long training sequence subset does not comprise the set-use long training sequence;

when second data needs to be transmitted to a target receiving device, selecting a target long training sequence from the long training sequence subset according to first sub-identity information of the target receiving device and the second mapping relationship;

performing encapsulation processing on the second data according to the target long training sequence to generate a second data packet, so that a long training sequence field in a physical layer of the second data packet carries a second long training sequence symbol that indicates the target long training sequence; and transmitting the second data packet, to enable the target receiving device to acquire the target long training sequence from the second data packet and process the second data packet according to the target long training sequence.

16. The apparatus according to claim 15, wherein the determining the at least one receiving device set includes at least one of the group consisting of:

determining the at least one receiving device set according to grouping information of each receiving device in the communications system, wherein the grouping information is allocated by the communications system and uniquely indicates one receiving device group in the communications system, and the receiving device group comprises at least one receiving device;

determining the at least one receiving device set according to feature information of each receiving device in the communications system, wherein the feature information comprises any one of the group consisting of:
a service type of a service accessed by the receiving device,
a geographical location of the receiving device,
an access permission of the receiving device, and
a priority of the receiving device; and determining the at least one receiving device set according to data that needs to be transmitted, so that data that needs to be transmitted to each receiving device in a same receiving device set is the same.

17. The apparatus according to claim 15, wherein the first mapping relationship is a mapping relationship between each set-use long training sequence and third sub-identity information in identity information of each receiving device in a corresponding receiving device set, wherein one piece of the identity information is used to uniquely indicate one receiving device in the communications system, and the third sub-identity information is a part or all of the identity information.

18. A data transmission apparatus, wherein the apparatus comprises:

a processing hardware; and a non-transitory computer-readable medium including computer executable instructions that, when executed by the processing hardware, facilitate the data transmission apparatus performing a method comprising:

determining a first mapping relationship, wherein the first mapping relationship is a mapping relationship between at least one set-use long training sequence in a long training sequence set and at least one receiving device set, the at least one set-use long training sequence corresponds to the at least one receiving device set on a one-to-one basis, the receiving device set comprises at least one receiving device in a communications system, and the long training sequence set comprises at least two long training sequences; and determining from the at least one receiving device set, a first receiving device set to which the apparatus belongs;

receiving a first data packet transmitted by a transmitting device; and acquiring a first long training sequence symbol carried in a long training sequence field in a physical layer of the first data packet, wherein the first long training sequence symbol indicates a target set-use long training sequence, the target set-use long training sequence is determined by the transmitting device according to a target receiving device set of the first data packet and the first mapping relationship, and the first data packet is generated after the transmitting device performs encapsulation processing on first data;

determining the target set-use long training sequence according to the first long training sequence symbol; and processing the first data packet according to the target set-use long training sequence, the first receiving device set, and the first mapping relationship, and wherein the method further comprises:

determining, by the first receiving device, a second mapping relationship, wherein the second mapping relationship is a mapping relationship between each long training sequence in a long training sequence subset and first sub-identity information in identity information of each receiving device in the communications system, wherein one piece of the identity information uniquely indicates one receiving device in the communications system, the first sub-identity information is a part or all of the identity information, the long training sequence subset belongs to the long training sequence set, and the long training sequence subset does not comprise the set-use long training sequence;

when receiving a second data packet transmitted by a transmitting device, acquiring a second long training sequence symbol carried in a long training sequence field in a physical layer of the second data packet, wherein the second long training sequence symbol indicates a second target set-use long training sequence, the second target set-use long training sequence is determined according to a second target receiving device set of the second data packet and the second mapping relationship, and the second data packet is generated after encapsulation processing on a second data;

determining the second target set-use long training sequence according to the second long training sequence symbol; and processing the second data packet according to the second target set-use long training sequence, the second receiving device set, and the second mapping relationship.

19. The apparatus according to claim 18, wherein the processing the first data packet according to the target set-use long training sequence, the first receiving device set, and the first mapping relationship comprises:

determining, according to the first receiving device set and the first mapping relationship, a first set-use long training sequence corresponding to the first receiving device set; and further processing the first data packet such that:
if the first set-use long training sequence is the same as the target set-use long training sequence, acquiring the first data from the first data packet; and
if the first set-use long training sequence is different from the target set-use long training sequence, discarding the first data packet.

20. The apparatus according to claim 18, wherein the processing the first data packet according to the target set-use long training sequence, the first receiving device set, and the first mapping relationship comprises:
- determining, according to the first mapping relationship and the target set-use long training sequence, the target receiving device set corresponding to the target set-use long training sequence; and
- further processing the first data packet such that:
  - if the first receiving device set is the same as the target receiving device set, acquiring the first data from the first data packet; and
  - if the first receiving device set is different from the target receiving device set, discarding the first data packet.

* * * * *